US012380851B2

(12) United States Patent
Wang et al.

(10) Patent No.: US 12,380,851 B2
(45) Date of Patent: Aug. 5, 2025

(54) PIXEL DRIVING CIRCUIT AND DRIVING METHOD THEREFOR, AND ARRAY SUBSTRATE AND DISPLAY APPARATUS

(71) Applicants: Chongqing BOE Display Technology Co., Ltd., Chongqing (CN); BOE TECHNOLOGY GROUP CO., LTD., Beijing (CN)

(72) Inventors: Rui Wang, Beijing (CN); Ming Hu, Beijing (CN); Haijun Qiu, Beijing (CN); Juntao Chen, Beijing (CN)

(73) Assignees: CHONGQING BOE DISPLAY TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/578,005

(22) PCT Filed: May 4, 2023

(86) PCT No.: PCT/CN2023/092110
§ 371 (c)(1),
(2) Date: Jan. 10, 2024

(87) PCT Pub. No.: WO2023/226708
PCT Pub. Date: Nov. 30, 2023

(65) Prior Publication Data
US 2024/0379055 A1 Nov. 14, 2024

(30) Foreign Application Priority Data
May 24, 2022 (CN) ......................... 202210569842.3

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... H10K 59/00–95; H10K 59/1213; G09G 3/3233; G09G 2300/0819;
(Continued)

(56) References Cited

U.S. PATENT DOCUMENTS 11,688,348 B2 * 6/2023 Wang .................. G09G 3/3233 345/204
2020/0273411 A1 8/2020 Gao et al.
(Continued)

FOREIGN PATENT DOCUMENTS

CN 107610651 A 1/2018
CN 207217082 U 4/2018
(Continued)

*Primary Examiner* — Sanjiv D. Patel
(74) *Attorney, Agent, or Firm* — XSENSUS LLP

(57) ABSTRACT

A pixel driving circuit (31) includes: a driving sub-circuit (311), a first light-emission control sub-circuit (312), a second light-emission control sub-circuit (313), a data write sub-circuit (314), a compensation sub-circuit (315) and a first reset sub-circuit (316). The driving sub-circuit (311) includes a control terminal, a first terminal and a second terminal; and in an initialization phase (t1) in one display frame of the pixel driving circuit (31), a voltage difference between the control terminal of the driving sub-circuit (311) and the first terminal of the driving sub-circuit (311) is fixed. A pulse width of the signal of the first reset signal control terminal is adjustable.

19 Claims, 34 Drawing Sheets

(52) U.S. Cl.
CPC ............... *G09G 2300/0842* (2013.01); *G09G 2300/0861* (2013.01); *G09G 2310/08* (2013.01); *G09G 2320/0257* (2013.01)

(58) Field of Classification Search
CPC ... G09G 2320/0233; G09G 2300/0861; G09G 2320/045; G09G 3/3291; G09G 2300/0426; G09G 2310/0262; G09G 3/32; G09G 3/3258; G09G 3/3225; G09G 3/3208; G09G 3/30; G09G 2320/0626; G09G 3/325; G09G 3/3241
See application file for complete search history.

(56) References Cited

U.S. PATENT DOCUMENTS

| | | | | |
|---|---|---|---|---|
| 2021/0407383 | A1* | 12/2021 | Lai | G09G 3/32 |
| 2022/0122522 | A1* | 4/2022 | Li | G09G 3/32 |
| 2022/0157239 | A1 | 5/2022 | Zhang et al. | |
| 2023/0031984 | A1 | 2/2023 | Wang et al. | |
| 2023/0410744 | A1 | 12/2023 | Guo et al. | |
| 2024/0038141 | A1* | 2/2024 | Zeng | G09G 3/32 |
| 2024/0062721 | A1 | 2/2024 | Liu et al. | |
| 2024/0078976 | A1 | 3/2024 | Cheng et al. | |
| 2024/0087514 | A1 | 3/2024 | Feng et al. | |
| 2024/0144884 | A1 | 5/2024 | Lu et al. | |
| 2024/0169915 | A1 | 5/2024 | Cao et al. | |

FOREIGN PATENT DOCUMENTS

| | | | |
|---|---|---|---|
| CN | 109599062 | A | 4/2019 |
| CN | 113629127 | A | 11/2021 |
| CN | 113838419 | A | 12/2021 |
| CN | 113851082 | A | 12/2021 |
| CN | 113870758 | A | 12/2021 |
| CN | 113950715 | A | 1/2022 |
| CN | 114258320 | A | 3/2022 |
| CN | 114424280 | A | 4/2022 |
| CN | 114495835 | A | 5/2022 |
| CN | 114514573 | A | 5/2022 |
| CN | 114974130 | A | 8/2022 |

* cited by examiner

PIXEL DRIVING CIRCUIT AND DRIVING METHOD THEREFOR, AND ARRAY SUBSTRATE AND DISPLAY APPARATUS

CROSS-REFERENCE TO RELATED APPLICATIONS

This application is a national phase entry under 35 USC 371 of International Patent Application No. PCT/CN2023/092110, filed on May 4, 2023, which claims priority to Chinese Patent Application No. 202210569842.3, filed on May 24, 2022, which are incorporated herein by reference in their entirety.

TECHNICAL FIELD

The present disclosure relates to the field of display technologies, and in particular, to a pixel driving circuit and a driving method therefor, an array substrate and a display apparatus.

BACKGROUND

At present, organic light emitting diode (OLED) display apparatuses are active light-emitting display apparatuses with advantages of self-luminosity, wide viewing angle, high contrast, low power consumption, extremely high response speed and the like, and have been widely used in mobile phones, tablets, digital cameras and other display products. The OLED display apparatus may include a plurality of sub-pixels, and each sub-pixel includes a pixel driving circuit and a light-emitting device that are provided in one-to-one correspondence. The pixel driving circuit may drive the corresponding light-emitting device to emit light under control of a gate driver on array (GOA) driving signal.

SUMMARY

In an aspect, a pixel driving circuit is provided. The pixel driving circuit includes: a driving sub-circuit, a first light-emission control sub-circuit, a second light-emission control sub-circuit, a data write sub-circuit, a compensation sub-circuit and a first reset sub-circuit. The driving sub-circuit includes a control terminal, a first terminal and a second terminal. In an initialization phase of a display frame of the pixel driving circuit, the control terminal of the driving sub-circuit and the first terminal of the driving sub-circuit have a fixed voltage difference therebetween. The first light-emission control sub-circuit is coupled to a first light-emission signal control terminal, a first voltage terminal and the first terminal of the driving sub-circuit, and is configured to drive a light-emitting element to emit light in response to a signal of the first light-emission signal control terminal. The second light-emission control sub-circuit is coupled to a second light-emission signal control terminal and the second terminal of the driving sub-circuit and is configured to be coupled to a first electrode of the light-emitting element, and is configured to drive the light-emitting element to emit light in response to a signal of the second light-emission signal control terminal. The data write sub-circuit is coupled to a first signal control terminal, a data signal terminal and the first terminal of the driving sub-circuit, and is configured to write a data signal of the data signal terminal into the first terminal of the driving sub-circuit in response to a signal of the first signal control terminal. The compensation sub-circuit is coupled to a compensation signal control terminal, the second terminal of the driving sub-circuit and the control terminal of the driving sub-circuit, and is configured to perform threshold compensation on the driving sub-circuit in response to a signal of the compensation signal control terminal. The first reset sub-circuit is coupled to a first reset signal control terminal and coupled between a second voltage terminal and the control terminal of the driving sub-circuit, and is configured to write a signal of the second voltage terminal into the control terminal of the driving sub-circuit in response to a signal of the first reset signal control terminal, so as to reset the control terminal of the driving sub-circuit. A pulse width of the signal of the first reset signal control terminal is adjustable.

In some embodiments, a first terminal of the first reset sub-circuit is coupled to the control terminal of the driving sub-circuit through the compensation sub-circuit, and a second terminal of the first reset sub-circuit is coupled to the second voltage terminal.

In some embodiments, the pixel driving circuit further includes a third light-emission control sub-circuit. The third light-emission control sub-circuit is coupled to a third light-emission signal control terminal, the second terminal of the driving sub-circuit and the first terminal of the first reset sub-circuit; and the third light-emission control sub-circuit is configured to synchronously initialize the control terminal of the driving sub-circuit and the first terminal of the driving sub-circuit in the initialization phase in response to a signal of the third light-emission signal control terminal, and drive the light-emitting element to emit light in a light-emitting phase.

In some embodiments, a first terminal of the first reset sub-circuit is coupled to the control terminal of the driving sub-circuit, and a second terminal of the first reset sub-circuit is coupled to the second voltage terminal.

In some embodiments, the pixel driving circuit further includes a second reset sub-circuit. The second reset sub-circuit is coupled to a second reset signal control terminal, a third voltage terminal and the second terminal of the driving sub-circuit; the second reset sub-circuit is configured to write a signal of the third voltage terminal into the second terminal of the driving sub-circuit in response to a signal of the second reset signal control terminal, so as to reset the second terminal of the driving sub-circuit.

In some embodiments, the first light-emission signal control terminal and the second light-emission signal control terminal are connected to different signal lines. The first light-emission control sub-circuit is further configured to write a signal of the first voltage terminal into the first terminal of the driving sub-circuit in the initialization phase.

In some embodiments, the first light-emission signal control terminal and the second light-emission signal control terminal are connected to a same signal line. The pixel driving circuit further includes a third reset sub-circuit. The third reset sub-circuit is coupled to a second signal control terminal, a fourth voltage terminal and the first terminal of the driving sub-circuit, and is configured to write a signal of the fourth voltage terminal into the first terminal of the driving sub-circuit in response to a signal of the second signal control terminal, so as to reset the first terminal of the driving sub-circuit; a voltage of the signal of the fourth voltage terminal is higher than a voltage of a signal of the first voltage terminal.

In another aspect, the pixel driving circuit is provided. The pixel driving circuit includes: a driving sub-circuit, a first light-emission control sub-circuit, a second light-emission control sub-circuit, a data write sub-circuit, a compensation sub-circuit and a first reset sub-circuit. The driving sub-circuit includes a control terminal, a first terminal and a second terminal. The first light-emission control sub-circuit is coupled to a first light-emission signal control terminal, a first voltage terminal and the first terminal of the driving sub-circuit, and is configured to drive a light-emitting element to emit light in response to a signal of the first light-emission signal control terminal. The second light-emission control sub-circuit is coupled to a second light-emission signal control terminal and the second terminal of the driving sub-circuit and is configured to be coupled to a first electrode of the light-emitting element, and is configured to drive the light-emitting element to emit light in response to a signal of the second light-emission signal control terminal. The data write sub-circuit is coupled to a first signal control terminal, a data signal terminal and the first terminal of the driving sub-circuit, and is configured to write a data signal of the data signal terminal into the first terminal of the driving sub-circuit in response to a signal of the first signal control terminal. The compensation sub-circuit is coupled to a compensation signal control terminal, the second terminal of the driving sub-circuit and the control terminal of the driving sub-circuit, and is configured to perform threshold compensation on the driving sub-circuit in response to a signal of the compensation signal control terminal. The first reset sub-circuit is coupled to a first reset signal control terminal, the compensation sub-circuit and a second voltage terminal, and is configured to write a signal of the second voltage terminal into the control terminal of the driving sub-circuit in response to a signal of the first reset signal control terminal, so as to reset the control terminal of the driving sub-circuit. A pulse width of the signal of the first reset signal control terminal is adjustable.

In some embodiments, the pixel driving circuit further includes a fourth reset sub-circuit. The fourth reset sub-circuit is coupled to a third signal control terminal and a fifth voltage terminal and is configured to be coupled to the first electrode of the light-emitting element, and is configured to write a signal of the fifth voltage terminal into the first electrode of the light-emitting element in response to a signal of the third signal control terminal, so as to reset the first electrode of the light-emitting element.

In some embodiments, the pixel driving circuit further includes a storage sub-circuit. The storage sub-circuit is coupled to the control terminal of the driving sub-circuit and the first voltage terminal, and is configured to store a compensation signal obtained based on the data signal.

In yet another aspect, an array substrate is provided. The array substrate includes pixel driving circuits each as described in any of the above embodiments. Each pixel driving circuit includes the data write sub-circuit and the first reset sub-circuit. The data write sub-circuit includes a fourth transistor, and the first reset sub-circuit includes a sixth transistor.

The array substrate includes: a substrate, a first active layer and a first gate layer. The first active layer disposed on a side of the substrate includes a plurality of first pixel active patterns, and each first pixel active pattern includes a fourth active pattern layer of the fourth transistor and a sixth active pattern layer of the sixth transistor. The first gate layer disposed on a side of the first active layer away from the substrate includes first gate signal lines and second gate signal lines.

An orthographic projection of the fourth active pattern layer on the substrate is overlapped with an orthographic projection of a current stage of first gate signal line in the first gate signal lines on the substrate, an orthographic projection of the sixth active pattern layer on the substrate is overlapped with an orthographic projection of the current stage of second gate signal line in the second gate signal lines on the substrate. Relative to an electrical signal transmitted by the first gate signal line, a pulse width of an electrical signal transmitted by the second gate signal line is adjustable.

In some embodiments, the first gate signal lines and the second gate signal lines are insulated.

In some embodiments, the pixel driving circuit further includes the driving sub-circuit, the first light-emission control sub-circuit, the second light-emission control sub-circuit and a third reset sub-circuit. The driving sub-circuit includes a first transistor, the first light-emission control sub-circuit includes a second transistor, the second light-emission control sub-circuit includes a third transistor, and the third reset sub-circuit includes a tenth transistor.

The first pixel active pattern further includes a first active pattern layer of the first transistor, a second active pattern layer of the second transistor, a third active pattern layer of the third transistor and a tenth active pattern layer of the tenth transistor. The first active pattern layer, the second active pattern layer and the tenth active pattern layer are all connected to a first connection point.

The first gate layer further includes third gate signal lines and fourth gate signal lines. An orthographic projection of the third active pattern layer on the substrate and an orthogonal projection of the second active pattern layer on the substrate are overlapped with an orthographic projection of the current stage of third gate signal line in the third gate signal lines on the substrate, and an orthogonal projection of the tenth active pattern layer on the substrate is overlapped with an orthographic projection of the current stage of fourth gate signal line in the fourth gate signal lines on the substrate.

In some embodiments, the array substrate further includes a third gate layer, and the third gate layer is disposed on a side of the first gate layer away from the substrate. The third gate layer further includes third initialization signal lines, and a third initialization signal line is electrically connected to the tenth active pattern layer.

In some embodiments, the array substrate further includes a second gate layer, and the second gate layer is disposed between the first gate layer and the third gate layer. The second gate layer further includes first initialization signal lines, and a first initialization signal line is electrically connected to the sixth active pattern layer.

In some embodiments, the array substrate includes a plurality of pixel areas arranged in an array, and each pixel area is provided with two adjacent pixel driving circuits therein. In the pixel area, patterns of a same layer in a plurality of film layers included in the array substrate are substantially mirror symmetrical. The pixel driving circuit further includes a storage sub-circuit, the storage sub-circuit includes a capacitor, and the second gate layer further includes a second electrode plate of the capacitor of the storage sub-circuit. Two second electrode plates located in a same pixel area are connected.

In some embodiments, the pixel driving circuit further includes a fourth reset sub-circuit, and the first active layer further includes a seventh active pattern layer of the fourth reset sub-circuit. The array substrate further includes a first source-drain metal layer, and the first source-drain metal layer is disposed on a side of the third gate layer away from the substrate. The first source-drain metal layer includes second initialization signal lines, adjacent second initialization signal lines are electrically connected, and a second initialization signal line is electrically connected to the seventh active pattern layer.

In some embodiments, the first connection point is disposed in the first active layer, and the first active pattern layer and the second active layer are connected at the first connection point. The first source-drain metal layer further includes a fourth connection line. An end of the fourth connection line is electrically connected to the tenth active pattern layer through a first via hole extending to the first active layer, and another end of the fourth connection line is electrically connected to the first connection point through a second via hole extending to the first active layer.

In some embodiments, the array substrate further includes a second gate layer, and the second gate layer is disposed between the first gate layer and the third gate layer. The second gate layer includes first initialization signal lines, and the sixth active pattern layer is electrically connected to a first initialization signal line. The first source-drain metal layer further includes a fifth connection line. An end of the fifth connection line is electrically connected to the third initialization signal line through a third via hole extending to the third gate layer, and another end of the fifth connection line is electrically connected to the tenth active pattern layer through a fourth via hole extending to the first active layer.

In some embodiments, the first source-drain metal layer further includes a sixth connection line. Both ends of the sixth connection line are electrically connected to the first initialization signal line respectively through two fifth via holes extending to the second gate layer, and a middle of the sixth connection line is electrically connected to the sixth active pattern layer through a sixth via hole extending to the first active layer.

In some embodiments, the array substrate further includes a second source-drain metal layer, and the second source-drain metal layer is disposed on a side of the first source-drain metal layer away from the substrate. The second source-drain metal layer includes a first voltage signal line. The pixel driving circuit further includes a storage sub-circuit, the storage sub-circuit includes a capacitor, and the second gate layer further includes a second electrode plate of the capacitor. An end of each third connection line is electrically connected to the second electrode plate through a seventh via hole extending to the second gate layer, another end of each third connection line is electrically connected to the second active pattern layer through an eighth via hole extending to the first active layer, and the first voltage signal line is electrically connected to the third connection line through a ninth via hole extending to the second source-drain metal layer.

In yet another aspect, a display apparatus is provided. The display apparatus includes the pixel driving circuits each as described in any of the above embodiments, and light-emitting elements. Alternatively, the display apparatus includes the array substrate as described in any of the above embodiments, a light-emitting device layer disposed on the array substrate, and an encapsulation layer disposed on a side of the light-emitting device layer away from the array substrate.

In yet another aspect, a driving method for the pixel driving circuit is provided, which is used to drive the pixel driving circuit as described in any of the above embodiments. An operation process of the pixel driving circuit in a display frame includes an initialization phase, a data writing phase and a light-emitting phase. The driving method includes: in the initialization phase, controlling a level of the signal of the first reset signal control terminal to be a first level, controlling a level of the signal of the compensation signal control terminal to be a second level, and controlling a level of the signal of the first signal control terminal to be the second level; a pulse width of the signal of the first reset signal control terminal being adjustable; in the data writing phase, controlling the level of the signal of the first reset signal control terminal to be the second level, controlling the level of the signal of the compensation signal control terminal to be the second level, and controlling the level of the signal of the first signal control terminal to be the first level; and in the light-emitting phase, controlling the level of the signal of the first reset signal control terminal to be the second level, controlling the level of the signal of the compensation signal control terminal to be the first level, and controlling the level of the signal of the first signal control terminal to be the second level.

In some embodiments, the driving method for the pixel driving circuit further includes: in the initialization phase, controlling a level of the signal of the first light-emission signal control terminal to be the first level, and controlling a level of the signal of the second light-emission signal control terminal to be the second level; in the data writing phase, controlling the level of the signal of the first light-emission signal control terminal to be the second level, and controlling the level of the signal of the second light-emission signal control terminal to be the second level; and in the light-emitting phase, controlling the level of the signal of the first light-emission signal control terminal to be the first level, and controlling the level of the signal of the second light-emission signal control terminal to be the first level.

In some embodiments, the pixel driving circuit further includes a third reset sub-circuit. The third reset sub-circuit is coupled to a second signal control terminal, a fourth voltage terminal and the first terminal of the driving sub-circuit, and a control terminal of the third reset sub-circuit is configured to receive a signal of the second signal control terminal. A voltage of a signal of the fourth voltage terminal is higher than a voltage of a signal of the first voltage terminal. The method further includes: in the initialization phase, controlling a level of the signal of the first light-emission signal control terminal and the second light-emission signal control terminal to be the second level, and controlling the signal of the second signal control terminal to be at the first level; in the data writing phase, controlling the level of the signal of the first light-emission signal control terminal and the second light-emission signal control terminal to be the second level, and controlling the signal of the second signal control terminal to be at the second level; and in the light-emitting phase, controlling the level of the signal of the first light-emission signal control terminal and the second light-emission signal control terminal to be the first level, and controlling the signal of the second signal control terminal to be at the second level.

In some embodiments, a first terminal of the first reset sub-circuit is coupled to the control terminal of the driving sub-circuit through the compensation sub-circuit, and a second terminal of the first reset sub-circuit is coupled to the second voltage terminal. The pixel driving circuit further includes a third light-emission control sub-circuit, the third light-emission control sub-circuit is coupled to a third light-emission signal control terminal, the second terminal of the driving sub-circuit and the first terminal of the first reset sub-circuit, and a control terminal of the third light-emission control sub-circuit is configured to receive a signal of the third light-emission signal control terminal. The method further includes: in the initialization phase, controlling a level of the signal of the third light-emission signal control terminal to be the second level; in the data writing phase, controlling the level of the signal of the third light-emission signal control terminal to be the first level or the second level; and in the light-emitting phase, controlling the level of the signal of the third light-emission signal control terminal to be the first level.

In some embodiments, a first terminal of the first reset sub-circuit is coupled to the control terminal of the driving sub-circuit, and a second terminal of the first reset sub-circuit is coupled to the second voltage terminal. The pixel driving circuit further includes a second reset sub-circuit, the second reset sub-circuit is coupled to a second reset signal control terminal, a third voltage terminal and the second terminal of the driving sub-circuit, and a control terminal of the second reset sub-circuit is configured to receive a signal of the second reset signal control terminal. The method further includes: in the initialization phase, controlling a level of the signal of the second reset signal control terminal to be the first level; in the data writing phase, controlling the level of the signal of the second reset signal control terminal to be the second level; and in the light-emitting phase, controlling the level of the signal of the second reset signal control terminal to be the second level.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
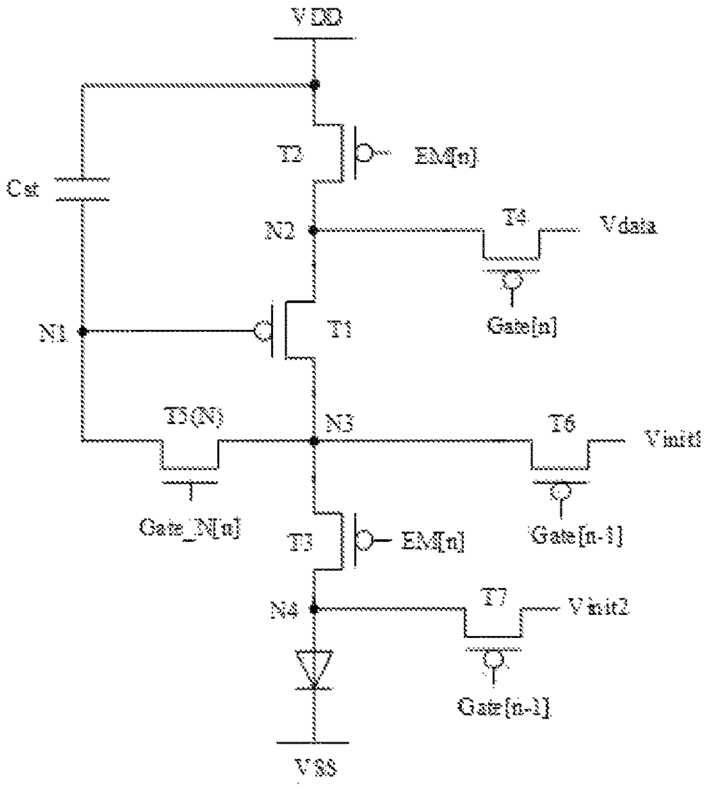
FIG. 1 is a structural diagram of a pixel driving circuit in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as open and inclusive, i.e., “including, but not limited to”. In the description of the specification, the terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as “first” and “second” are used for descriptive purposes only, and are not to be construed as indicating or implying the relative importance or implicitly indicating the number of indicated technical features. Thus, features defined with “first” or “second” may explicitly or implicitly include one or more of the features. In the description of the embodiments of the present disclosure, the term “a plurality of” or “the plurality of” means two or more unless otherwise specified.

In the description of some embodiments, the expressions “coupled” and “connected” and derivatives thereof may be used. For example, the term “connected” may be used in the description of some embodiments to indicate that two or more components are in direct physical or electrical contact with each other. For another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the content herein.

The phrase “at least one of A, B and C” has a same meaning as the phrase “at least one of A, B or C”, and they both include the following combinations of A, B and C: only A, only B, only C, a combination of A and B, a combination of A and C, a combination of B and C, and a combination of A, B and C.

The phrase “A and/or B” includes the following three combinations: only A, only B, and a combination of A and B.

As used herein, the term “if” is optionally construed as “when” or “in a case where” or “in response to determining that” or “in response to detecting”, depending on the context. Similarly, the phrase “if it is determined that” or “if [a stated condition or event] is detected” is optionally construed as “in a case where it is determined that” or “in response to determining that” or “in a case where [the stated condition or event] is detected” or “in response to detecting [the stated condition or event]”, depending on the context.

The phrase “applicable to” or “configured to” as used herein indicates an open and inclusive expression, which does not exclude apparatuses that are applicable to or configured to perform additional tasks or steps.

In addition, the use of the phrase “based on” is meant to be open and inclusive, since a process, step, calculation or other action that is “based on” one or more of the stated conditions or values may, in practice, be based on additional conditions or values exceeding those stated.

The term “about”, “substantially” or “approximately” as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as “parallel”, “perpendicular” or “equal” as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term “parallel” includes absolute parallelism and approximate parallelism, and an acceptable range of deviation of the approximate parallelism may be a deviation within 5°; the term “perpendicular” includes absolute perpendicularity and approximate perpendicularity, and an acceptable range of deviation of the approximate perpendicularity may also be a deviation within 5°; and the term “equal” includes absolute equality and approximate equality, and an acceptable range of deviation of the approximate equality may be a difference between two equals being less than or equal to 5% of either of the two equals.

Transistors adopted in circuits provided in embodiments of the present disclosure may be thin film transistors, field effect transistors or other switching devices with the same properties, and the embodiments of the present disclosure will be described by taking the thin film transistors as an example.

Throughout the specification, the mentioned “one embodiment” means that the described specific features, structures or characteristics related to the embodiment are included in at least one embodiment. Thus, the phrases “in one embodiment” appeared in various positions throughout the specification are not necessarily referring to the same embodiment. In addition, the specific features, structures or characteristics may be included in any one or more embodiments in any suitable manner.

FIG. 1 is a circuit diagram of a pixel driving circuit in the related art. As shown in FIG. 1, the pixel driving circuit includes seven transistors and one capacitor, the seven transistors are a transistor T1 to a transistor T7, and the one capacitor is a capacitor Cst.

In some embodiments, an operation process of the pixel driving circuit in a display frame may include an initialization phase t1, a data writing phase t2 and a light-emitting phase t3. The operation process of the pixel driving circuit in FIG. 1 will be described below with reference to FIG. 2.

In the initialization phase t1, a gate driving signal Gate [n−1] of the transistor T6 and the transistor T7 is at a low level, a gate driving signal Gate_N[n] of the transistor T5 is at a high level, a gate driving signal EM[n] of the transistor T2 and the transistor T3 is at a high level, and a gate driving signal Gate[n] of the transistor T4 is at a high level. In this way, in the initialization phase t1, the transistor T5, the transistor T6 and the transistor T7 are turned on, and the transistor T1 to the transistor T4 are turned off. Thus, a voltage vinit1 output by a voltage terminal Vinit1 may be provided to a gate (i.e., a first node N1) of the transistor T1 through the turned-on transistor T5 and the transistor T6 that are turned on, so that the voltage of the gate of the transistor T1 is vinit1, so as to achieve the initialization of the gate of the transistor T1. In addition, a voltage vinit2 output by a voltage terminal Vinit2 may be provided to a first electrode of a light-emitting element through the turned-on transistor T7, so as to reset the first electrode of the light-emitting element.

In the data writing phase t2, the gate driving signal Gate[n−1] of the transistor T6 and the transistor T7 is at a high level, the gate driving signal Gate_N [n] of the transistor T5 is at the high level, the gate driving signal EM[n] of the transistor T2 and the transistor T3 is at the high level, and the gate driving signal Gate[n] of the transistor T4 is at a low level. In this way, in the data writing phase t2, the transistor T4 and the transistor T5 are turned on, and the transistor T1 to the transistor T3 and the transistor T6 and the transistor T7 are turned off. Thus, a voltage vdata output by a data signal terminal Vdata may be written into a first electrode (i.e., a second node N2) of the first transistor T1 through the transistor T4, so that the voltage of the first electrode of the transistor T1 is vdata, so as to achieve the initialization of the first electrode of the transistor T1.

In the light-emitting phase t3, the gate driving signal Gate[n−1] of the transistor T6 and the transistor T7 is at the high level, the gate driving signal Gate_N[n] of the transistor T5 is at a low level, the gate driving signal EM[n] of the transistor T2 and the transistor T3 is at a low level, and the gate driving signal Gate[n] of the transistor T4 is at the high level. In this way, in the light-emitting phase t3, the transistor T1 to the transistor T3 are turned on, and the transistor T4 to the transistor T7 are turned off. Thus, a voltage vdd output by a voltage terminal VDD may be provided to the first electrode of the light-emitting element through the transistor T1 to the transistor T3, so as to drive the light-emitting element to emit light.

Figure 2:
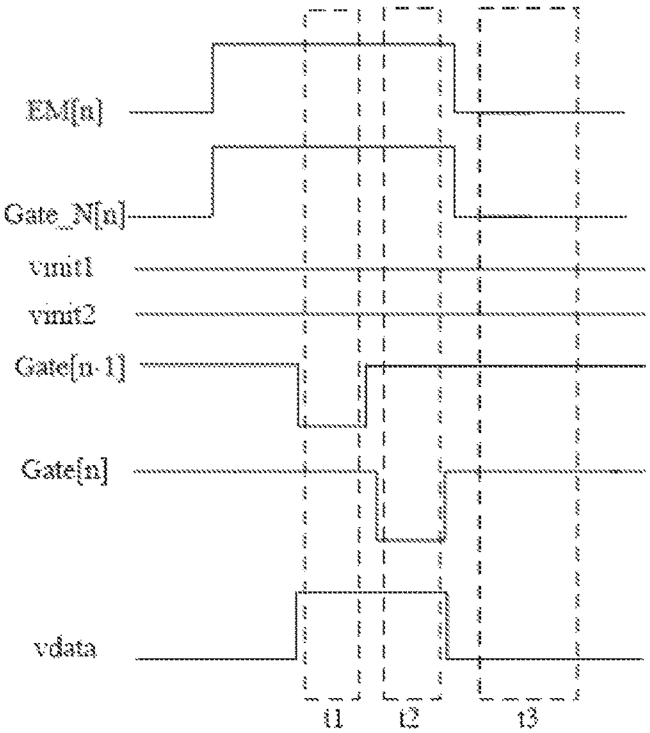
FIG. 2 is a signal timing diagram of a pixel driving circuit in the related art.

It can be seen in combination with FIGS. 1 and 2 that, in the initialization phase t1, voltages of the gate and a drain of the transistor T1 are vinit1, and a voltage of a source of the transistor T1 will be pulled down and discharged to vinit1−Vth to be turned off, so that a fixed voltage difference is generated between the gate and the drain of the transistor T1, and the transistor T1 is in a fixed off-bias state. With such a solution, no matter whether the data signal of the previous frame is a black state signal or a white state signal, the transistor T1 enters the data writing phase t2 from the fixed off-bias state, so that the short-term afterimage problem caused by the hysteresis effect may be improved. However, since the fixed voltage difference on the transistor T1 in this solution is a passively generated bias voltage, the bias voltage effect is not good, resulting in a poor effect in improving the afterimage.

In addition, the gate driving signal of the transistor T4 is Gate[n], and the gate driving signal of the transistor T6 is Gate[n−1]. That is, the gate driving signal Gate[n−1] of the transistor T6 is a previous-stage signal of the gate driving signal Gate[n] of the transistor T4. Therefore, a pulse width of the gate driving signal of the transistor T6 cannot be modulated, that is, the time of the initialization phase cannot be independently controlled. As a result, the time balance between the initialization phase and the data writing phase cannot be guaranteed, and a good light-emission effect cannot be achieved.

In order to solve the above problem, some embodiments of the present disclosure provide a pixel driving circuit and a display apparatus.

In the initialization phase, the pixel driving circuit may ensure a fixed voltage difference between a control terminal of a driving sub-circuit and a first terminal of the driving sub-circuit, that is, it can ensure a fixed voltage difference between a gate and a source of a driving transistor. Therefore, a first transistor has a fixed VGS on-bias signal in the initialization phase. Since the fixed voltage difference on the first transistor is an actively generated bias voltage, compared with the passively generated bias voltage on the first transistor in the solution shown in FIG. 1, the afterimage problem caused by the hysteresis effect of the first transistor may be improved. Moreover, a sixth transistor is configured to reset the gate of the first transistor in response to a first reset signal. Since the first reset signal and a gate driving signal of the fourth transistor are connected to different signal lines, the time of the initialization phase can be independently control, so as to achieve time balance between initialization and data writing phases and achieve a good light-emission effect.

For the above technical problem, some embodiments of the present disclosure provide a display apparatus 30. The display apparatus 30 may be a tablet computer, a monitor, a mobile phone, a billboard, a digital photo frame, a personal digital assistant (PDA), or any other device with a display function.

For example, the display apparatus 30 may be an organic electroluminescent diode (also referred to as organic light-emitting diode, OLED) display apparatus, a quantum dot electroluminescent diode (also referred to as quantum dot light-emitting diode, QLED) display apparatus, or an active matrix organic light-emitting diode (AMOLED) display apparatus. Embodiments of the present disclosure do not limit the specific type of the display apparatus 30. The following embodiments will be described in detail in an example of the OLED display apparatus.

Figure 3:
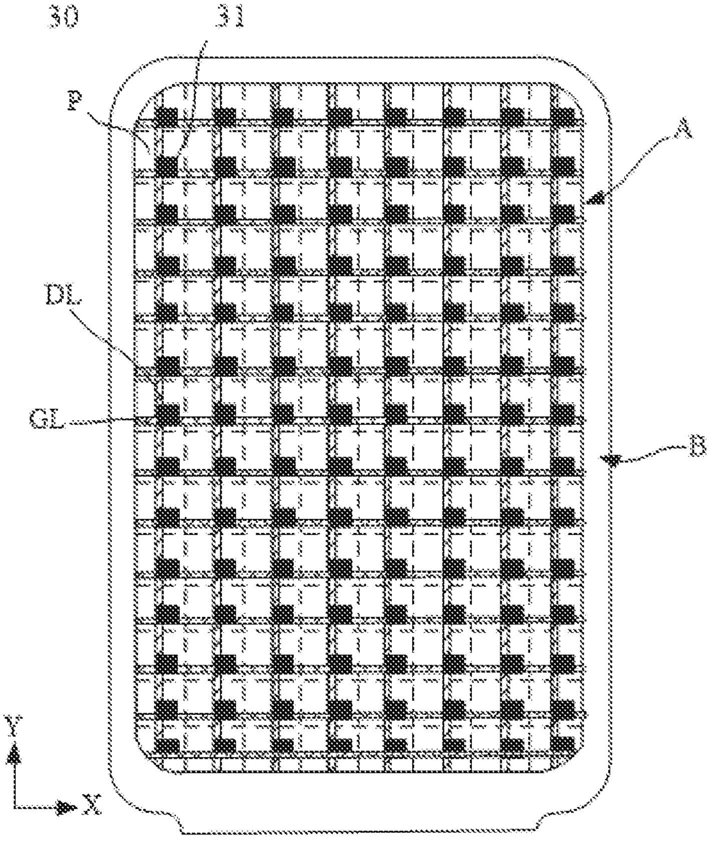
FIG. 3 is a structural diagram of a display panel, in accordance with some embodiments.

As shown in FIG. 3, the display apparatus 30 includes a display area A and a peripheral area B disposed on at least one side of the display area A. The display area A is an area where images are displayed, and the display area A is configured to provide sub-pixels P therein. The peripheral area B is an area where no image is displayed, and the peripheral area B is configured to provide display driver circuits, for example, gate driver circuit(s) and a source driver circuit.

A plurality of sub-pixels P are arranged in a plurality of rows and a plurality of columns. Each row includes multiple sub-pixels P arranged in a first direction X, and each column includes multiple sub-pixels P arranged in a second direction Y. The sub-pixels P in each row may include the multiple sub-pixels P, and the sub-pixels P in each column may include the multiple sub-pixels P.

Here, the first direction X and the second direction Y intersect each other. An included angle between the first direction X and the second direction Y may be set according to actual needs. For example, the included angle between the first direction X and the second direction Y may be 85°, 89° or 90°.

In some embodiments, as shown in FIG. 3, the display apparatus 30 may further include a plurality of gate lines GL and a plurality of data lines DL that are located in the display area A. The plurality of gate lines GL extend in the first direction X, and the plurality of data lines DL extend in the second direction Y.

For example, the sub-pixels P arranged in a row in the first direction X may be referred to as a same row of sub-pixels P, and the sub-pixels P arranged in a column in the second direction Y may be referred to as a same column of sub-pixels P. The same row of sub-pixels P may be electrically connected to a gate line GL, and the same column of sub-pixels P may be electrically connected to a data line DL.

Each sub-pixel P may include a pixel driving circuit 31 and a light-emitting element coupled to the pixel driving circuit 31. A gate line GL may be coupled to multiple pixel driving circuits 31 of a same row of sub-pixels P, and a data line DL may be coupled to multiple pixel driving circuits 31 of a same column of sub-pixels P.

For each sub-pixel P, the pixel driving circuit 31 may receive a GOA driving signal (e.g., a signal of a first light-emission signal control terminal, a signal of a second light-emission signal control terminal, a signal of a third light-emission signal control terminal, a signal of a first signal control terminal, a signal of a second signal control terminal, a signal of a third signal control terminal, a signal of a compensation signal control terminal, a signal of a first reset signal control terminal or a signal of a second reset signal control terminal) through a gate line GL, and receive a voltage signal of a data signal terminal through a data line DL, so that the pixel driving circuit 31 drives the corresponding light-emitting element to emit light according to the voltage signal of the data signal terminal under control of the GOA driving signal.

Figure 4:
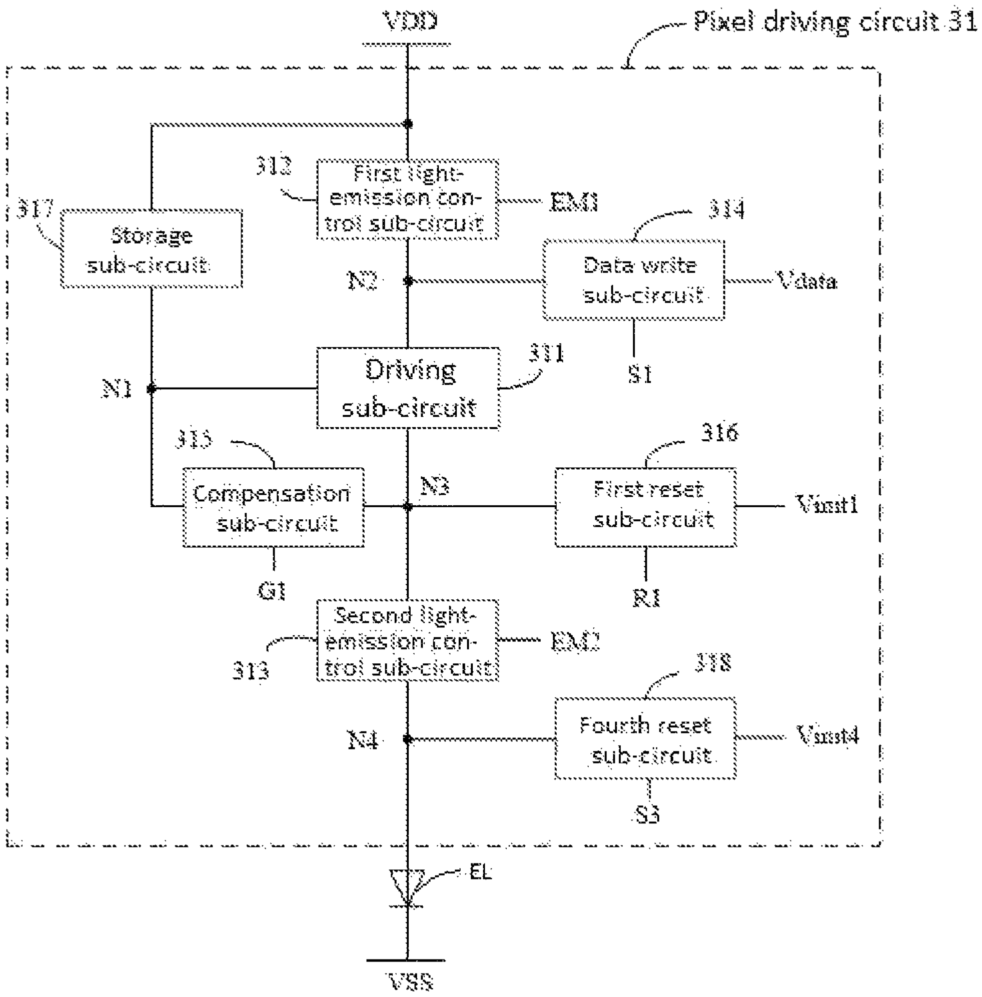
FIG. 4 is a bock diagram of a pixel driving circuit, in accordance with some embodiments.
Figure 5:
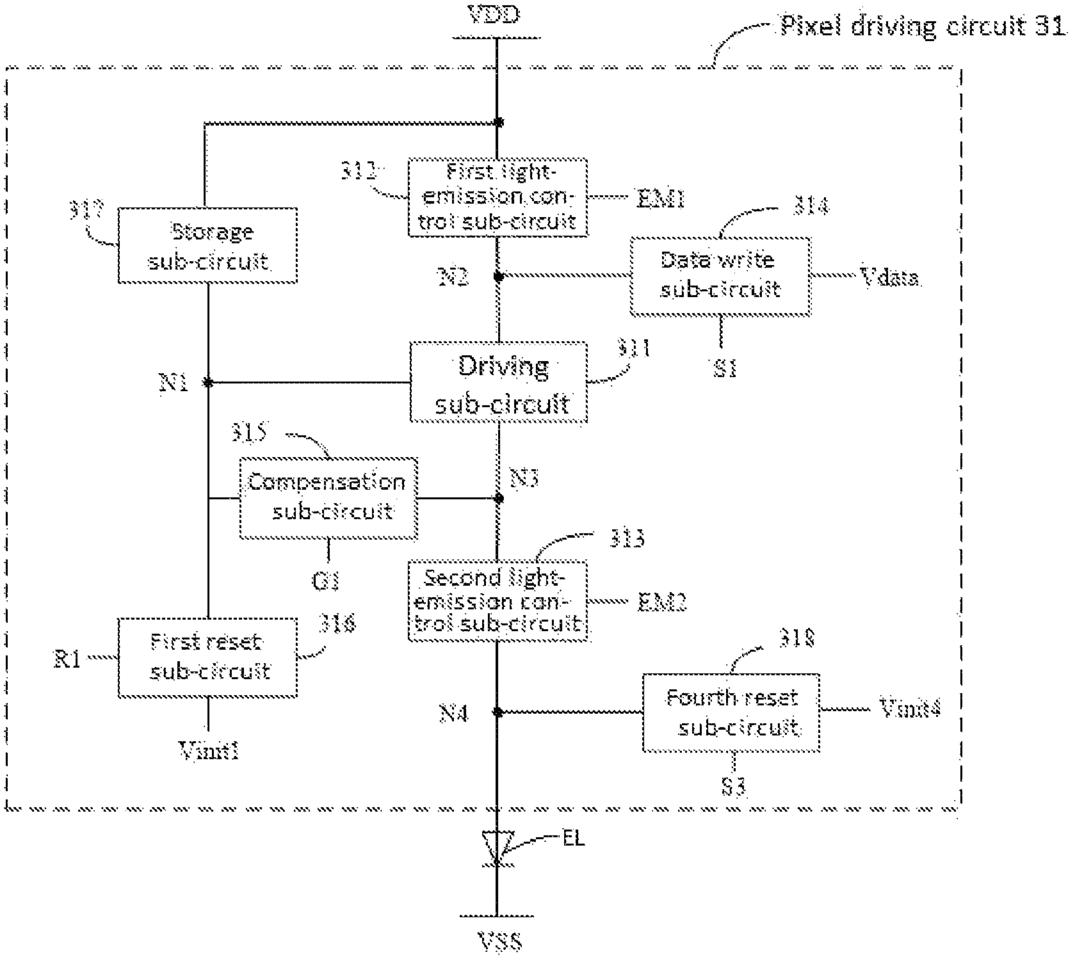
FIG. 5 is a bock diagram of another pixel driving circuit, in accordance with some embodiments.

Some embodiments of the present disclosure provide a pixel driving circuit 31. As shown in FIGS. 4 and 5, the pixel driving circuit 31 includes a driving sub-circuit 311, a first light-emission control sub-circuit 312, a second light-emission control sub-circuit 313, a data write sub-circuit 314, a compensation sub-circuit 315 and a first reset sub-circuit 316. The pixel driving circuit 31 is configured to generate a driving current to control a light-emitting element EL for emitting light.

The driving sub-circuit 311 includes a control terminal, a first terminal and a second terminal. The driving sub-circuit 311 is used to provide the driving current for driving the light-emitting element to emit light. In an initialization phase t1 of a display frame of the pixel driving circuit 31, a voltage difference between the control terminal of the driving sub-circuit 311 and the first terminal of the driving sub-circuit is fixed.

The first light-emission control sub-circuit 312 is coupled to a first voltage terminal VDD and the first terminal of the driving sub-circuit 311, and is configured to drive the light-emitting element to emit light in response to a signal of a first light-emission signal control terminal EM1.

The second light-emission control sub-circuit 313 is coupled to the second terminal of the driving sub-circuit 311 and a first electrode of the light-emitting element, and is configured to drive the light-emitting element to emit light in response to a signal of a second light-emission signal control terminal EM2.

The data write sub-circuit 314 is coupled to a data signal terminal Vdata and the first terminal of the driving sub-circuit 311, and is configured to write a signal of the data signal terminal Vdata into the first terminal of the driving sub-circuit 311 in response to a signal Gate[n] of a first signal control terminal S1.

The compensation sub-circuit 315 is coupled to the second terminal of the driving sub-circuit 311 and the control terminal of the driving sub-circuit 311, and is configured to perform threshold compensation on the driving sub-circuit 311 in response to a signal of a compensation signal control terminal G1.

The first reset sub-circuit 316 is coupled between a second voltage terminal Vinit1 and the control terminal of the driving sub-circuit 311, and is configured to write a signal of the second voltage terminal Vinit1 into the control terminal of the driving sub-circuit 311 in response to a signal of a first reset signal control terminal R1, so as to reset the control terminal of the driving sub-circuit 311.

In some embodiments, the first reset sub-circuit 316 may be coupled between the second voltage terminal Vinit1 and the control terminal of the driving sub-circuit 311 by two circuit structures. The two circuit structures are introduced below.

In the first circuit structure, as shown in FIG. 4, a first terminal of the first reset sub-circuit 316 is coupled to the control terminal of the driving sub-circuit 311 by the compensation sub-circuit 315, and a second terminal of the first reset sub-circuit 316 is coupled to the second voltage terminal Vinit1.

In the second circuit structure, as shown in FIG. 5, the first terminal of the first reset sub-circuit 316 is coupled to the control terminal of the driving sub-circuit 311, and the second terminal of the first reset sub-circuit 316 is coupled to the second voltage terminal Vinit1.

In some embodiments, the first light-emission signal control terminal EM1 and the second light-emission signal control terminal EM2 may be connected to the same GOA driving signal line, or may be connected to different GOA driving signal lines.

For example, in a case where the first light-emission signal control terminal EM1 and the second light-emission signal control terminal EM2 are connected to different GOA driving signal lines, the first light-emission control sub-circuit 312 is configured to write a voltage vdd of the first voltage terminal VDD into the first terminal of the driving sub-circuit 311 in the initialization phase t1, and drive the light-emitting element to emit light in a light-emitting phase t3.

For example, in the pixel driving circuit shown in FIGS. 6, 8, 10 and 12, the first light-emission signal control terminal EM1 and the second light-emission signal control terminal EM2 are connected to different GOA driving signal lines, the signal of the first light-emission signal control terminal EM1 is EM1[*n*], and the signal of the second light-emission signal control terminal EM2 is EM2[*n*].

It can be understood that in the embodiments of the present disclosure, the voltage vdd of the first voltage terminal VDD is written into the first terminal of the driving sub-circuit 311 in the initialization phase t1, thereby ensuring a fixed voltage of the first terminal of the driving sub-circuit 311. Since the voltage of the first terminal of the driving sub-circuit 311 is vdd in the initialization phase t1, and voltages of the control terminal and the second terminal of the driving sub-circuit 311 are close to the voltage vinit1, a gate-source voltage VGS of the driving sub-circuit 311 in the initialization phase t1 is (vinit1−vdd), so that the driving sub-circuit 311 is in a fixed on-bias state. Then, when entering a data writing phase t2, it may ensure that the brightness of the current frame is not affected by the state of the previous frame, thereby improving the short-term after-images problem.

For example, in a case where the first light-emission signal control terminal EM1 and the second light-emission signal control terminal EM2 are connected to the same GOA driving signal line, the pixel driving circuit 31 further includes a third reset sub-circuit 321, and the third reset sub-circuit 321 is coupled to a fourth voltage terminal Vinit3 and the first terminal of the driving sub-circuit 311. The third reset sub-circuit 321 is configured to write a voltage vinit3 of a fourth voltage terminal Vinit3 into the first terminal of the driving sub-circuit 311 in response to a signal of a second signal control terminal S2 in the initialization phase t1, so as to reset the first terminal of the driving sub-circuit 311.

For example, as shown in FIGS. 13, 15, 17 and 18, the first light-emission signal control terminal EM1 and the second light-emission signal control terminal EM2 are connected to the same GOA driving signal line, the signal of the first light-emission signal control terminal EM1 is EM[n], and the signal of the second light-emission signal control terminal EM2 is also EM[n].

It can be understood that in the embodiments of the present disclosure, the voltage vinit3 of the fourth voltage terminal Vinit3 is written into the first terminal of the driving sub-circuit 311 in the initialization phase t1, thereby ensuring a fixed voltage of the first terminal of the driving sub-circuit 311. Since the voltage of the first terminal of the driving sub-circuit 311 is vinit3 in the initialization phase t1, and voltages of the control terminal and the second terminal of the driving sub-circuit 311 are close to the voltage vinit1, a gate-source voltage VGS of the driving sub-circuit 311 in the initialization phase t1 is (vinit1−vinit3), so that the driving sub-circuit 311 is in a fixed on-bias state. Then, when entering the data writing phase t2, it may ensure that the brightness of the current frame is not affected by the state of the previous frame, thereby improving the short-term after-images problem.

In some embodiments, as shown in FIGS. 4 and 5, the pixel driving circuit 31 may further include a storage sub-circuit 317. The storage sub-circuit 317 is coupled to the control terminal of the driving sub-circuit 311 and the first voltage terminal VDD, and is configured to store a compensation signal obtained based on the data signal (the voltage vdata).

In some embodiments, as shown in FIGS. 4 and 5, the pixel driving circuit 31 may further include a fourth reset sub-circuit 318. The fourth reset sub-circuit 318 is coupled to a fifth voltage terminal Vinit4 and the first electrode of the light-emitting element, and is configured to write a voltage vinit4 of the fifth voltage terminal Vinit4 into the first electrode of the light-emitting element in response to a signal of a third signal control terminal S3, so as to reset the first electrode of the light-emitting element.

In some embodiments of the present disclosure, the solution that the voltage difference between the control terminal of the driving sub-circuit 311 and the first terminal of the driving sub-circuit is ensured to be fixed in the initialization phase t1 may be implemented by the pixel driving circuit 31 with one of a variety of different circuit structures. The operation process of each pixel driving circuit 31 will be described below by taking an example where the pixel driving circuit 31 is a pixel driving circuit shown in FIG. 6, 8, 10, 12, 13, 15, 17 or 18.

Figure 6:
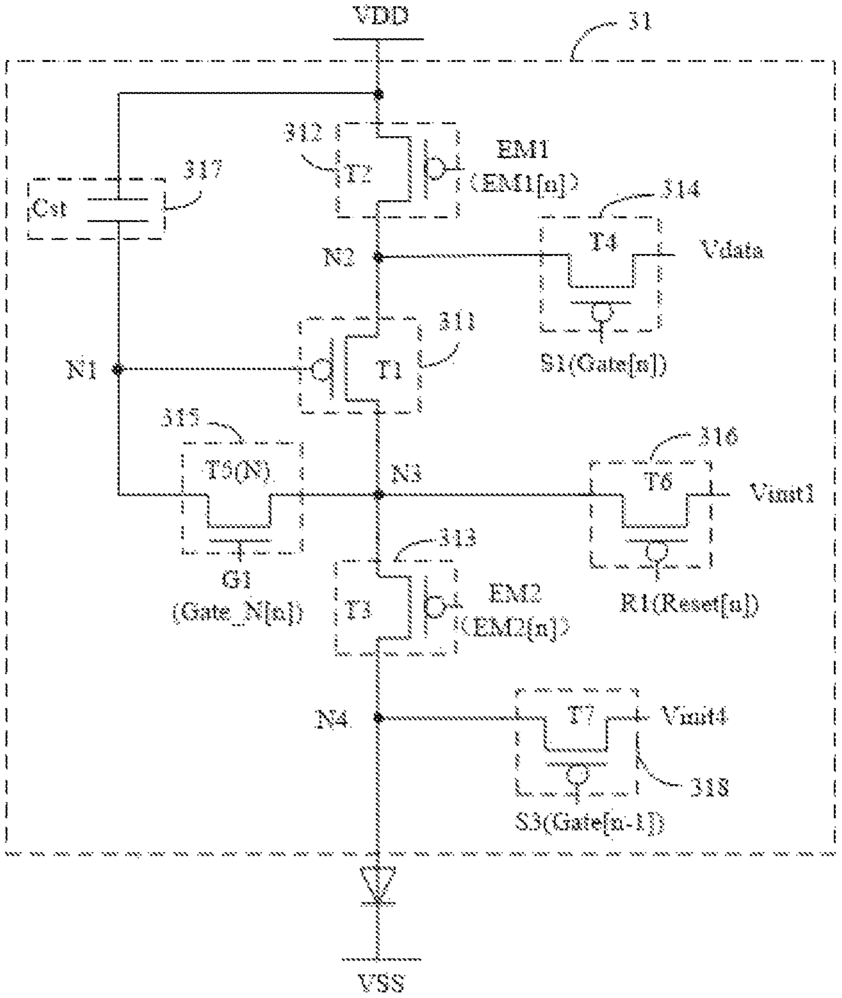
FIG. 6 is a circuit diagram of a pixel driving circuit, in accordance with some embodiments.

As shown in FIG. 6, the driving sub-circuit 311 in the pixel driving circuit 31 includes a first transistor T1. A gate of the first transistor T1 is a control terminal of the driving sub-circuit, a first electrode of the first transistor T1 is a first terminal of the driving sub-circuit 311, and a second electrode of the first transistor T1 is a second terminal of the driving sub-circuit 311. The gate of the first transistor T1 is coupled to a first node N1, the first electrode (a source) of the first transistor T1 is coupled to a second node N2, and the second electrode (a drain) of the first transistor T1 is coupled to a third node N3.

For example, the first transistor T1 may be a driving thin film transistor (DTFT). The present disclosure does not limit the type of the first transistor T1. The first transistor T1 may be a transistor of any type capable of providing a driving current for driving the light-emitting element to emit light.

In some embodiments, as shown in FIG. 6, the first light-emission control sub-circuit 312 includes a second transistor T2. A first electrode of the second transistor T2 is coupled to the first voltage terminal VDD, a second electrode of the second transistor T2 is coupled to the first electrode of the first transistor T1, and a gate of the second transistor T2 is coupled to the first light-emission signal control terminal EM1.

For example, the second transistor T2 may be turned on or off in response to the signal EM1[*n*] of the first light-emission signal control terminal EM1. In the initialization phase t1, when the second transistor T2 is turned on, the connection between the first voltage terminal VDD and the first electrode of the first transistor T1 is conductive, and thus the voltage vdd of the first voltage terminal VDD may be written to the first electrode of the first transistor T1, that is, the voltage of the second node N2 is vdd.

In some embodiments, as shown in FIG. 6, the second light-emission control sub-circuit 313 includes a third transistor T3. A first electrode of the third transistor T3 is coupled to the second electrode of the first transistor T1, a second electrode of the third transistor T3 is coupled to the first electrode of the light-emitting element, and a gate of the third transistor T3 is coupled to the second light-emission signal control terminal EM2.

It can be understood that in the embodiments of the present disclosure, the gate driving signal of the second transistor T2 in the first light-emission control sub-circuit 312 is EM1[*n*], and the gate driving signal of the third transistor T3 in the second light-emission control sub-circuit 313 is EM2[*n*]. That is, the gate driving signal of the second transistor T2 in the first light-emission control sub-circuit 312 is different from the gate driving signal of the third transistor T3 in the second light-emission control sub-circuit 313. Moreover, the second transistor T2 in the first light-emission control sub-circuit 312 is turned on in the initialization phase t1, so that the voltage vdd of the first voltage terminal VDD may be written into the first electrode of the first transistor T1, thereby ensuring that the first electrode of the first transistor T1 has a fixed voltage. Since in the initialization phase t1, the voltage of the first electrode of the first transistor T1 is vdd, and the voltages of the gate and the second electrode of the first transistor T1 are close to the voltage vinit1, a gate-source voltage VGS of the first transistor T1 in the initialization phase t1 is (vinit1−vdd), so that the first transistor T1 is in a fixed on-bias state. Then, when entering the data writing phase t2, it may ensure that the brightness of the current frame is not affected by the state of the previous frame, thereby improving the short-term after-images problem.

In some embodiments, as shown in FIG. 6, the data write sub-circuit 314 includes a fourth transistor T4. A first electrode of the fourth transistor T4 is coupled to the data signal terminal Vdata, a second electrode of the fourth transistor T4 is coupled to the first electrode of the first transistor T1 and the second electrode of the second transistor T2, and a gate of the fourth transistor T4 is coupled to the first signal control terminal S1.

In some embodiments, as shown in FIG. 6, the compensation sub-circuit 315 includes a fifth transistor T5. A first electrode of the fifth transistor T5 is coupled to the gate of the first transistor T1, a second electrode of the fifth transistor T5 is coupled to the second electrode of the first transistor T1, and a gate of the fifth transistor T5 is coupled to the compensation signal control terminal G1.

In some embodiments, as shown in FIG. 6, the first reset sub-circuit 316 includes a sixth transistor T6. A first electrode of the sixth transistor T6 is coupled to the second electrode of the fifth transistor T5, a second electrode of the sixth transistor T6 is coupled to the second voltage terminal Vinit1, and a gate of the sixth transistor T6 is coupled to the first reset signal control terminal R1.

In some embodiments, as shown in FIG. 6, the storage sub-circuit 317 includes a capacitor Cst. An end of the capacitor Cst is coupled to the first voltage terminal VDD, and the other end of the capacitor Cst is coupled to the gate of the first transistor T1. The capacitor Cst is configured to store the compensation signal obtained based on the data signal (the voltage vdata).

In some embodiments, as shown in FIG. 6, the fourth reset sub-circuit 318 includes a seventh transistor T7. A first electrode of the seventh transistor T7 is coupled to the fifth voltage terminal Vinit4, a second electrode of the seventh transistor T7 is coupled to the first electrode of the light-emitting element, and a gate of the seventh transistor T7 is coupled to the third signal control terminal S3. When the seventh transistor T7 is turned on, the voltage vinit4 of the fifth voltage terminal Vinit4 may be written into the first electrode of the light-emitting element, so as to reset the first electrode of the light-emitting element.

In the embodiments of the present disclosure, a first electrode of a transistor may be one of a source and a drain thereof, and a second electrode of the transistor may be the other of the source and the drain thereof. Since the source and the drain of the transistor may be symmetrical in structure, there may be no difference in structure between the source and the drain. That is, there may be no difference in structure between the first electrode and the second electrode of the transistor in the embodiments of the present disclosure. For example, for the P-type transistor, the first electrode of the transistor is a source, and the second electrode of the transistor is a drain. As another example, for the N-type transistor, the first electrode of the transistor is the drain, and the second electrode of the transistor is the source. The present disclosure does not limit whether the types of the first transistor T1 to a tenth transistor T10 (an eighth transistor T8 to the tenth transistor T10 will be introduced in the following contents) are N-type transistors or P-type transistors.

In the embodiments of the present disclosure, a driving period of the pixel driving circuit 31 includes the initialization phase t1, the data writing phase t2 and the light-emitting phase t3. The operation process of the pixel driving circuit 31 shown in FIG. 6 will be described below with reference to FIG. 7 by taking an example where the first transistor T1 to the fourth transistor T4 and the sixth transistor T6 and the seventh transistor T7 are P-type transistors, and the fifth transistor T5 is an N-type transistor.

Figure 7:
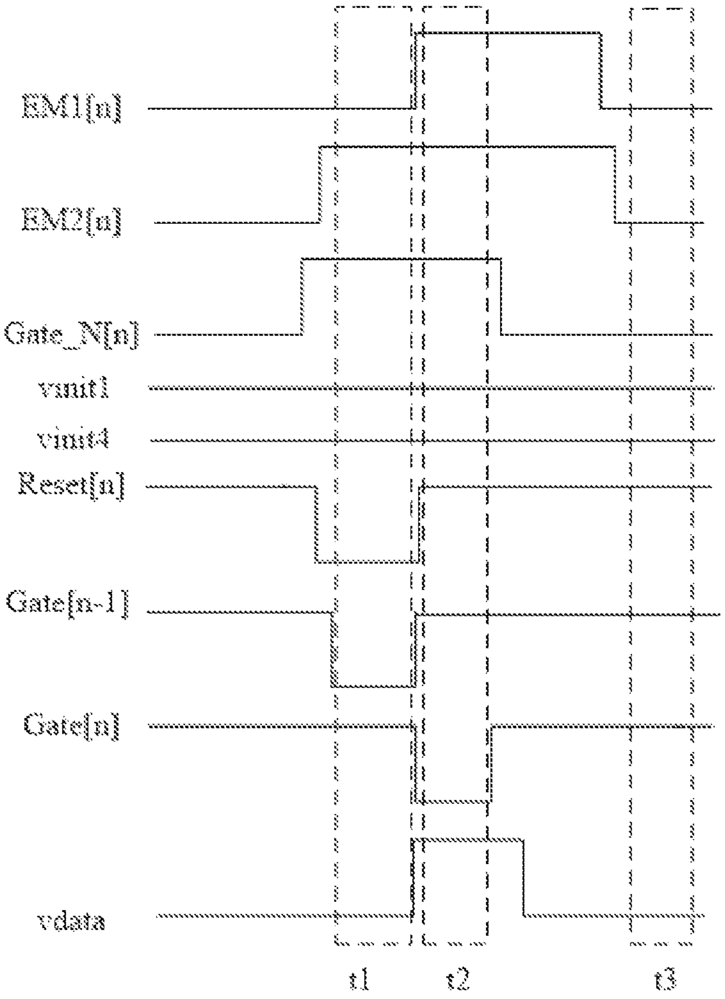
FIG. 7 is a signal timing diagram of a pixel driving circuit, in accordance with some embodiments.

As shown in FIG. 7, in the initialization phase t1, a level of the signal EM1[*n*] of the first light-emission signal control terminal EM1 is a first level (e.g., a low level), and the second transistor T2 is turned on. A level of the signal EM2[*n*] of the second light-emission signal control terminal EM2 is a second level (e.g., a high level), and the third transistor T3 is turned off. A level of the signal Reset[n] of the first reset signal control terminal R1 is the first level, and the sixth transistor T6 is turned on. A level of the signal Gate[n] of the first signal control terminal S1 is the second level, and the fourth transistor T4 is turned off. A level of the signal Gate_N[n] of the compensation signal control terminal G1 is the second level, and the fifth transistor T5 is turned on. A level of the signal Gate[n−1] of the third signal control terminal S3 is the first level, and the seventh transistor T7 is turned on.

As a result, in the initialization phase t1, the voltage vdd of the first voltage terminal VDD may be written into the first electrode of the first transistor T1 through the second transistor T2, that is, the voltage value of the second node N2 is vdd. The voltage vinit1 of the second voltage terminal Vinit1 is written into the gate of the first transistor T1 through the sixth transistor T6 and the fifth transistor T5, that is, the voltage value of the first node N1 is vinit1. In this case, a fixed voltage difference (vinit1−vdd) is generated between the source and the gate of the first transistor T1, and thus the first transistor T1 is in the fixed on-bias state. Then, when entering the data writing phase t2, it may ensure that the brightness of the current frame is not affected by the state of the previous frame, thereby improving the short-term afterimages problem. Moreover, the voltage vinit4 output by the fifth voltage terminal Vinit4 may be provided to the first electrode of the light-emitting element through the turned-on transistor T7, so as to reset the first electrode of the light-emitting element.

In the data writing phase t2, the level of the signal EM1[*n*] of the first light-emission signal control terminal EM1 is the second level, and the second transistor T2 is turned off. The level of the signal EM2[*n*] of the second light-emission signal control terminal EM2 is the second level, and the third transistor T3 is turned off. The level of the signal Reset[n] of the first reset signal control terminal R1 is the second level, and the sixth transistor T6 is turned off. The level of the signal Gate[n] of the first signal control terminal S1 is the first level, a level of the voltage vdata of the data signal terminal Vdata is the second level, and the fourth transistor T4 is turned on. The level of the signal Gate_N[n] of the compensation signal control terminal G1 is the second level, and the fifth transistor T5 is turned on. The level of the signal Gate[n−1] of the third signal control terminal S3 is the second level, and the seventh transistor T7 is turned off.

As a result, in the data writing phase t2, the voltage vdata of the data signal terminal Vdata may be written into the first electrode of the first transistor T1 through the fourth transistor T4. The fifth transistor T5 is turned on to allow the first transistor T1 to form a diode connection, so that the voltage vdata of the first electrode of the first transistor T1 charges the gate of the first transistor T1 until the voltage of the gate of the first transistor T1 is (vdata+Vth). The voltage (vdata+Vth) of the gate of the first transistor T1 is stored by the capacitor Cst.

In the light-emitting phase 13, the level of the signal EM1[*n*] of the first light-emission signal control terminal EM1 is the first level, and the second transistor T2 is turned on. The level of the signal EM2[*n*] of the second light-emission signal control terminal EM2 is the first level, and the third transistor T3 is turned on. The level of the signal Reset[n] of the first reset signal control terminal R1 is the second level, and the sixth transistor T6 is turned off. The level of the signal Gate[n] of the first signal control terminal S1 is the second level, and the fourth transistor T4 is turned off. The level of the signal Gate_N[n] of the compensation signal control terminal G1 is the first level, and the fifth transistor T5 is turned off. The level of the signal Gate[n−1]

of the third signal control terminal S3 is the second level, and the seventh transistor T7 is turned off.

As a result, in the light-emitting phase t3, the first transistor T1, the second transistor T2 and the third transistor T3 are turned on, and the fourth transistor T4, the fifth transistor T5, the sixth transistor T6 and the seventh transistor T7 are turned off, so that the voltage vdd output by the voltage terminal VDD may be provided to the first electrode of the light-emitting element through the second transistor T2, the first transistor T1 and the third transistor T3, so as to drive the light-emitting element to emit light. In addition, in the light-emitting phase t3, the voltage of the first electrode of the first transistor T1 is vdata. Based on the holding effect of the capacitor Cst, the voltage of the gate of the first transistor T1 is (vdata+Vth), which may make the first transistor T1 in a saturated state. As a result, the first transistor T1 generates a driving current Ids, which is equal to $K\times(Vgs-Vth)^2$, is equal to $K\times((vdata+Vth-vdd)-Vth)^2$, and is equal to $K\times(vdata-vdd)^2$ (i.e., $Ids=K\times(Vgs\times Vth)^2=K\times((vdata+Vth-vdd)-Vth)^2=K\times(vdata-vdd)^2$), where K is a structural constant related to process and design. Therefore, the driving current generated by the first transistor T1 is not affected by the threshold voltage Vth of the first transistor T1, and thus the brightness unevenness (mura) of the display panel caused by uneven Vth may be improved.

In some embodiments, the sixth transistor T6 in the pixel driving circuit 31 shown in FIG. 6 may alternatively be an N-type transistor. In a case where the sixth transistor T6 is the N-type transistor, the difference from the signal timing diagram shown in FIG. 7 is that in the initialization phase t1, the level of the signal Reset[n] of the first reset signal control terminal R1 is a high level, and the sixth transistor T6 is turned on; and in the data writing phase t2 and the light emitting phase t3, the level of the signal Reset[n] of the first reset signal control terminal R1 is a low level, and the sixth transistor T6 is turned off.

It can be understood that, the gate driving signal of the sixth transistor T6 in the pixel driving circuit 31 shown in FIG. 6 is Reset[n], and the gate driving signal of the fourth transistor T4 is Gate[n]. That is, the gate driving signal of the sixth transistor T6 is no longer the previous-stage signal of the gate driving signal Gate[n] of the transistor T4. Therefore, the pulse width of the gate driving signal of the sixth transistor T6 may be modulated, so that the time of the initialization phase can be independently controlled, thereby realizing the time balance between the initialization phase and the data writing phase, and achieving a good light-emission effect.

In some embodiments, in the initialization phase, the third transistor T3 and the fourth transistor T4 are turned off, and the first transistor T1, the second transistor T2, the fifth transistor T5, the sixth transistor T6 and the seventh transistor T7 are turned on. Since the voltage vdd of the first voltage terminal VDD may be written into the second node N2 through the second transistor T2, in this case, the first node N1, the second node N2 and the third node N3 are short-circuited, and a voltage division of the second transistor T2 makes the voltage value of the second node N2 slightly lower than vdd, and the voltage values of the first and third nodes N1 and N3 slightly higher than vinit1. As a result, a little power consumption will be generated, but the fixed voltage difference generated between the gate and the source of the first transistor T1 is not affected, and the on-bias effect is also not affected.

Figure 8:
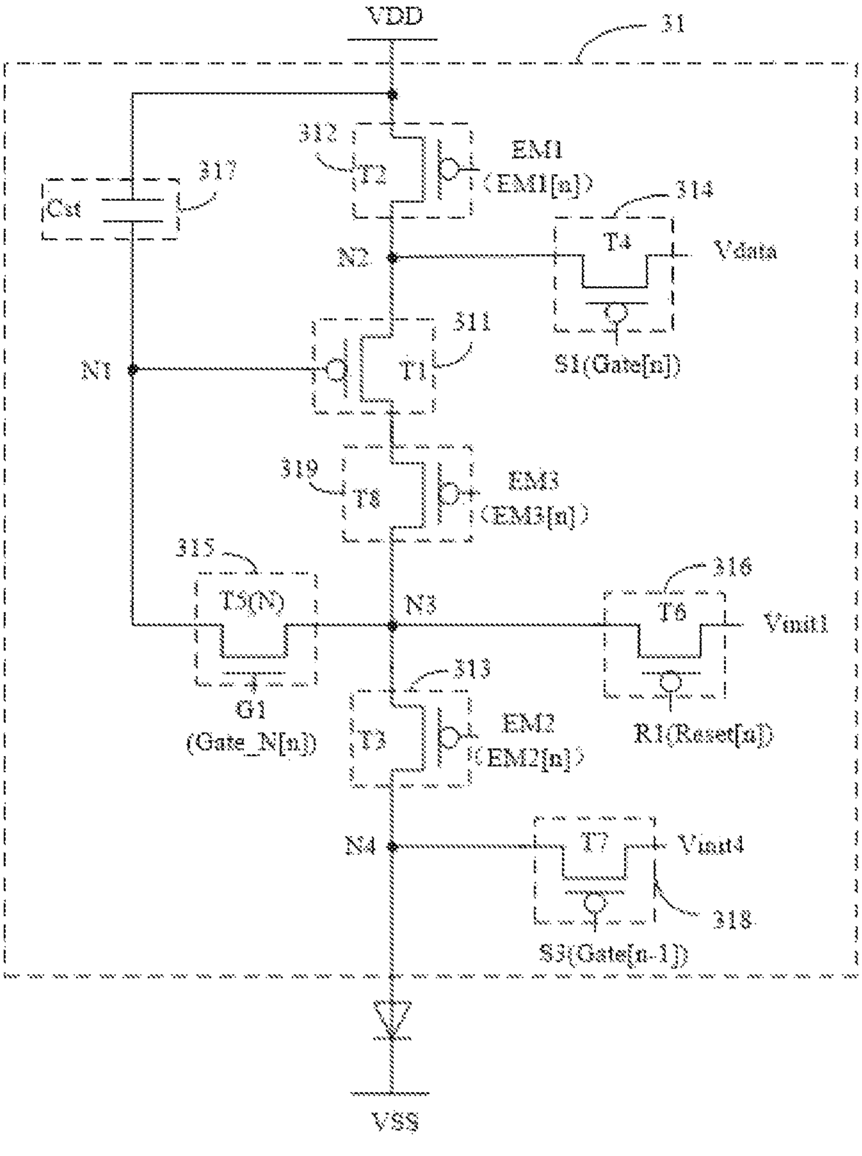
FIG. 8 is a circuit diagram of another pixel driving circuit, in accordance with some embodiments.

In order to ensure that the first node N1 and the second node N2 are initialized synchronously in the initialization phase t1 and thus the short-term afterimage problem may further be improved, some embodiments of the present disclosure further provide a pixel driving circuit 31 shown in FIG. 8.

As shown in FIG. 8, in addition to the circuit shown in FIG. 6, the pixel driving circuit 31 may further include a third light-emission control sub-circuit 319. The third light-emission control sub-circuit 319 is coupled to the second terminal of the driving sub-circuit 311 and the first terminal of the first reset sub-circuit 316. The third light-emission control sub-circuit 319 is configured to, in response to a signal EM3[*n*] of a third light-emission signal control terminal EM3, initialize synchronously the control terminal of the driving sub-circuit 311 and the first terminal of the driving sub-circuit 311 in the initialization phase t1, and drive the light-emitting element to emit light in the light-emitting phase t3.

As shown in FIG. 8, the third light-emission control sub-circuit 319 includes an eighth transistor T8. A first electrode of the eighth transistor T8 is coupled to the second electrode of the first transistor T1, a second electrode of the eighth transistor T8 is coupled to the first electrode of the sixth transistor T6, the first electrode of the third transistor T3 and the second electrode of the fifth transistor T5, and a gate of the eighth transistor T8 is coupled to the third light-emission signal control terminal EM3.

The operation process of the pixel driving circuit 31 shown in FIG. 8 in a display frame is similar to the operation process of the pixel driving circuit 31 shown in FIG. 6 in a display frame. The difference between the operation process of the pixel driving circuit 31 shown in FIG. 8 in the display frame and the operation process of the pixel driving circuit 31 shown in FIG. 6 in the display frame will be described below with reference to FIG. 9.

Figure 9:
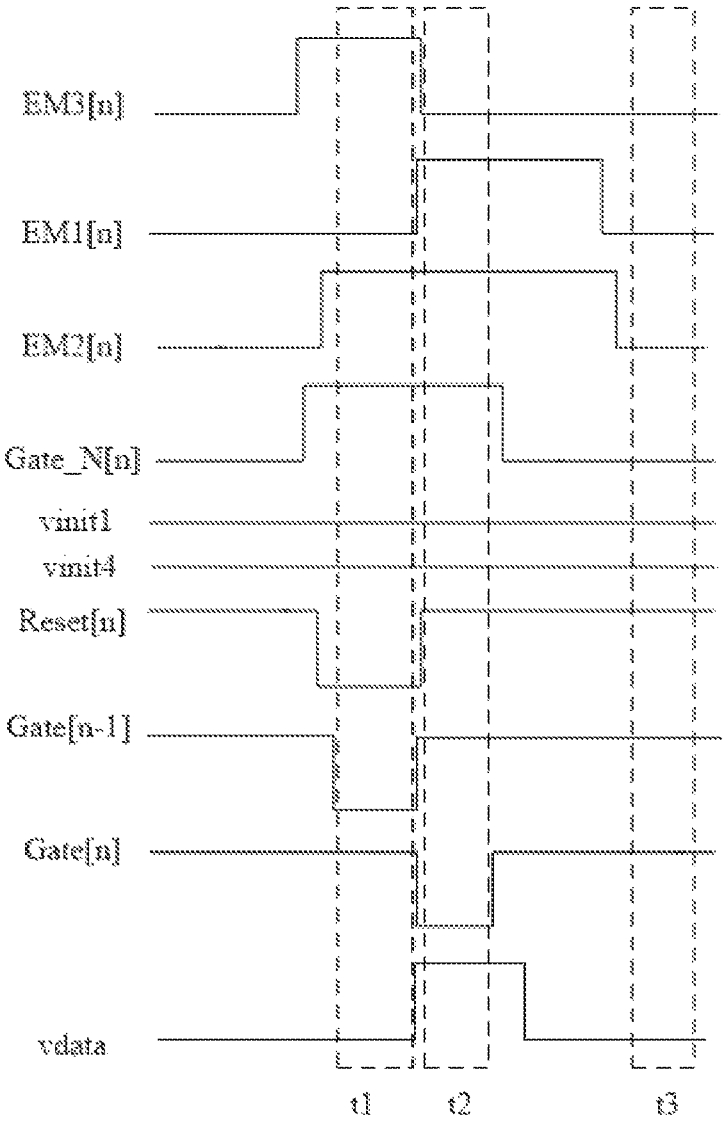
FIG. 9 is a signal timing diagram of another pixel driving circuit, in accordance with some embodiments.

In combination with FIG. 8 and as shown in FIG. 9, in the initialization phase t1, the level of the signal EM3[*n*] of the third light-emission signal control terminal EM3 is the second level, and the eighth transistor T8 is turned off. Therefore, in the initialization phase t1, the first node N1 and the second node N2 may be initialized synchronously, so as to ensure that the gate and the source of the first transistor T1 generate a stable voltage difference, thereby achieving a rather good on-bias effect and further improving the afterimage problem.

In combination with FIG. 8 and as shown in FIG. 9, in the data writing phase t2, the level of the signal EM3[*n*] of the third light-emission signal control terminal EM3 may be the first level or the second level. In a case where the level of the signal EM3[*n*] of the third light-emission signal control terminal EM3 is the first level, the eighth transistor T8 is turned on. In a case where the level of the signal EM3[*n*] of the third light-emission signal control terminal EM3 is the second level, the eighth transistor T8 is turned off. FIG. 9 is exemplarily illustrated by taking an example where the level of the signal EM3[*n*] of the third light-emission signal control terminal EM3 is the first level in the data writing phase t2.

In combination with FIG. 8 and as shown in FIG. 9, in the light-emitting phase t3, the level of the signal EM3[*n*] of the third light-emission signal control terminal EM3 is the first level, and the eighth transistor T8 is turned on. Therefore, in the light-emitting phase t3, the first transistor T1, the second transistor T2, the third transistor T3 and the eighth transistor T8 are turned on, and the fourth transistor T4 to the seventh transistor T7 are turned off, so that a current path is formed between the first voltage terminal VDD and a voltage terminal VSS of the pixel driving circuit, so as to drive the light-emitting element to emit light.

It can be understood that the pixel driving circuit 31 shown in FIG. 8 adds the eighth transistor T8 on a basis of the pixel driving circuit 31 shown in FIG. 6. Therefore, except for the gate driving signal of the eighth transistor T8 (e.g., the signal EM3[*n*] of the third light-emission signal control terminal EM3), the control methods and operation processes of the gate driving signals of other transistors in each phase are the same as the operation process of the pixel driving circuit 31 shown in FIG. 6 in a display frame.

Figure 10:
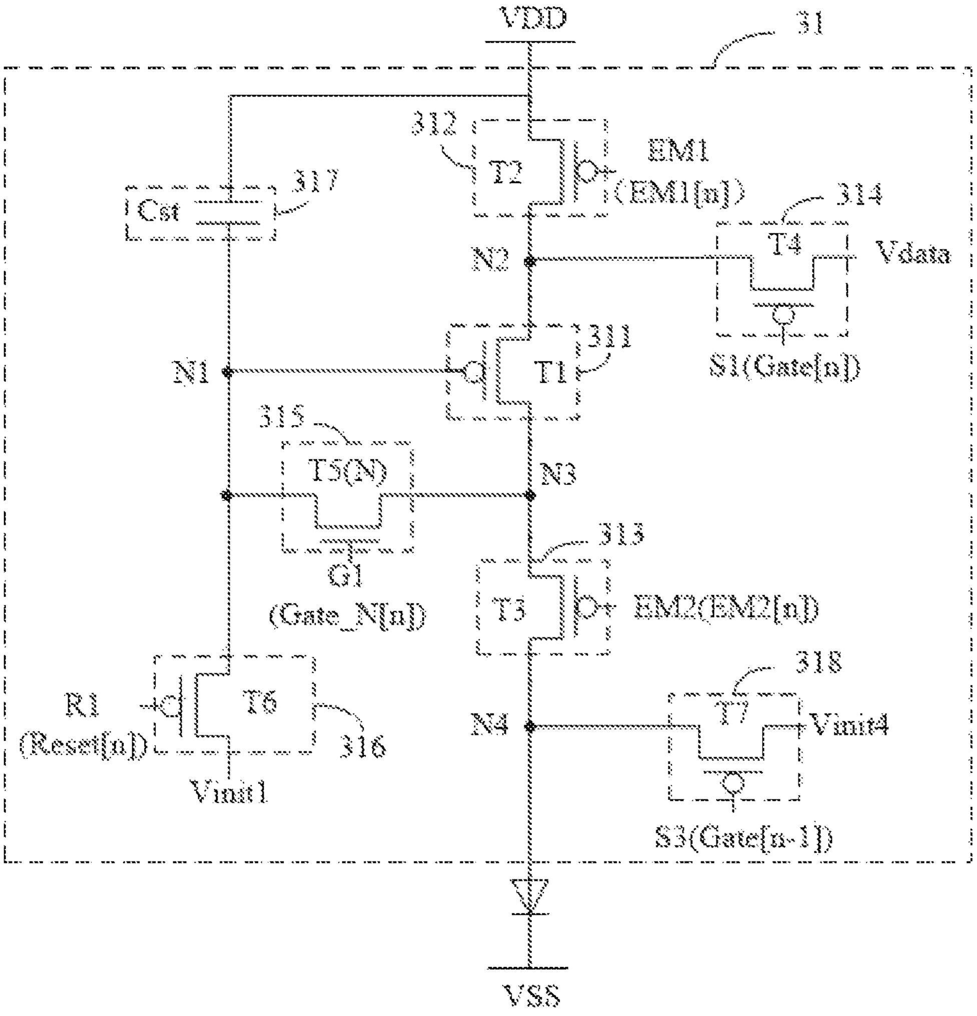
FIG. 10 is a circuit diagram of yet another pixel driving circuit, in accordance with some embodiments.

Some embodiments of the present disclosure further provide a pixel driving circuit 31. As shown in FIG. 10, the pixel driving circuit 31 has a similar structure to the pixel driving circuit 31 shown in FIG. 6. The difference between the pixel driving circuit 31 shown in FIG. 10 and the pixel driving circuit 31 shown in FIG. 6 lies in that the first reset sub-circuit 316 has a different connection manner. The difference between a structure of the pixel driving circuit 31 shown in FIG. 10 and the structure of the pixel driving circuit 31 shown in FIG. 6 will be described below.

In some embodiments, as shown in FIG. 10, the first reset sub-circuit 316 includes a sixth transistor T6. A first electrode of the sixth transistor T6 is coupled to the gate of the first transistor T1 and the first electrode of the fifth transistor T5, a second electrode of the sixth transistor T6 is coupled to the second voltage terminal Vinit1, and a gate of the sixth transistor T6 is coupled to the first reset signal control terminal R1.

For example, the sixth transistor T6 may be turned on or off in response to the signal Reset[n] of the first reset signal control terminal R1. In a case where the sixth transistor T6 is turned off, the voltage vinit1 of the second voltage terminal Vinit1 cannot be written into the gate of the first transistor T1, and the gate of the first transistor T1 cannot be reset. In a case where the sixth transistor T6 is turned on, the voltage vinit1 of the second voltage terminal Vinit1 can be written into the gate of the first transistor T1, and the gate of the first transistor T1 can be reset.

The operation process of the pixel driving circuit 31 shown in FIG. 10 will be described below with reference to FIG. 11 by taking an example where the first transistor T1 to the fourth transistor T4 and the sixth transistor T6 and the seventh transistor T7 are P-type transistors, and the fifth transistor T5 is an N-type transistor.

Figure 11:
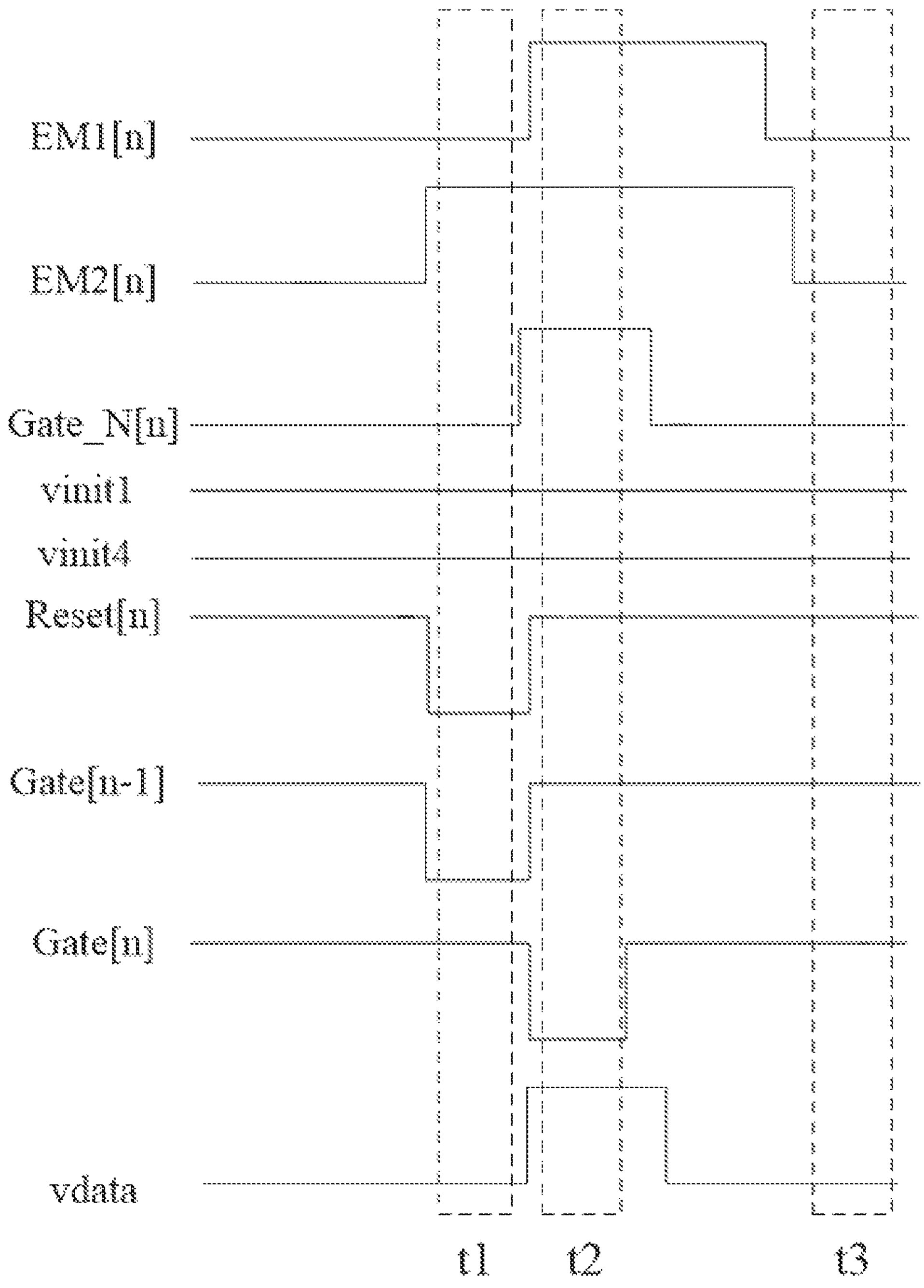
FIG. 11 is a signal timing diagram of yet another pixel driving circuit, in accordance with some embodiments.

As shown in FIG. 11, in the initialization phase t1, the level of the signal EM1[*n*] of the first light-emission signal control terminal EM1 is a low level, and the second transistor T2 is turned on. The level of the signal EM2[*n*] of the second light-emission signal control terminal EM2 is a high level, and the third transistor T3 is turned off. The level of the signal Reset[n] of the first reset signal control terminal R1 is a low level, and the sixth transistor T6 is turned on. The level of the signal Gate[n] of the first signal control terminal S1 is a high level, and the fourth transistor T4 is turned off. The level of the signal Gate_N[n] of the compensation signal control terminal G1 is a low level, and the fifth transistor T5 is turned off. The level of the signal Gate[n−1] of the third signal control terminal S3 is a low level, and the seventh transistor T7 is turned on.

As a result, in the initialization phase t1, the voltage vdd of the first voltage terminal VDD may be written into the first electrode of the first transistor T1 through the second transistor T2, that is, the voltage value of the second node N2 is vdd. The voltage vinit1 of the second voltage terminal Vinit1 is written into the gate of the first transistor T1 through the sixth transistor T6, that is, the voltage value of the first node N1 is vinit1. In this case, a fixed voltage difference (vinit1−vdd) is generated between the source and the gate of the first transistor T1, and thus the first transistor T1 is in the fixed on-bias state. Then, when entering the data writing phase, it may ensure that the brightness of the current frame is not affected by the state of the previous frame, thereby improving the short-term afterimages problem. Moreover, the voltage vinit4 of the fifth voltage terminal Vinit4 may be provided to the first electrode of the light-emitting element through the turned-on transistor T7, so as to reset the first electrode of the light-emitting element.

As shown in FIG. 11, in the data writing phase t2, the level of the signal EM1[*n*] of the first light-emission signal control terminal EM1 is a high level, and the second transistor T2 is turned off. The level of the signal EM2[*n*] of the second light-emission signal control terminal EM2 is the high level, and the third transistor T3 is turned off. The level of the signal Reset[n] of the first reset signal control terminal R1 is a high level, and the sixth transistor T6 is turned off. The level of the signal Gate[n] of the first signal control terminal S1 is a low level, and the fourth transistor T4 is turned on. The level of the signal Gate_N[n] of the compensation signal control terminal G1 is a high level, and the fifth transistor T5 is turned on. The level of the signal Gate[n−1] of the third signal control terminal S3 is a high level, and the seventh transistor T7 is turned off.

As a result, in the data writing phase t2, the voltage vdata of the data signal terminal Vdata may be written into the first electrode of the first transistor T1 through the fourth transistor T4. The fifth transistor T5 is turned on to allow the first transistor T1 to form a diode connection, so that the voltage vdata of the first electrode of the first transistor T1 charges the gate of the first transistor T1 until the voltage of the gate of the first transistor T1 is (vdata+Vth). The voltage (vdata+Vth) of the gate of the first transistor T1 is stored by the capacitor Cst.

As shown in FIG. 11, in the light-emitting phase t3, the level of the signal EM1[*n*] of the first light-emission signal control terminal EM1 is the low level, and the second transistor T2 is turned on. The level of the signal EM2[*n*] of the second light-emission signal control terminal EM2 is the low level, and the third transistor T3 is turned on. The level of the signal Reset[n] of the first reset signal control terminal R1 is the high level, and the sixth transistor T6 is turned off. The level of the signal Gate[n] of the first signal control terminal S1 is the high level, and the fourth transistor T4 is turned off. The level of the signal Gate_N[n] of the compensation signal control terminal G1 is the low level, and the fifth transistor T5 is turned off. The level of the signal Gate[n−1] of the third signal control terminal S3 is the high level, and the seventh transistor T7 is turned off.

As a result, in the light-emitting phase t3, the first transistor T1, the second transistor T2 and the third transistor T3 are turned on, and the fourth transistor T4, the fifth transistor T5, the sixth transistor T6 and the seventh transistor T7 are turned off, so that the voltage vdd output by the voltage terminal VDD may be provided to the first electrode of the light-emitting element through the first transistor T1 to the third transistor T3, so as to drive the light-emitting element to emit light. In addition, in the light-emitting phase t3, the voltage of the first electrode of the first transistor T1 is vdata. Based on the holding effect of the capacitor Cst, the voltage of the gate of the first transistor T1 is (vdata+Vth), which may make the first transistor T1 in a saturated state. As a result, the first transistor T1 generates a driving current Ids, which is equal to $K\times(Vgs-Vth)^2$, is equal to $K\times((vdata+Vth-vdd)-Vth)^2$, and is equal to $K\times(vdata-vdd)^2$ (i.e., $Ids=K\times(Vgs-Vth)^2=K\times((vdata+Vth-vdd)-Vth)^2=K\times(vdata-vdd)^2$), where K is a structural constant related to process and design. Therefore, the driving current generated by the first transistor T1 is not affected by the threshold voltage Vth of the first transistor T1, and thus the brightness unevenness (mura) of the display panel caused by uneven Vth may be improved.

Figure 12:
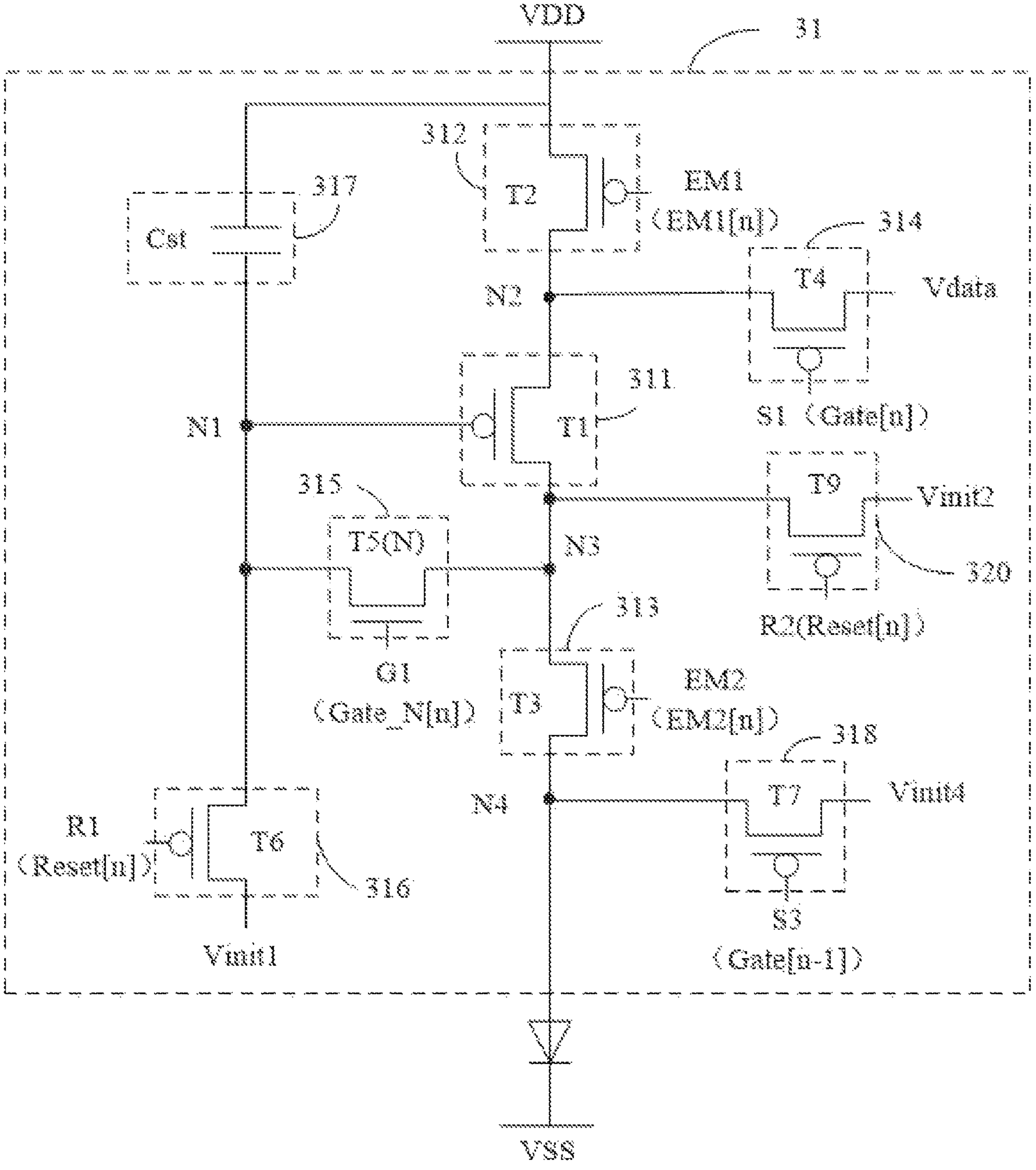
FIG. 12 is a circuit diagram of yet another pixel driving circuit, in accordance with some embodiments.

In order to ensure that the first node N1, the second node N2 and the third node N3 are initialized synchronously in the initialization phase t1 and thus the short-term afterimage problem may further be improved, some embodiments of the present disclosure further provide a pixel driving circuit 31 shown in FIG. 12.

As shown in FIG. 12, in addition to the circuit shown in FIG. 10, the pixel driving circuit 31 may further include a second reset sub-circuit 320. The second reset sub-circuit 320 is coupled to the second terminal of the driving sub-circuit 311 and a third voltage terminal Vinit2. The second reset sub-circuit 320 is configured to reset the second terminal of the driving sub-circuit 311 in response to a signal Reset[n] of the second reset signal control terminal R2.

As shown in FIG. 12, the second reset sub-circuit 320 includes a ninth transistor T9. A first electrode of the ninth transistor T9 is coupled to the third voltage terminal Vinit2, a second electrode of the ninth transistor T9 is coupled to the second electrode of the first transistor T1, and a gate of the ninth transistor T9 is coupled to the second reset signal control terminal R2.

The operation process of the pixel driving circuit 31 shown in FIG. 12 in a display frame is similar to the operation process of the pixel driving circuit 31 shown in FIG. 10 in a display frame. The difference between the operation process of the pixel driving circuit 31 shown in FIG. 12 in the display frame and the operation process of the pixel driving circuit 31 shown in FIG. 10 in the display frame will be described below with reference to FIG. 11.

In combination with FIG. 12 and as shown in FIG. 11, in the initialization phase t1, a level of the signal Reset[n] of the second reset signal control terminal R2 is a low level, and the ninth transistor T9 is turned on. Thus, in the initialization phase t1, the first node N1, the second node N2 and the third node N3 may be initialized synchronously, so as to ensure a stable voltage difference generated by the first transistor T1, thereby achieving a rather good on-bias effect and further improving the afterimage problem.

In combination with FIG. 12 and as shown in FIG. 11, in the data writing phase t2 and the light emitting phase t3, the level of the signal Reset[n] of the second reset signal control terminal R2 is a high level, and the ninth transistor T9 is turned off.

It can be understood that the pixel driving circuit 31 shown in FIG. 12 adds the ninth transistor T9 on a basis of the pixel driving circuit 31 shown in FIG. 10, and the gate driving signal of the ninth transistor T9 is Reset[n]. Therefore, the operation process of the pixel driving circuit 31 shown in FIG. 12 is the same as the operation process of the pixel driving circuit 31 shown in FIG. 10 in a display frame, that is, the signal timing diagram of the driving method for the pixel driving circuit 31 shown in FIG. 12 is as shown in FIG. 11.

Figure 13:
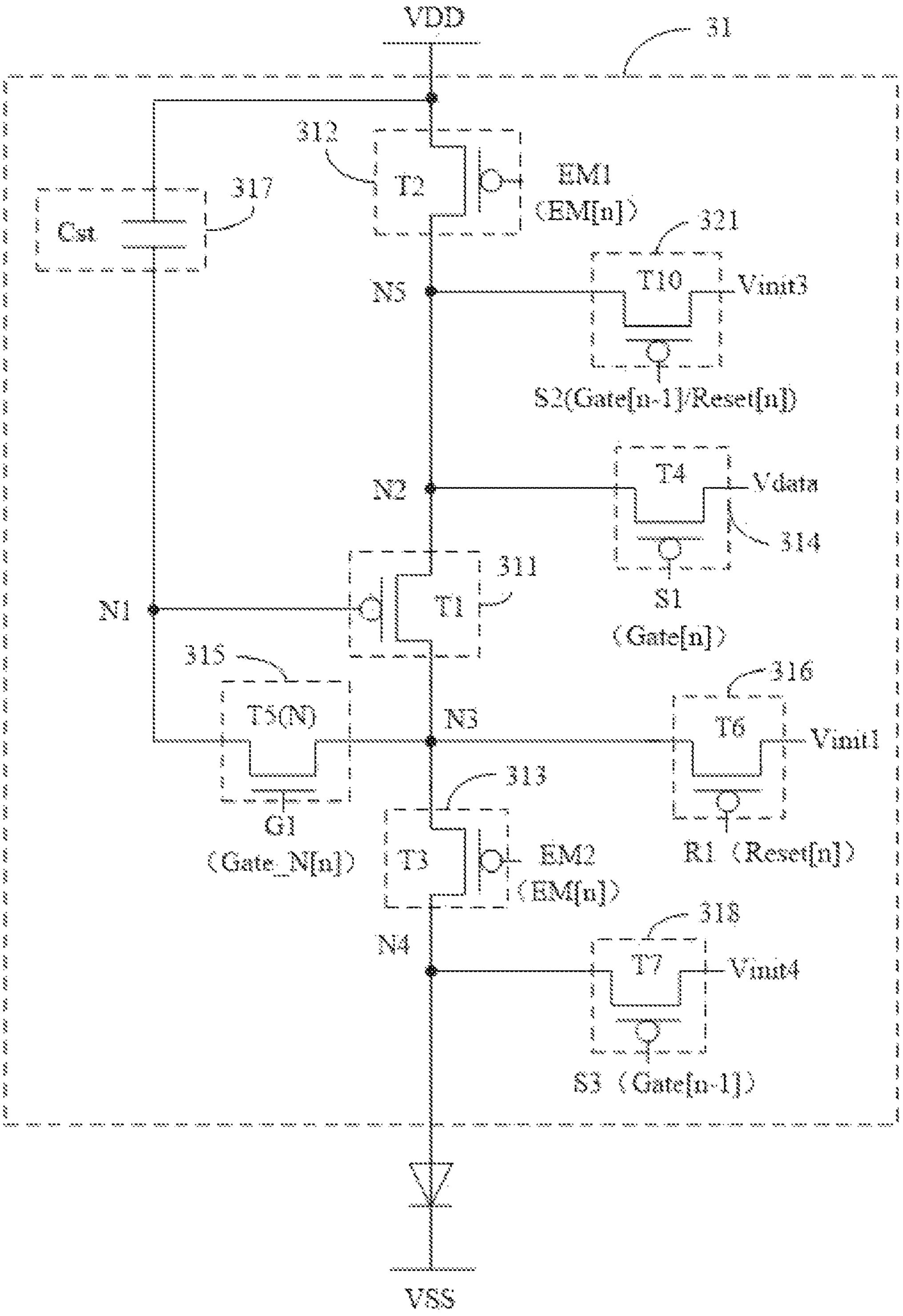
FIG. 13 is a circuit diagram of yet another pixel driving circuit, in accordance with some embodiments.

Some embodiments of the present disclosure further provide a pixel driving circuit 31. As shown in FIG. 13, in addition to the circuit shown in FIG. 6, the pixel driving circuit 31 may further include a third reset sub-circuit 321. The third reset sub-circuit 321 is coupled to the second terminal of the first light-emission control sub-circuit 312 and a fourth voltage terminal Vinit3. The third reset sub-circuit 321 is configured to, in response to a signal Gate[n−1] or Reset[n] of a second signal control terminal S2, write a voltage vinit3 of the fourth voltage terminal Vinit3 into the first terminal of the driving sub-circuit 311 in the initialization phase t1, so as to reset the first terminal of the driving sub-circuit 311.

As shown in FIG. 13, the third reset sub-circuit 321 includes a tenth transistor T10. A first electrode of the tenth transistor T10 is coupled to the fourth voltage terminal Vinit3, a second electrode of the tenth transistor T10 is coupled to the second electrode of the second transistor T2, the first electrode of the first transistor T1 and the second electrode of the fourth transistor T4, and a gate of the tenth transistor T10 is coupled to the second signal control terminal S2.

It can be understood that, the difference from the pixel driving circuit 31 shown in FIG. 6 is that in the pixel driving circuit shown in FIG. 13, the first light-emission signal control terminal EM1 of the second transistor T2 and the second light-emission signal control terminal EM2 of the third transistor T3 may be connected to the same signal line. For example, the signal of the first light-emission signal control terminal EM1 of the second transistor T2 is EM[n], and the signal of the second light-emission signal control terminal EM2 of the third transistor T3 is also EM[n].

The operation process of the pixel driving circuit 31 shown in FIG. 13 will be described below with reference to FIG. 14A by taking an example where the first transistor T1 to the fourth transistor T4, the sixth transistor T6 and the seventh transistor T7, the ninth transistor T9 and the tenth transistor T10 are P-type transistors, the fifth transistor T5 is an N-type transistor, and the gate driving signal of the tenth transistor T10 is Reset[n].

Figure 14A:
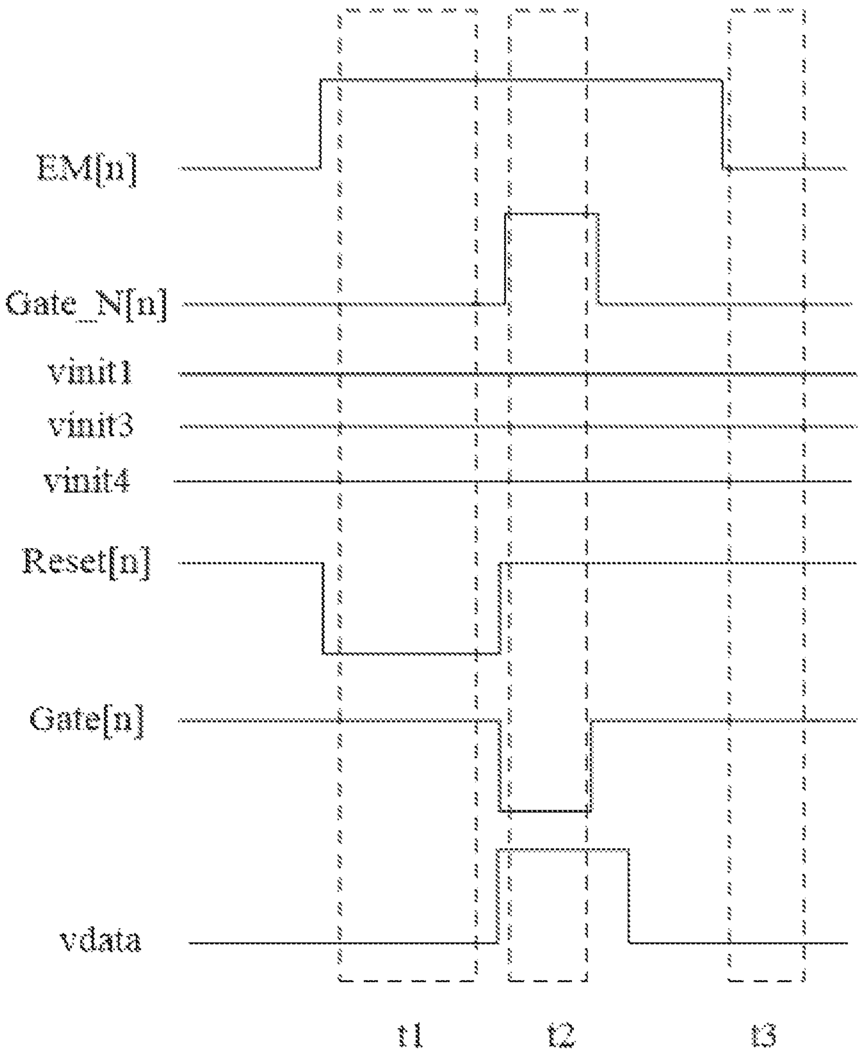
FIG. 14A is a signal timing diagram of yet another pixel driving circuit, in accordance with some embodiments.

As shown in FIG. 14A, in the initialization phase t1, the level of the signal EM[n] of both the first light-emission signal control terminal EM1 and the second light-emission signal control terminal EM2 is a high level, and the second transistor T2 and the third transistor T3 are both turned off. The level of the signal Gate_N[n] of the compensation signal control terminal G1 is a high level, and the fifth transistor T5 is turned on. The level of the signal Reset[n] of both the first reset signal control terminal R1 and the second signal control terminal S2 is a low level, and the sixth transistor T6 and the tenth transistor T10 are both turned on. The level of the signal Gate[n−1] of the third signal control terminal S3 is a low level, and the seventh transistor T7 is turned on. The level of the signal Gate[n] of the first signal control terminal S1 is a high level, and the fourth transistor T4 is turned off.

As a result, in the initialization phase t1, the voltage vinit3 of the fourth voltage terminal Vinit3 may be written into the first electrode of the first transistor T1, that is, the voltage value of the second node N2 is vinit3. The voltage vinit1 of the second voltage terminal Vinit1 is written into the gate of the first transistor T1 through the sixth transistor T6 and the fifth transistor T5, that is, the voltage value of the first node N1 is vinit1. In this case, a fixed voltage difference (vinit1−vinit3) is generated between the source and the gate of the first transistor T1, and thus the first transistor T1 is in the fixed on-bias state. Moreover, the voltage vinit4 output by the fifth voltage terminal Vinit4 may be provided to the first electrode of the light-emitting element through the turned-on transistor T7, so as to reset the first electrode of the light-emitting element.

In some embodiments, the voltage vinit3 of the fourth voltage terminal Vinit3 is higher than the voltage vdd of the first voltage terminal VDD. Therefore, in the initialization phase t1, the voltage vinit3 of the fourth voltage terminal Vinit3 may be written into the first electrode of the first transistor T1, and thus the first transistor T1 is in the fixed on-bias state, so that the brightness of the current frame is not affected by the state of the previous frame. For example, the voltage vinit3 of the fourth voltage terminal Vinit3 may be 5V. As shown in FIG. 14A, in the data writing phase t2, the level of the signal EM[n] of both the first light-emission signal control terminal EM1 and the second light-emission signal control terminal EM2 is the high level, and the second transistor T2 and the third Transistor T3 are both turned off. The level of the signal Gate_N[n] of the compensation signal control terminal G1 is the high level, and the fifth transistor T5 is turned on. The level of the signal Reset[n] of both the first reset signal control terminal R1 and the second signal control terminal S2 is a high level, and the sixth transistor T6 and the tenth transistor T10 are both turned off. The level of the signal Gate[n−1] of the third signal control terminal S3 is a high level, and the seventh transistor T7 is turned off. The level of the signal Gate[n] of the first signal control terminal S1 is a low level, and the fourth transistor T4 is turned on. Therefore, in the data writing phase t2, the voltage vdata of the data signal terminal Vdata may be written into the first electrode of the first transistor T1 through the fourth transistor T4.

As shown in FIG. 14A, in the light-emitting phase t3, the level of the signal EM[n] of both the first light-emission signal control terminal EM1 and the second light-emission signal control terminal EM2 is a low level, and the second transistor T2 and the third transistor T3 are both turned on. The level of the signal Gate_N[n] of the compensation signal control terminal G1 is the low level, and the fifth transistor T5 is turned off. The level of the signal Reset[n] of both the first reset signal control terminal R1 and the second signal control terminal S2 is the high level, and the sixth transistor T6 and the tenth transistor T10 are both turned off. The level of the signal Gate[n−1] of the third signal control terminal S3 is the high level, and the seventh transistor T7 is turned off. The level of the signal Gate[n] of the first signal control terminal S1 is the high level, and the fourth transistor T4 is turned off. Therefore, in the light-emitting phase t3, the first transistor T1, the second transistor T2 and the third transistor T3 are turned on, so that the voltage vdd output by the first voltage terminal VDD may be provided to the first electrode of the light-emitting element through the transistor T1 to the transistor T3, so as to drive the light-emitting element to emit light.

In some embodiments, the gate driving signal of the tenth transistor T10 may alternatively be Gate[n−1]. The difference between the signal timing diagram shown in FIG. 14B and the signal timing diagram shown in FIG. 14A lies in that signals of the control terminals of the third reset sub-circuits 321 are different. The difference between the signal timing diagram of the pixel driving circuit 31 shown in FIG. 14B and the signal timing diagram of the pixel driving circuit 31 shown in FIG. 14A will be described below in combination with the pixel driving circuit 31 shown in FIG. 13 (the gate driving signal of the tenth transistor T10 in FIG. 13 is Gate[n−1]).

Figure 14B:
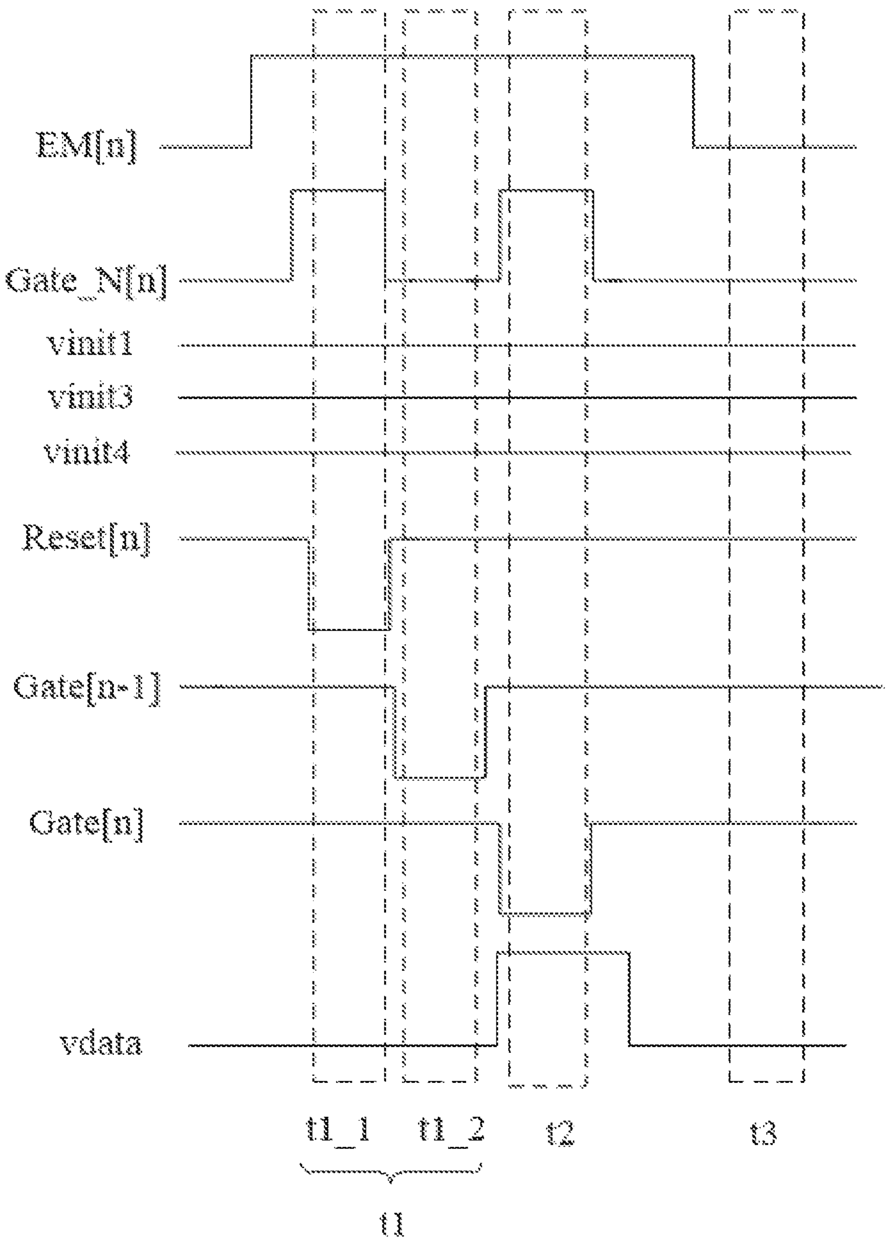
FIG. 14B is a signal timing diagram of yet another pixel driving circuit, in accordance with some embodiments.

As shown in FIG. 14B, the initialization phase t1 includes a first initialization phase t1_1 and a second initialization phase t1_2. In the first initialization phase t1_1, the level of the signal Reset[n] of the first reset signal control terminal R1 is a low level, and the sixth transistor T6 is turned on. The level of the signal Gate[n−1] of the second signal control terminal S2 is a high level, and the tenth transistor T10 is turned off. Therefore, in the first initialization phase t1_1, the fifth transistor T5 and the sixth transistor T6 are turned on, and the voltage vinit1 of the second voltage terminal Vinit1 is written into the gate of the first transistor T1 through the fifth transistor T5, that is, the voltage of the first node N1 is vinit1. Thus, the gate of the first transistor T1 is initialized.

In the second initialization phase t1_2, the level of the signal Gate_N[n] of the compensation signal control terminal G1 is a low level, and the fifth transistor T5 is turned off. The level of the signal Reset[n] of the first reset signal control terminal R1 is a high level, and the sixth transistor T6 is turned off. The level of the signal Gate[n−1] of the second signal control terminal S2 is a low level, and the tenth transistor T10 and the seventh transistor T7 are turned on. Therefore, in the second initialization phase t1_2, the voltage vinit3 of the fourth voltage terminal Vinit3 is written into the first electrode of the first transistor T1, that is, the voltage of the second node N2 is vinit3, so as to achieve the initialization of the first electrode of the first transistor T1. The voltage vinit4 of the fifth voltage terminal Vinit4 is written into the first electrode of the light-emitting element through the seventh transistor T7, so as to initialize the first electrode of the light-emitting element.

In the data writing phase t2 and the light-emitting phase t3, since the signal timing diagram shown in FIG. 14B is the same as the signal timing diagram shown in FIG. 14A, the operation process of the pixel driving circuit 31 is also the same and is not repeated here.

It can be understood that in the second initialization phase t1_2, when the second node N2 is initialized, since the fifth transistor T5 is turned off, the voltage of the first node N1 is not affected by the third node N3. Therefore, a fixed voltage difference (vinit1−vinit3) is generated between the source and the gate of the first transistor T1, and thus the first transistor T1 is in the fixed on-bias state. Then, when entering the data writing phase t2, it may ensure that the brightness of the current frame is not affected by the state of the previous frame, thereby improving the short-term after-images problem.

It will be noted that in a case where the gate driving signal of the tenth transistor T10 is Gate[n−1], as shown in FIG. 14B, Reset[n], Gate[n−1] and Gate[n] may be the same group of GOA driving signals.

Figure 15:
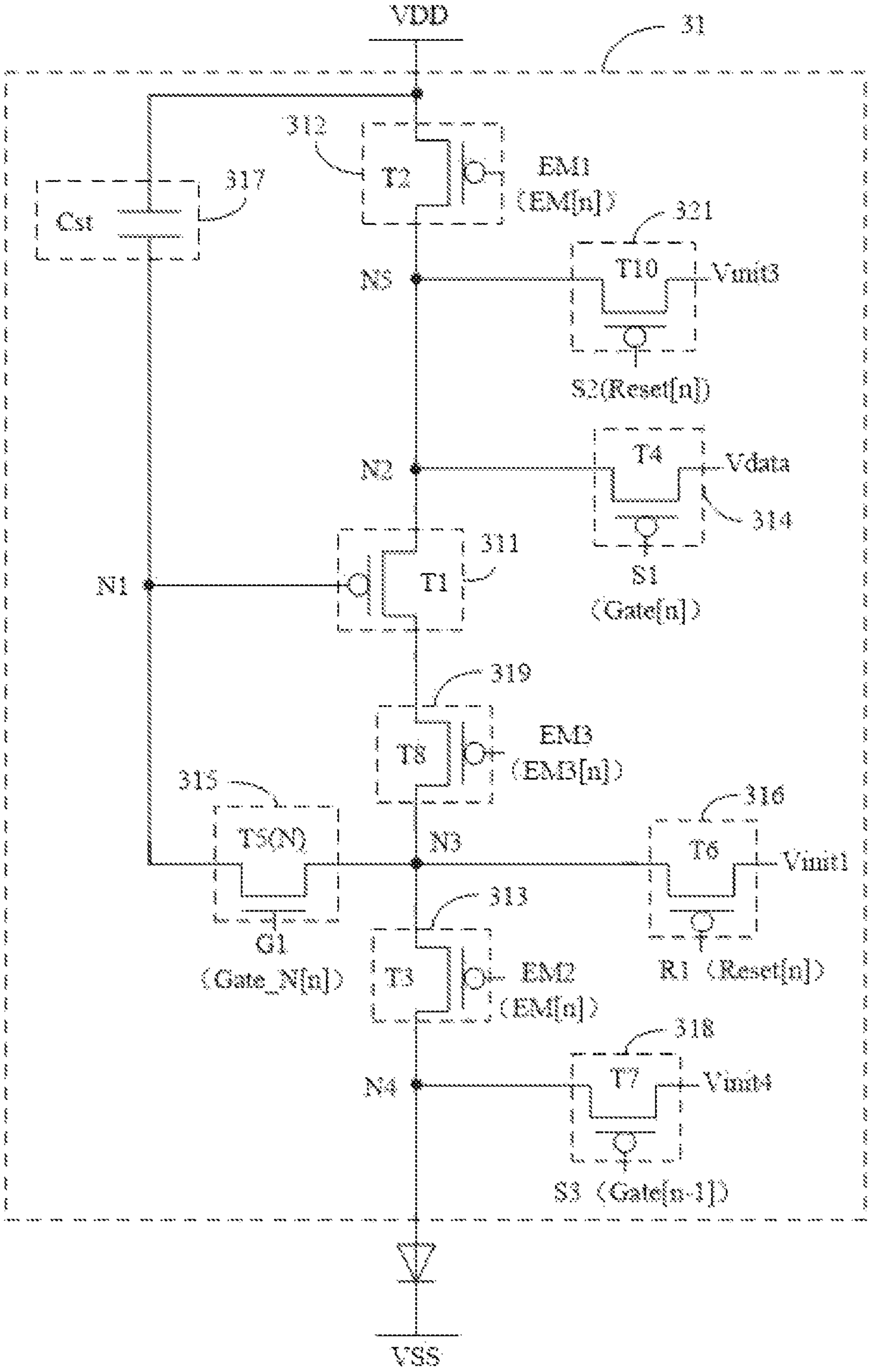
FIG. 15 is a circuit diagram of yet another pixel driving circuit, in accordance with some embodiments.

In order to ensure that the first node N1 and the second node N2 are initialized synchronously in the initialization phase t1 and thus the short-term afterimage problem may further be improved, some embodiments of the present disclosure further provide a pixel driving circuit 31 shown in FIG. 15. The gate driving signal of the tenth transistor in the pixel driving circuit 31 is Reset[n].

As shown in FIG. 15, in addition to the circuit shown in FIG. 13, the pixel driving circuit 31 may further include a third light-emission control sub-circuit 319. The third light-emission control sub-circuit 319 shown in FIG. 15 and the third light-emission control sub-circuit 319 in the structure of the pixel driving circuit 31 shown in FIG. 8 have the same connection manner and function, and details are not repeated here.

Figure 16:
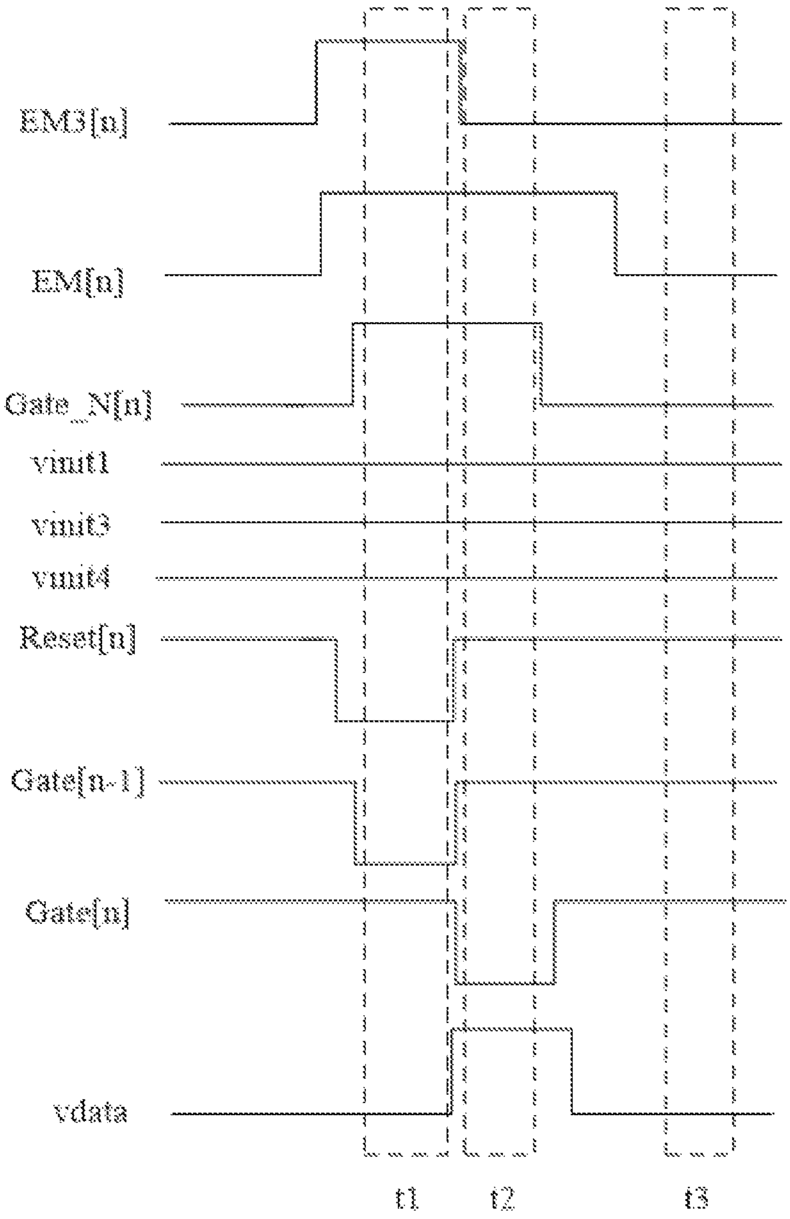
FIG. 16 is a signal timing diagram of yet another pixel driving circuit, in accordance with some embodiments.

It can be understood that the signal timing diagram of the pixel driving circuit 31 shown in FIG. 15 is shown in FIG. 16, and the signal timing diagram of the pixel driving circuit 31 shown in FIG. 8 is shown in FIG. 9. The difference between the signal timing diagram shown in FIG. 16 and the signal timing diagram shown in FIG. 9 lies in that in the signal timing diagram shown in FIG. 16, the first light-emission signal control terminal EM1 and the second light-emission signal control terminal EM2 have the same signal, which is EM[n]; while in the signal timing diagram shown in FIG. 9, the first light-emission signal control terminal EM1 and the second light-emission signal control terminal EM2 have different signals, the signal of the first light-emission signal control terminal EM1 is EM1[*n*], and the signal of the second light-emission signal control terminal EM2 is EM2[*n*]. The difference between the signal timing diagram of the pixel driving circuit 31 shown in FIG. 16 and the signal timing diagram of the pixel driving circuit 31 shown in FIG. 9 will be described below.

In combination with FIG. 15 and as shown in FIG. 16, the signal of both the first light-emission signal control terminal EM1 and the second light-emission signal control terminal EM2 of the pixel driving circuit 31 is EM[n]. In the initialization phase t1 and the data writing phase t2, the level of the signal EM[n] of both the first light-emission signal control terminal EM1 and the second light-emission signal control terminal EM2 is a high level, and the second transistor T2 and the third transistor T3 are both turned off. In the light-emitting phase t3, the level of the signal EM[n] of both the first light-emission signal control terminal EM1 and the second light-emission signal control terminal EM2 is a low level, and the second transistor T2 and the third transistor T3 are both turned on.

The operation process of the pixel driving circuit 31 shown in FIG. 15 in a display frame is similar to the operation process of the pixel driving circuit 31 shown in FIG. 13 in a display frame. The difference between the operation process of the pixel driving circuit 31 shown in FIG. 15 in the display frame and the operation process of the pixel driving circuit 31 shown in FIG. 13 in the display frame will be described below with reference to FIG. 16.

In combination with FIG. 15 and as shown in FIG. 16, in the initialization phase t1, the level of the signal EM3[*n*] of the third light-emission signal control terminal EM3 is a high level, and the eighth transistor T8 is turned off. Therefore, in the initialization phase t1, the first node N1 and the second node N2 may be initialized synchronously, so as to ensure that the gate and the source of the first transistor T1 generate a stable voltage difference, thereby achieving a rather good on-bias effect and further improving the after-image problem.

In combination with FIG. 15 and as shown in FIG. 16, in the data writing phase t2, the level of the signal EM3[*n*] of the third light-emission signal control terminal EM3 may be a low level or a high level. In a case where the level of the signal EM3[*n*] of the third light-emission signal control terminal EM3 is the low level, the eighth transistor T8 is turned on. In a case where the level of the signal EM3[*n*] of the third light-emission signal control terminal EM3 is the high level, the eighth transistor T8 is turned off. FIG. 16 is exemplarily illustrated by taking an example where the level of the signal EM3[*n*] of the third light-emission signal control terminal EM3 is the low level in the data writing phase t2.

In combination with FIG. 15 and as shown in FIG. 16, in the light-emitting phase t3, the level of the signal EM3[*n*] of the third light-emission signal control terminal EM3 is the low level, and the eighth transistor T8 is turned on. Therefore, in the light-emitting phase t3, the first transistor T1, the second transistor T2, the third transistor T3 and the eighth transistor T8 are turned on, and the fourth transistor T4 to the seventh transistor T7 are turned off, so that a current path is formed between the first voltage terminal VDD and a voltage terminal VSS of the pixel driving circuit, so as to drive the light-emitting element to emit light.

It can be understood that the pixel driving circuit 31 shown in FIG. 15 adds the eighth transistor T8 on a basis of the pixel driving circuit 31 shown in FIG. 13. Therefore, except for the gate driving signal of the eighth transistor T8 (e.g., the signal EM3[*n*] of the third light-emission signal control terminal EM3), the control methods and operation processes of the gate driving signals of other transistors in each phase are the same as the operation process of the pixel driving circuit 31 shown in FIG. 13 in a display frame.

Figure 17:
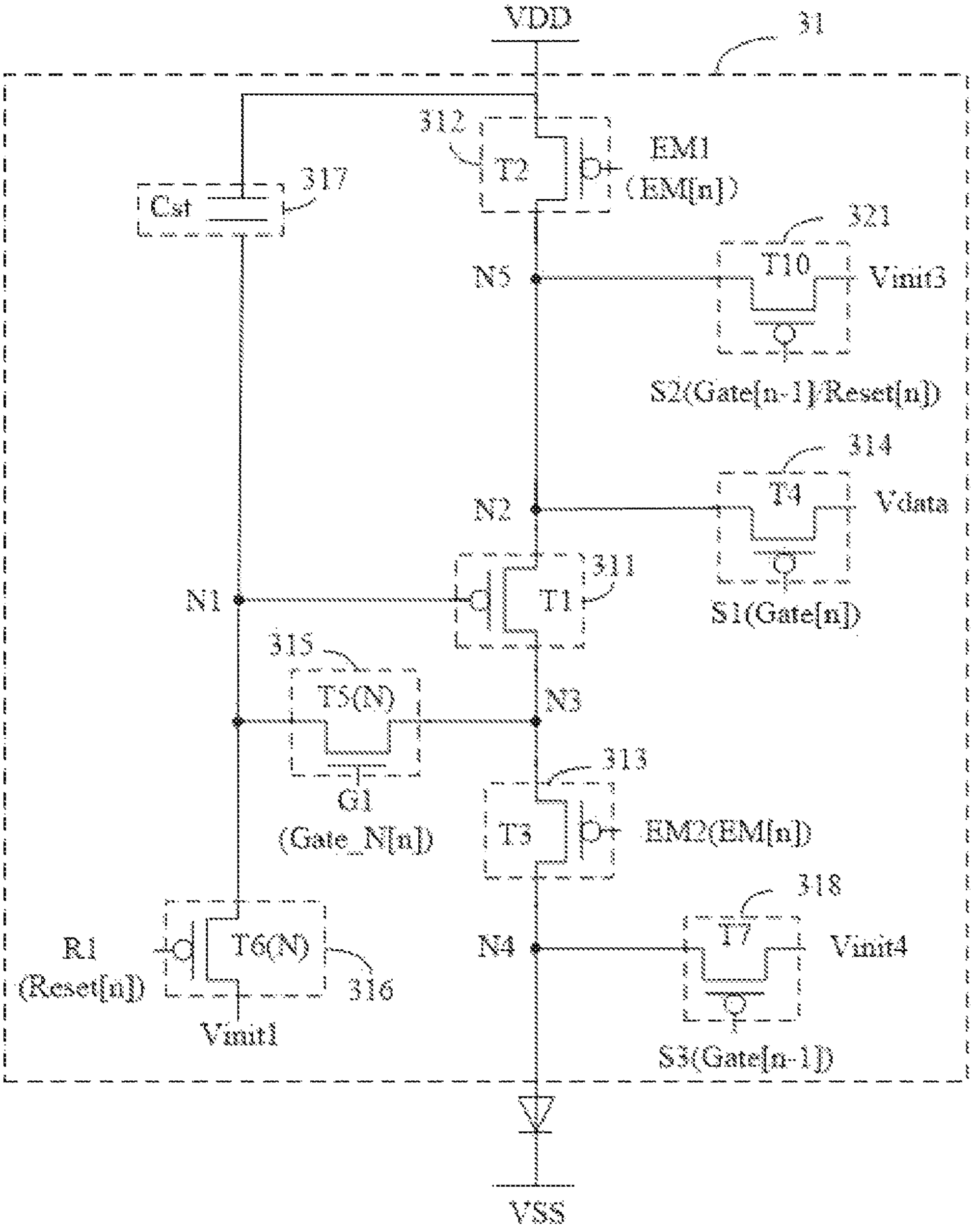
FIG. 17 is a circuit diagram of yet another pixel driving circuit, in accordance with some embodiments.

Some embodiments of the present disclosure further provide a pixel driving circuit 31. As shown in FIG. 17, the pixel driving circuit 31 has a similar structure to the pixel driving circuit 31 shown in FIG. 13. The difference between the pixel driving circuit 31 shown in FIG. 17 and the pixel driving circuit 31 shown in FIG. 13 lies in that the first reset sub-circuit 316 has a different connection manner.

In some embodiments, the signal of the second signal control terminal S2 may be Gate[n−1] or Reset[n].

It can be understood that the pixel driving circuit 31 shown in FIG. 17 has a similar structure to the pixel driving circuit 31 shown in FIG. 10. The difference between the pixel driving circuit 31 shown in FIG. 17 and the pixel driving circuit 31 shown in FIG. 10 lies in that the first light-emission signal control terminal EM1 and the second light-emission signal control terminal EM2 in the pixel driving circuit 31 are connected to the same signal line, and the pixel driving circuit 31 shown in FIG. 17 further includes a third reset sub-circuit 321. The third reset sub-circuit 321 is coupled to the fourth voltage terminal Vinit3 and the first terminal of the driving sub-circuit 311, and is configured to write the voltage vinit3 of the fourth voltage terminal Vinit3 into the first terminal of the driving sub-circuit 311 in response to the signal of the second signal control terminal S2, so as to reset the first terminal of the driving sub-circuit 311.

The signal timing diagram of the pixel driving circuit shown in FIG. 17 is similar to the signal timing diagram shown in FIG. 11. The difference therebetween lies in that the first light-emission signal control terminal EM1 and the second light-emission signal control terminal EM2 are connected to the same signal line. The difference between the signal timing diagram of the pixel driving circuit 31 shown in FIG. 17 and the signal timing diagram shown in FIG. 11 will be described below.

In the pixel driving circuit 31 shown in FIG. 17, the signal of the first light-emission signal control terminal EM1 and the signal of the second light-emission signal control terminal EM2 are both EM[n]. In the initialization phase t1 and the data writing phase t2, the level of the signal EM[n] of both the first light-emission signal control terminal EM1 and the second light-emission signal control terminal EM2 is a high level, and the second transistor T2 and the third transistor T3 are both turned off. In the light-emitting phase t3, the level of the signal EM[n] of both the first light-emission signal control terminal EM1 and the second light-emission signal control terminal EM2 is a low level, and the second transistor T2 and the third transistor T3 are both turned on. That is, the signal timing of the signal EM[n] of the first light-emission signal control terminal EM1 and the second light-emission signal control terminal EM2 in the pixel driving circuit 31 shown in FIG. 17 is the same as the signal timing of the signal EM2[*n*] in FIG. 11.

It can be understood that the pixel driving circuit 31 shown in FIG. 17 adds the tenth transistor T10 on a basis of the pixel driving circuit 31 shown in FIG. 10, and the gate driving signal of the tenth transistor T10 is Gate[n] or Reset[n]. Therefore, except for the signal of the first light-emission signal control terminal EM1 and the second light-emission signal control terminal EM2, the signal timing diagram of the gate driving signals of other transistors in each phase is the same as the signal timing diagram shown in FIG. 11.

Figure 18:
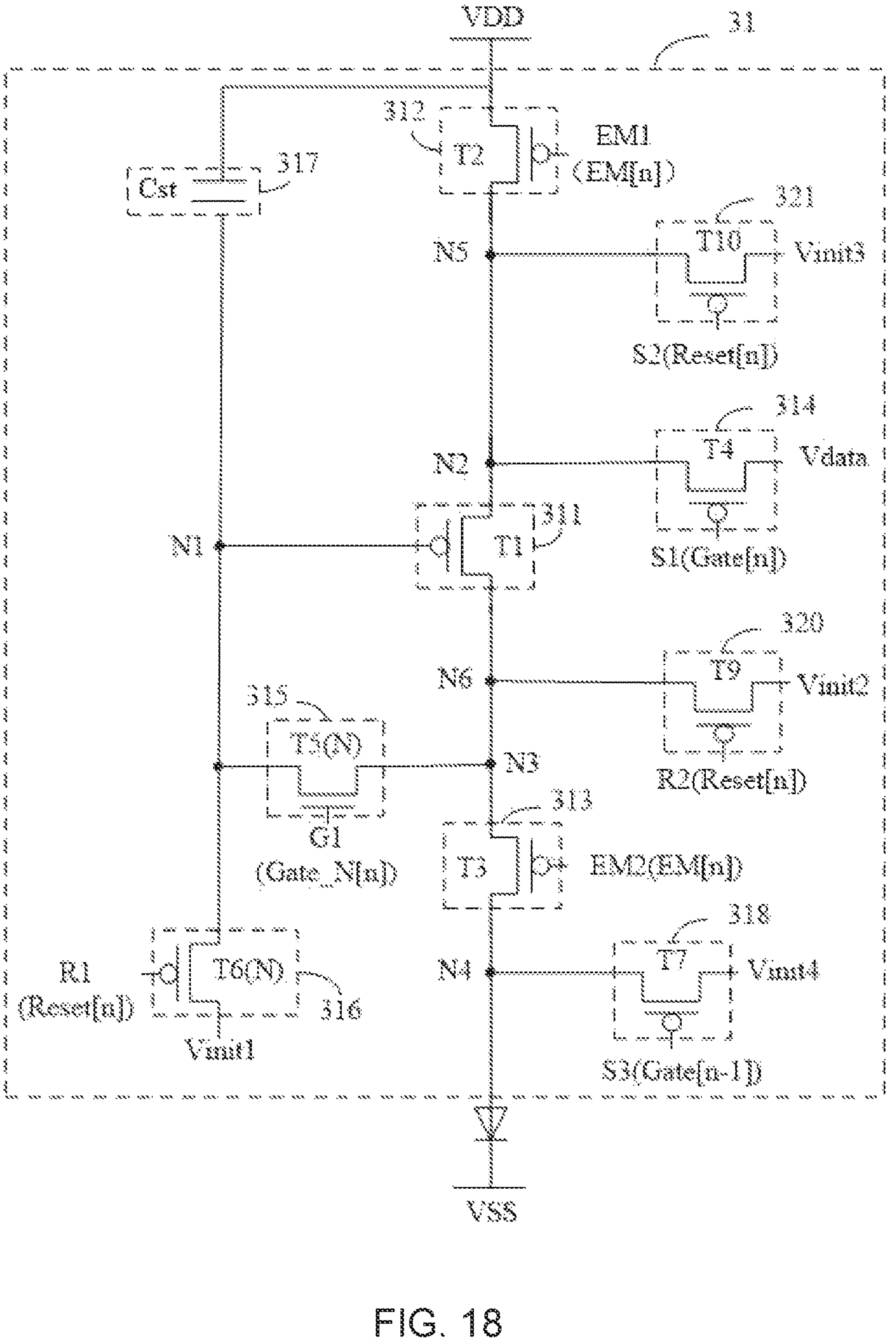
FIG. 18 is a circuit diagram of yet another pixel driving circuit, in accordance with some embodiments.

In order to ensure that the first node N1, the second node N2 and the third node N3 are initialized synchronously in the initialization phase t1 and thus the short-term afterimage problem may further be improved, some embodiments of the present disclosure further provide a pixel driving circuit 31 shown in FIG. 18.

As shown in FIG. 18, in addition to the circuit shown in FIG. 17, the pixel driving circuit 31 may further include a second reset sub-circuit 320. The second reset sub-circuit 320 is coupled to the second terminal of the driving sub-circuit 311 and a third voltage terminal Vinit2. The second reset sub-circuit 320 is configured to reset the second terminal of the driving sub-circuit 311 in response to a signal Reset[n] of the second reset signal control terminal R2.

As shown in FIG. 18, the second reset sub-circuit 320 includes a ninth transistor T9. A first electrode of the ninth transistor T9 is coupled to the third voltage terminal Vinit2, a second electrode of the ninth transistor T9 is coupled to the second electrode of the first transistor T1, and a gate of the ninth transistor T9 is coupled to the second reset signal control terminal R2.

The pixel driving circuit 31 shown in FIG. 18 adds the ninth transistor T9 on a basis of the pixel driving circuit 31 shown in FIG. 17, and the gate driving signal of the ninth transistor T9 is Reset[n]. The signal timing diagram of the pixel driving circuit 31 shown in FIG. 18 is the same as the signal timing diagram of the pixel driving circuit 31 shown in FIG. 17.

Figure 19:
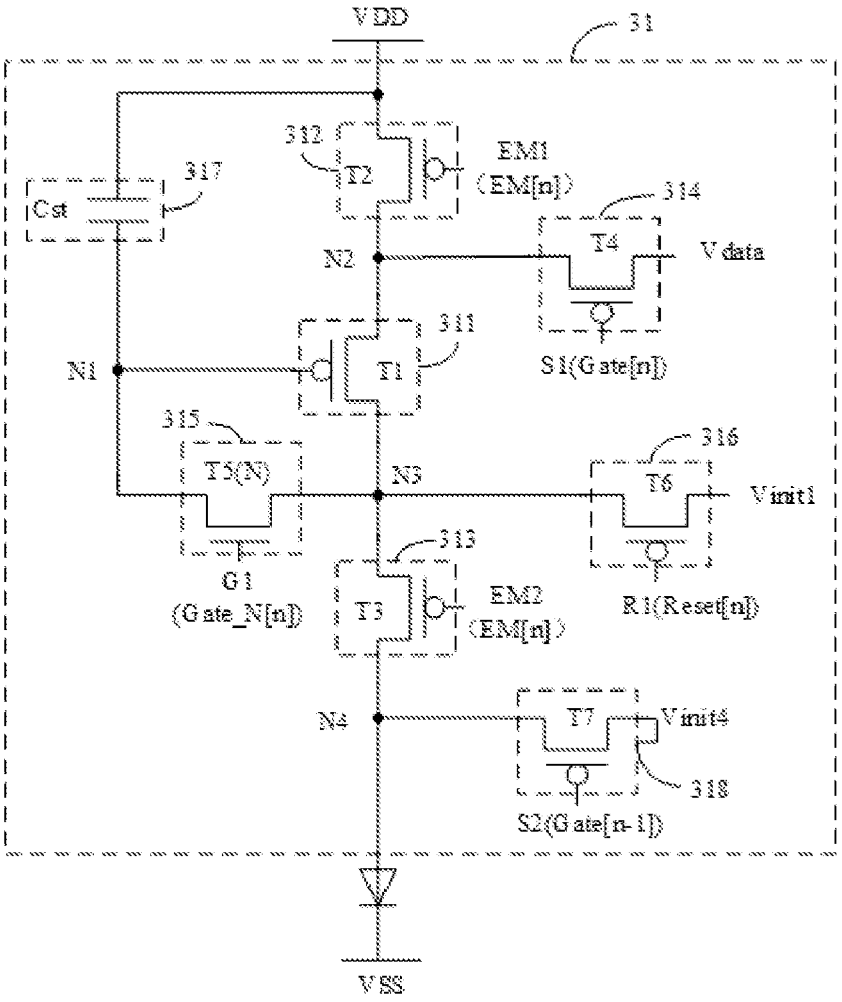
FIG. 19 is a circuit diagram of yet another pixel driving circuit, in accordance with some embodiments.

Some embodiments of the present disclosure further provide a pixel driving circuit 31. As shown in FIG. 19, the pixel driving circuit 31 has a similar structure to the pixel driving circuit shown in FIG. 1. The difference between the pixel driving circuit 31 shown in FIG. 19 and the pixel driving circuit shown in FIG. 1 lies in that the gate driving signals of the sixth transistors T6 are different. As shown in FIG. 19, the first reset sub-circuit 316 includes the sixth transistor T6, and the gate driving signal of the sixth transistor T6 changes from Gate[n−1] in FIG. 1 to Reset[n]. As a result, the pulse width of the gate driving signal of the sixth transistor T6 may be modulated, and thus a balance between the initialization phase and the data writing phase of the pixel driving circuit in a display frame may be achieved, thereby achieving a rather good display effect.

The operation process of the pixel driving circuit 31 shown in FIG. 19 will be described below with reference to FIG. 20. The difference between the signal timing diagram shown in FIG. 20 and the signal timing diagram shown in FIG. 2 lies in that the signal Reset[n] is added. The difference between the signal timing diagram of the pixel driving circuit 31 shown in FIG. 20 and the signal timing diagram of the pixel driving circuit shown in FIG. 2 will be described below.

Figure 20:
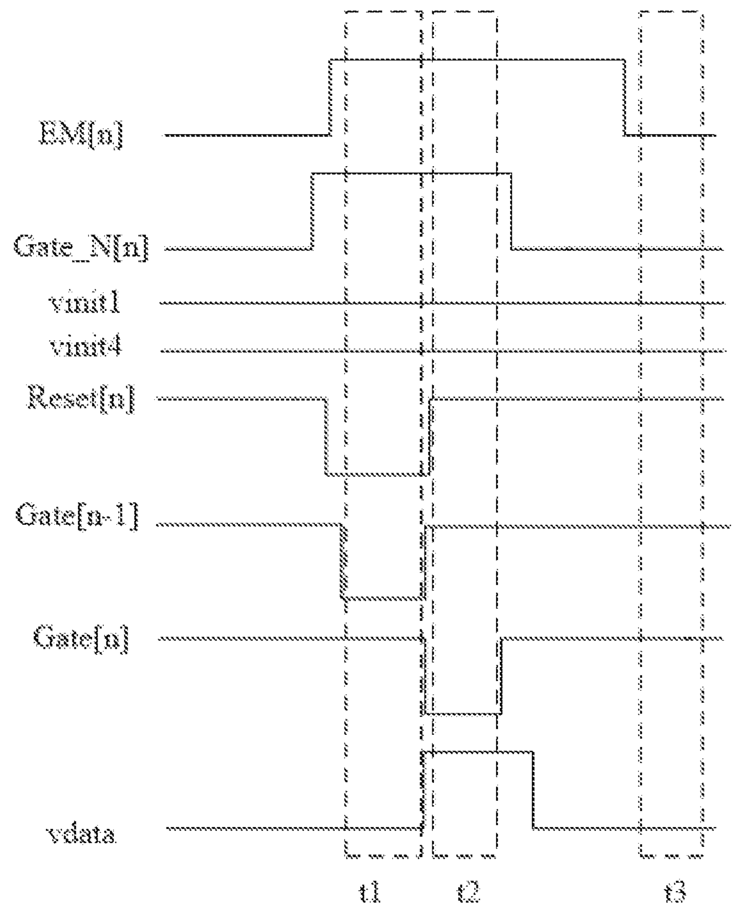
FIG. 20 is a signal timing diagram of yet another pixel driving circuit, in accordance with some embodiments.

As shown in FIG. 20, in the initialization phase t1, the level of the signal Reset[n] of the first reset signal control terminal R1 is a low level, and the sixth transistor T6 is turned on. The voltage vinit1 of the second voltage terminal Vinit1 is written into the gate of the first transistor T1 through the sixth transistor T6 and the fifth transistor T5, that is, the voltage value of the first node N1 is vinit1, so that the first node N1 is initialized. The voltage vdata of the data signal terminal Vdata is a low level.

As shown in FIG. 20, in the data writing phase t2, the level of the signal Reset[n] of the first reset signal control terminal R1 is a high level, and the sixth transistor T6 is turned off. The voltage vdata of the data signal terminal Vdata is a high level, and the voltage vdata of the data signal terminal Vdata may be written into the first electrode of the first transistor T1 through the fourth transistor T4.

As shown in FIG. 20, in the light-emitting phase t3, the level of the signal Reset[n] of the first reset signal control terminal R1 is the high level, and the sixth transistor T6 is turned off.

It can be understood that since the gate driving signal of the sixth transistor T6 in the pixel driving circuit 31 shown in FIG. 19 is Reset[n], the gate driving signal of the fourth transistor T4 is Gate[n]. That is, the gate driving signal of the sixth transistor T6 is no longer the previous-stage signal of the gate driving signal Gate[n] of the transistor T4. Therefore, the pulse width of the gate driving signal of the sixth transistor T6 may be modulated, so that the time of the initialization phase can be independently controlled, thereby realizing the time balance between the initialization phase and the data writing phase, and achieving a good light-emission effect.

Figure 21:
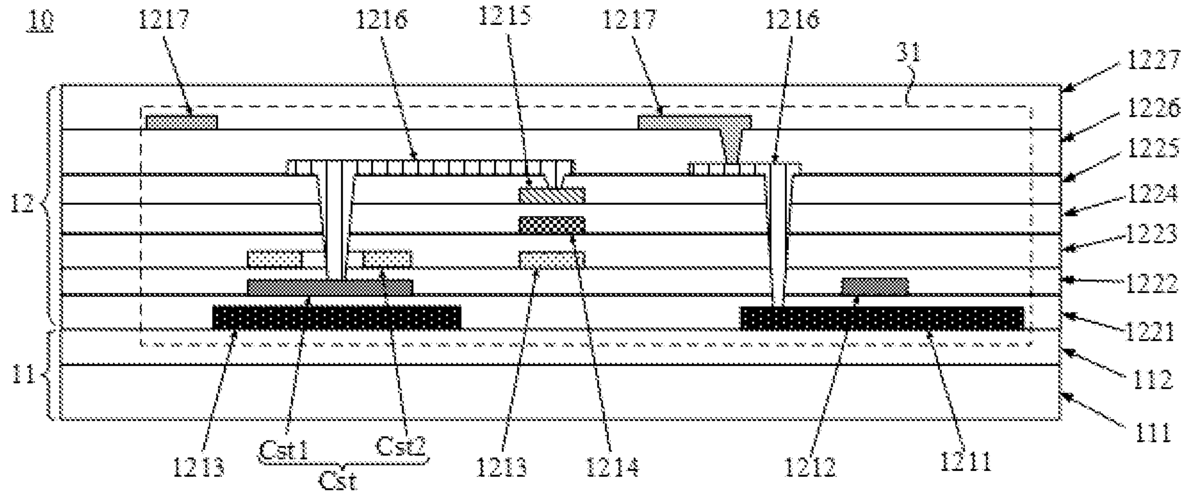
FIG. 21 is a sectional view of an array substrate, in accordance with some embodiments.

Some embodiments of the present disclosure provide an array substrate 10. As shown in FIG. 21, the array substrate 10 includes a substrate 11 and a driving circuit layer 12 disposed on the substrate 11. The substrate 11 may include a base 111 and a buffer layer 112. The base 111 may be a silicon base or made of a flexible material such as polyimide (PI) or saturated polyester (e.g., PET). The buffer layer 112 is provided on the base 111, and the driving circuit layer 12 is provided on a side of the buffer layer 112 away from the base 111.

The driving circuit layer 12 includes functional layers and insulating layers each located between adjacent functional layers. The functional layers may include a first active layer 1211, a first gate layer 1212, a second gate layer 1213, a second active layer 1214, a third gate layer 1215, a first source-drain metal layer 1216 and a second source-drain metal layer 1217. An insulating layer may be provided between each two functional layers. The first active layer 1211, the first gate layer 1212, the second gate layer 1213, the second active layer 1214, the third gate layer 1215 and the first source-drain metal layer 1216 are used to form a plurality of pixel driving circuits 31 in the display apparatus.

For example, the first active layer 1211, the first gate layer 1212, the second gate layer 1213, the second active layer 1214, the third gate layer 1215, the first source-drain metal layer 1216 and the second source-drain metal layer 1217 are provided on a side of the substrate 11. A first gate insulating layer 1221 is provided between the first active layer 1211 and the first gate layer 1212, a second gate insulating layer 1222 is provided between the first gate layer 1212 and the second gate layer 1213, a third gate insulating layer 1223 is provided between the second gate layer 1213 and the second active layer 1214, a fourth gate insulating layer 1224 is provided between the second active layer 1214 and the third gate layer 1215, an interlayer dielectric layer 1225 is provided between the third gate layer 1215 and the first source-drain metal layer 1216, a first planarization layer 1226 is provided between the first source-drain metal layer 1216 and the second source-drain metal layer 1217, and a second planarization layer 1227 is provided on a side of the second source-drain metal layer 1217 away from the substrate 11.

Figure 22:
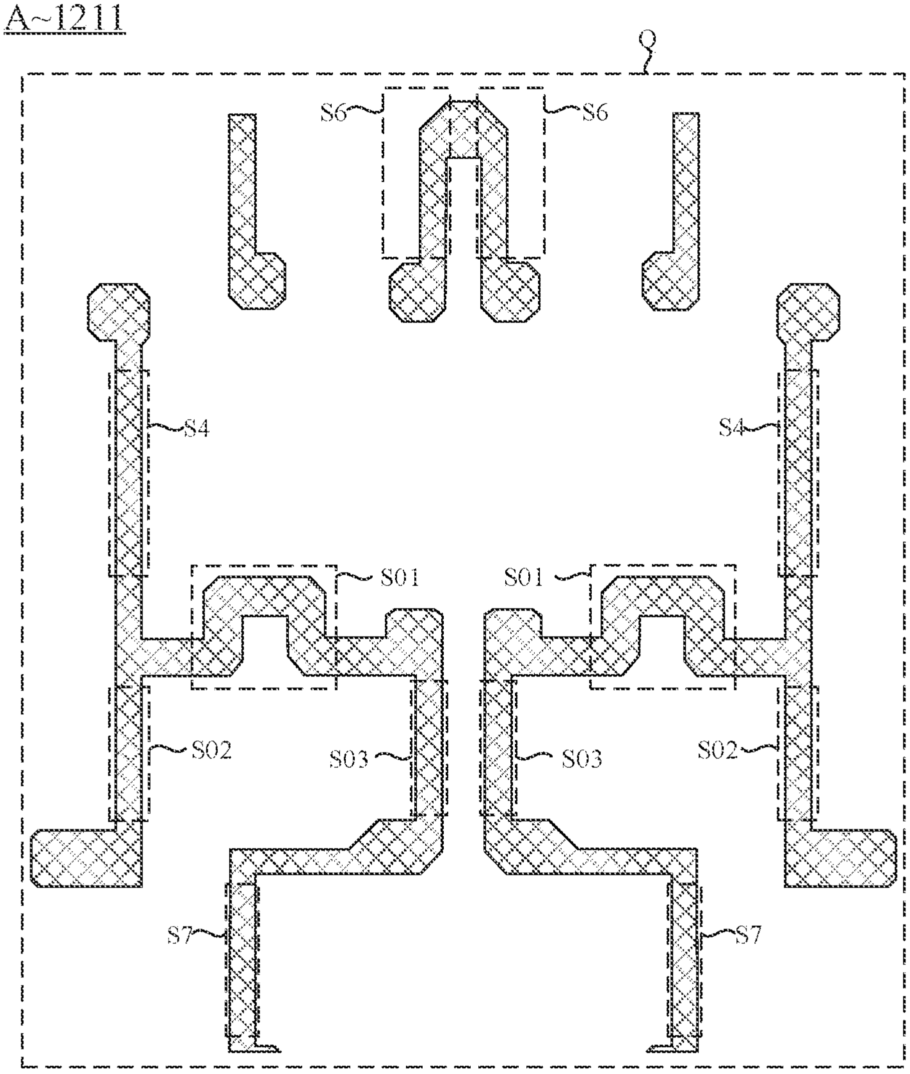
FIG. 22 is a structural diagram of a first active layer, in accordance with some embodiments.

In some embodiments, the array substrate includes a plurality of pixel areas arranged in an array, and each pixel area is provided with two adjacent pixel driving circuits. The first active layer provided on a side of the substrate includes a plurality of first pixel active patterns, and each first pixel active pattern includes active pattern layers of a plurality of transistors in a pixel driving circuit. FIG. 22 shows two first pixel active patterns A in the first active layer 1211. The first pixel active pattern A may include a first active pattern layer S01 of the first transistor, a second active pattern layer S02 of the second transistor, a third active pattern layer S03 of the third transistor, a fourth active pattern layer S4 of the fourth transistor, a sixth active pattern layer S6 of the sixth transistor and a seventh active pattern layer S7 of the seventh transistor.

For example, a part of the first active layer 1211 located in the pixel area Q is first pixel active patterns A of two adjacent pixel driving circuits, and the two first pixel active patterns A are mirror symmetrical.

Figure 23:
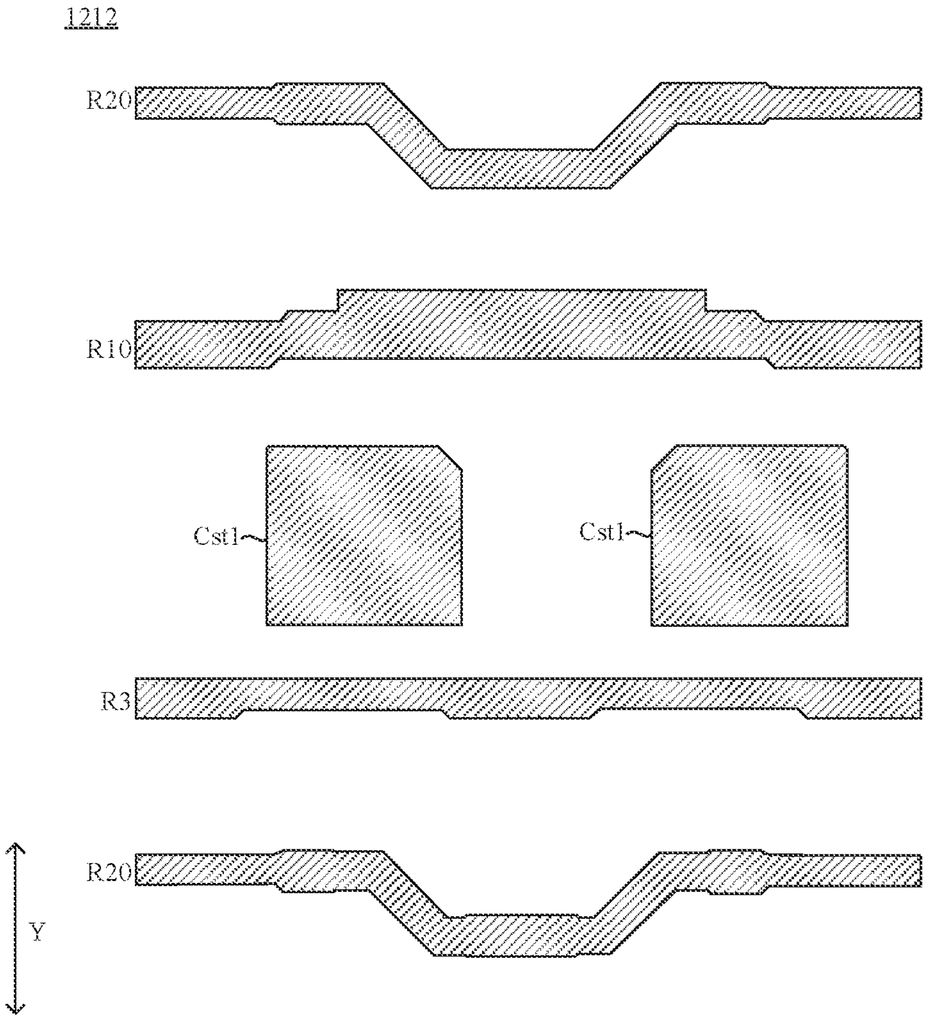
FIG. 23 is a structural diagram of a first gate layer, in accordance with some embodiments.

In some embodiments, as shown in FIG. 23, the first gate layer 1212 provided on a side of the first active layer away from the substrate includes a plurality of gate signal lines and first electrode plates Cst1 of the capacitors. The gate signal lines may be, for example, first gate signal lines R10, second gate signal lines R20, and third gate signal lines R3. The first gate signal line R10, the second gate signal line R2 and the third gate signal line R3 are arranged in a cycle in the second direction Y. The second gate signal line R20 passes through the sixth active pattern layer and the seventh active pattern layer, the first gate signal line R10 passes through the fourth active pattern layer, the first electrode plate Cst1 passes through the first active pattern layer, and the third gate signal line R3 passes through the second active pattern layer and the third active pattern layer.

For example, the first gate layer includes a plurality of first gate signal lines and a plurality of second gate signal lines. An orthographic projection of the fourth active pattern layer on the substrate is overlapped with an orthographic projection of the current stage first gate signal line in the plurality of first gate signal lines on the substrate, and an orthographic projection of the sixth active pattern layer on the substrate is overlapped with an orthographic projection of the current stage second gate signal line in the plurality of second gate signal lines on the substrate.

The current stage first gate signal line refers to one, having overlap with the orthographic projection of the active pattern layer of the corresponding transistor on the substrate, of a plurality of cascaded first gate signal lines; or the current stage second gate signal line refers to one, having overlap with the orthographic projection of the active pattern layer of the corresponding transistor on the substrate, of a plurality of cascaded second gate signal lines.

Figure 24:
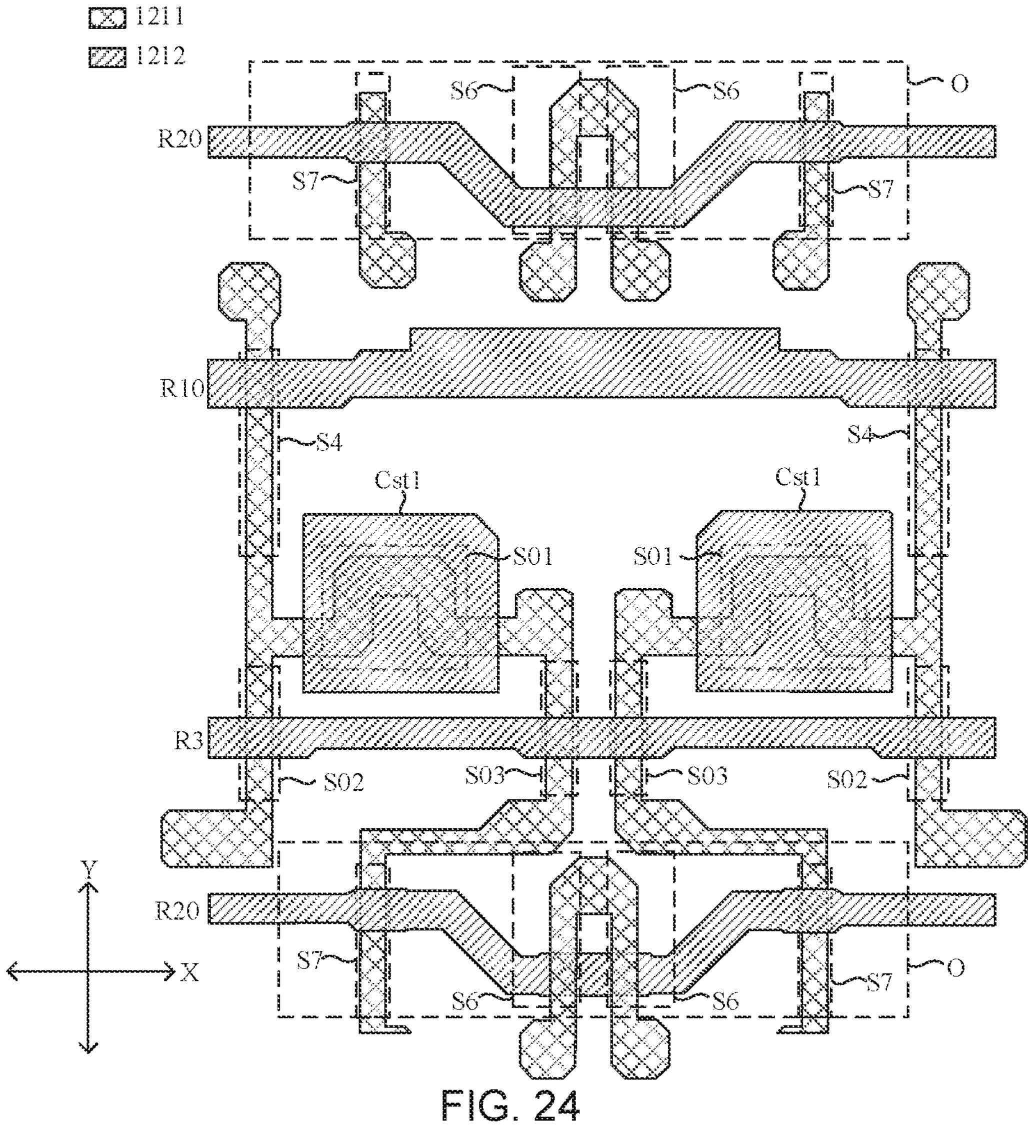
FIG. 24 is a structural diagram of a first active layer and a first gate layer, in accordance with some embodiments.

It can be understood that, as shown in FIG. 24, in two adjacent active patterns arranged in the second direction Y, a sixth active pattern layer S6 of a next stage of first pixel active pattern and a seventh active pattern layer S7 of a current stage of first pixel active pattern are located in the same area O extending in the first direction X, and a dimension of the area O in the second direction Y is smaller than a dimension of the first pixel active pattern in the second direction Y. Therefore, a second gate signal line R20 passes through a sixth active pattern layer S6 of the current stage of first pixel active pattern and a seventh active pattern layer S7 of a previous stage of first pixel active pattern, and another adjacent second gate signal line R20 passes through the seventh active pattern layer S7 of the current stage of first pixel active pattern and the sixth active pattern layer S6 of the next stage of first pixel active pattern.

It will be noted that "passing through" in the embodiments of the present disclosure means that an orthographic projection of the former on the substrate is overlapped with an orthographic projection of the latter on the substrate. For example, each gate signal line in the first gate layer 1212 shown in FIG. 24 passes through active pattern layers of corresponding transistors, which means that an orthographic projection of each gate signal line in the first gate layer 1212 on the substrate is overlapped with orthographic projections of the active pattern layers of the corresponding transistors on the substrate. For example, an orthographic projection of the first gate signal line R10 on the substrate is overlapped with the orthographic projection of the fourth active pattern layer S4 of the fourth transistor; alternatively an orthographic projection of the second gate signal line R20 on the substrate is overlapped with the orthographic projection of the sixth active pattern layer S6 of the sixth transistor.

Figure 25:
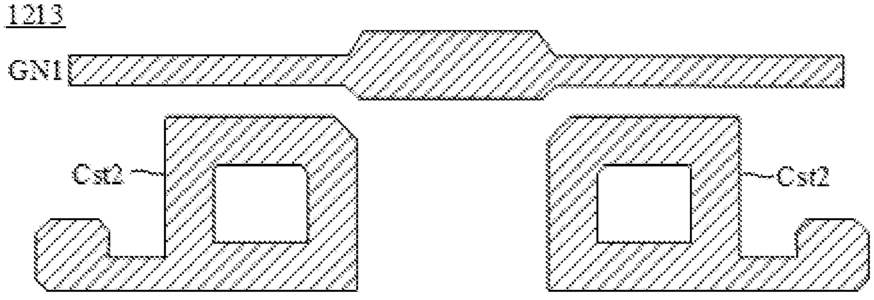
FIG. 25 a structural diagram of a second gate layer, in accordance with some embodiments.

In some embodiments, as shown in FIG. 25, the second gate layer 1213 is provided with second electrode plates Cst2 of the capacitors and a first writing control data line GN1 therein. The second electrode plate Cst2 passes through the first electrode plate. That is to say, the first electrode plate Cst1 and the second electrode plate are arranged oppositely to form a capacitor.

Figure 26:
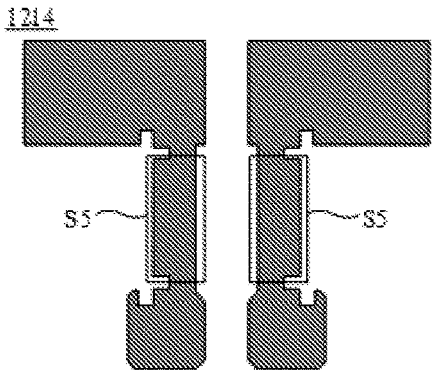
FIG. 26 is a structural diagram of a second active layer, in accordance with some embodiments.
Figure 31:
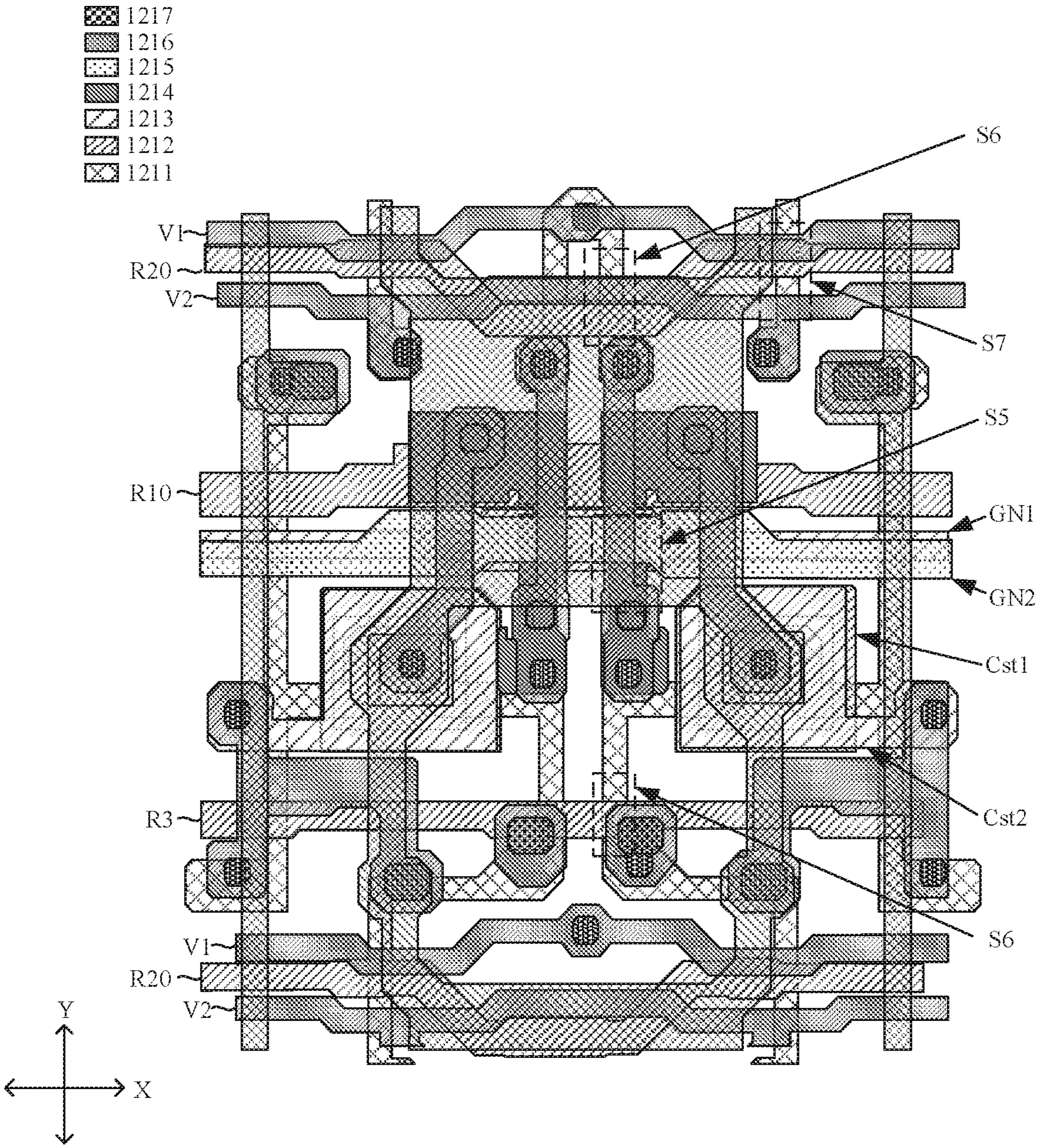
FIG. 31 is a structural diagram of an array substrate, in accordance with some embodiments.

As shown in FIGS. 26 and 31, the second active layer 1214 is provided with fifth active pattern layers S5. An end of the fifth active pattern layer S5 is electrically connected to the first electrode plate Cst1, and another end of the fifth active pattern layer S5 is electrically connected to an end of the sixth active pattern layer S6, and the fifth active pattern layer S5 passes through the first writing control data line GN1.

Figure 27:
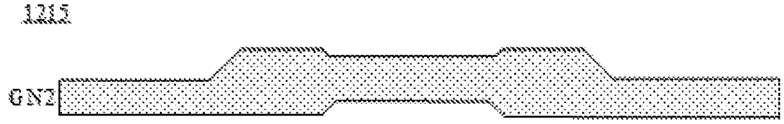
FIG. 27 is a structural diagram of a third gate layer, in accordance with some embodiments.

As shown in FIGS. 27 and 31, the third gate layer 1215 is provided with a second writing control data line GN2, and the second writing control data line GN2 passes through the fifth active pattern layers S5.

The active pattern layers in the first active layer is made of low temperature poly-silicon (LTPS), and the fifth active pattern layers S5 in the second active layer 1214 is made of low temperature polycrystalline oxide (LTPO). Therefore, the two active layers are provided to facilitate processing of active layer patterns of different materials.

Figure 28:
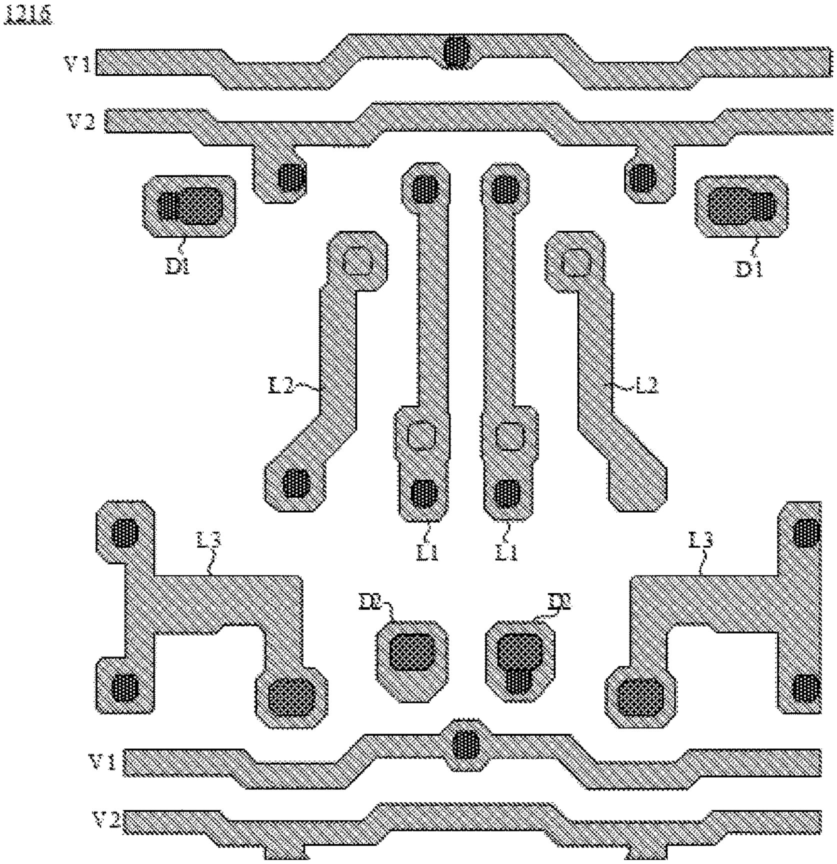
FIG. 28 is a structural diagram of a first source-drain metal layer, in accordance with some embodiments.
Figure 30:
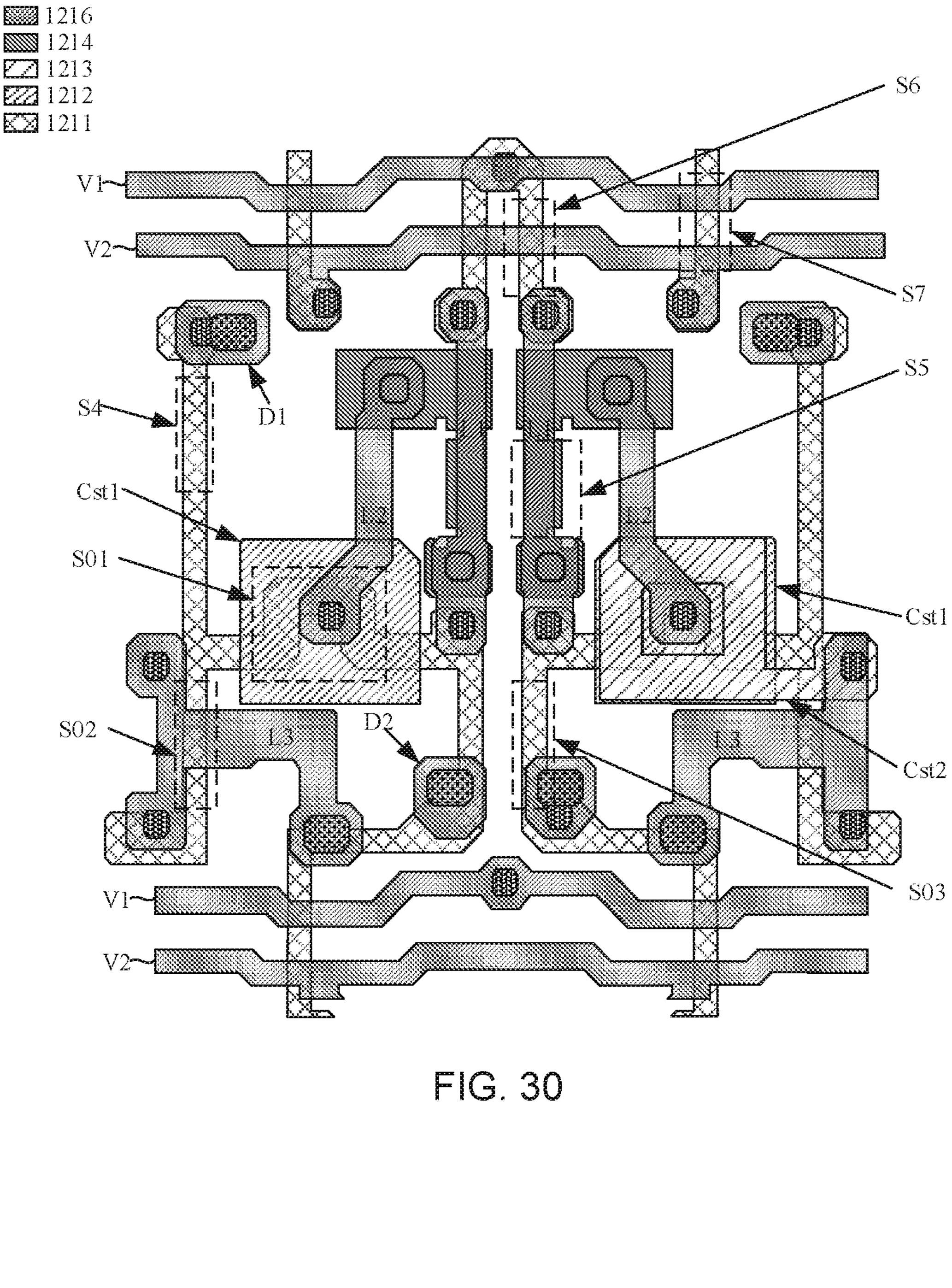
FIG. 30 is a structural diagram of some pattern layers of an array substrate, in accordance with some embodiments.

As shown in FIGS. 28 and 30, FIG. 30 is a structure diagram of part of pattern layers of two pixel driving circuits. In FIG. 30, for convenience of showing and understanding, relative to the structure diagram of part of pattern layers of the pixel driving circuit on the right, the structure diagram of part of pattern layers of the pixel driving circuit on the left lacks the second electrode plate Cst2. The first source-drain metal layer 1216 shown in FIG. 28 is provided therein with first initialization signal lines V1, second initialization signal lines V2, first connection lines L1, second connection lines L2 and third connection lines L3. In combination with FIG. 30, the first initialization signal line V1 is electrically connected to another end of the sixth active pattern layer S6, and the first initialization signal line V1 is configured to transmit the vinit1 signal to the sixth active pattern layer S6. The second initialization signal line V2 is electrically connected to an end of the seventh active pattern layer S7, and the second initialization signal line V2 is configured to transmit the vinit2 signal to the seventh active pattern layer S7.

It can be known that the another end of the sixth active pattern layer S6 is the second voltage terminal of the pixel driving circuit, and the end of the seventh active pattern layer S7 is the fifth voltage terminal of the pixel driving circuit. That is to say, the first initialization signal line V1 transmits the vinit1 signal to the pixel driving circuit through the another end (the second voltage terminal) of the sixth active pattern layer S6, and the second initialization signal line V2 transmits the vinit2 signal to the pixel driving circuit through the end (the fifth voltage terminal) of the seventh active pattern layer S7.

An end of the first connection line L1 is electrically connected to an end of the first active pattern layer S01 and the another end of the fifth active pattern layer S5, and another end of the first connection line L1 is electrically connected to an end of the sixth active pattern layer S6. The end of the first connection line L1 is electrically connected to the end of the first active pattern layer S01 through a via hole to the first active layer 1211, and is also electrically connected to the another end of the fifth active pattern layer S5 through another via hole to the second active layer 1214. The another end of the first connection line L1 is electrically connected to the end of the sixth active pattern layer S6 through a via hole to the first active layer 1211. Thus, the first active pattern layer S01 and the sixth active pattern layer S6 that are located in the first active layer 1211 are electrically connected to the fifth active pattern layer S5 located in the second active layer.

An end of the second connection line L2 is electrically connected to the first electrode plate Cst1, and another end of the second connection line L2 is electrically connected to the end of the fifth active pattern layer S5. The third connection line L3 is electrically connected to the second electrode plate Cst2 and an end of the second active pattern layer S02. The third connection line L3 is configured to provide the voltage vdd to the second electrode plate Cst2 and the second active pattern layer S02.

The first source-drain metal layer 1216 is further provided with two connection ends: a first connection end D1 and a second connection end D2. The first connection end D1 is electrically connected to an end of the fourth active pattern layer S4 through a via hole to the first active layer 1211, and the second connection end D2 is electrically connected to a connection position between the third active pattern layer S03 and the seventh active pattern layer S7 through a via hole to the first active layer 1211.

Figure 29:
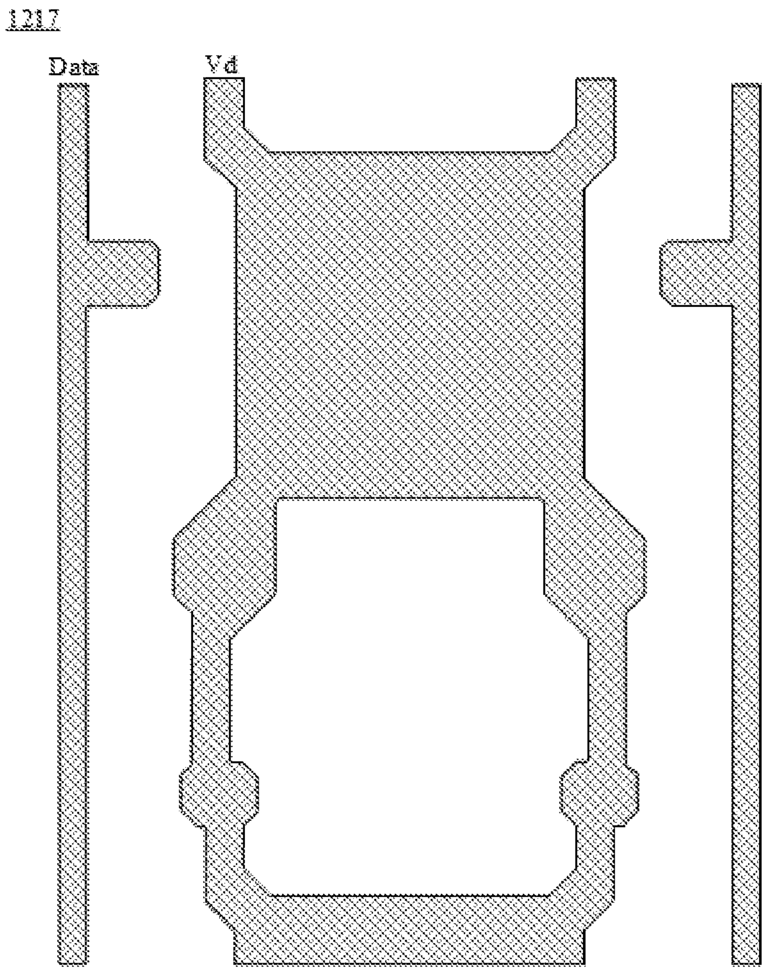
FIG. 29 is a structural diagram of a second source-drain metal layer, in accordance with some embodiments.

As shown in FIGS. 29 and 31, the second source-drain metal layer 1217 is provided with a first voltage signal line Vd and a data signal line Data therein. The first voltage signal line Vd is electrically connected to the third connection line L3 through a via hole to the first source-drain metal layer 1216, and the data signal line Data is electrically connected to the first connection end D1 through a via hole to the first source-drain metal layer 1216.

It can be known that the end of the second active pattern layer S02 is the first voltage terminal of the pixel driving circuit, and an end of the fourth active pattern layer S4 is the data signal terminal of the pixel driving circuit. That is, the first voltage signal line Vd transmits the voltage vdd to the pixel driving circuit through the end (the first voltage terminal) of the second active pattern layer S02, and the data signal line Data transmits the voltage vdata to the pixel driving circuit through the end (the data signal terminal) of the fourth active pattern layer S4.

In some embodiments, the plurality of pixel driving circuits are arranged in an array. In multiple pixel driving circuits arranged in a direction (the second direction) perpendicular to a direction in which the gate signal line extends, an area where each pixel driving circuit is located has a first gate signal line and a second gate signal line that are arranged in the direction perpendicular to the direction in which the gate signal line extends. The first gate signal line transmits the signal Gate[n], and the second gate signal line transmits the first reset signal. In a column of pixel driving circuits arranged in the direction perpendicular to the direction in which the gate signal line extends, a second gate signal line located in an area where the current stage of pixel driving circuit is located is electrically connected to a first gate signal line located in an area where a previous stage of pixel driving circuit, that is, the signal Gate[n] received by the previous stage of pixel driving circuit is also the first reset signal received by the current stage of pixel driving circuit. Specifically, the gate driving signal of the fourth transistor of the previous stage of pixel driving circuit is also the gate driving signal of the sixth transistor of the current stage of pixel driving circuit.

In some embodiments, in a column of pixel driving circuits, a pulse width of the first reset signal is adjustable, that is, relative to an electrical signal transmitted by the first gate signal line, a pulse width of an electrical signal transmitted by the second gate signal line may be adjusted.

In light of this, the present embodiment provides another array substrate. The another array substrate includes a pixel driving circuit provided in any of the above embodiments. The pixel driving circuit includes a data write sub-circuit and a first reset sub-circuit. The data write sub-circuit includes a fourth transistor, and the first reset sub-circuit includes a sixth transistor.

The another array substrate includes a substrate and a driving circuit layer. The position of the driving circuit layer and the structure of each film layer are the same as the above array substrate unless otherwise specified, and details are not repeated here. As shown in FIG. 31, the first gate signal line R10 and the second gate signal line R20 in the another array substrate are insulated.

The first gate signal line R10 and the second gate signal line R20 are insulated, so that the first gate signal line R10 and the second gate signal line R20 may transmit two different electrical signals. That is, in a case where the voltage vdata transmitted by the first gate signal line R10 has a fixed pulse width, the first reset signal transmitted by the second gate signal line R20 has an adjustable pulse width. In this way, the time of the pixel driving circuit in the initialization phase may be independently controlled, thereby enabling time balance between the initialization phase and the data writing phase and achieving a good light-emission effect.

Figure 32:
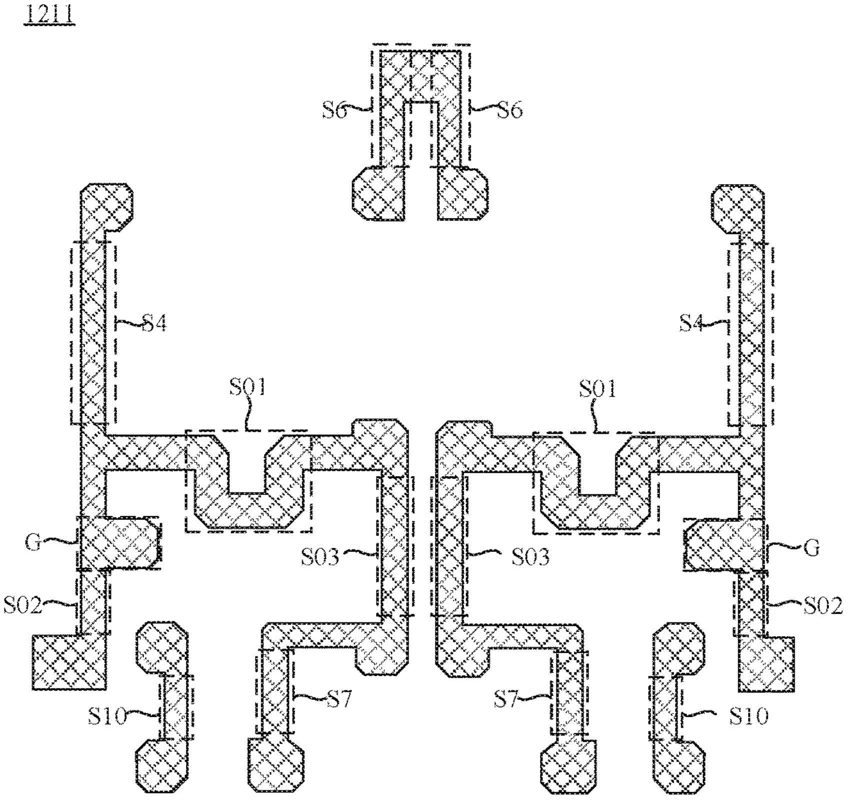
FIG. 32 is a structural diagram of another first active layer, in accordance with some embodiments.

In some embodiments, as shown in FIG. 32, the pixel driving circuit further includes a third reset sub-circuit, and the third reset sub-circuit includes a tenth transistor. The first pixel active pattern further includes a tenth active pattern layer S10 of the tenth transistor. The first active pattern layer S01, the second active pattern layer S02 and the tenth active pattern layer S10 are all connected to a first connection point G.

In some embodiments, as shown in FIG. 32, the first connection point G is disposed in the first active layer, and the first active pattern layer S01 and the second active pattern layer S02 are connected to the first connection point G.

Figure 34:
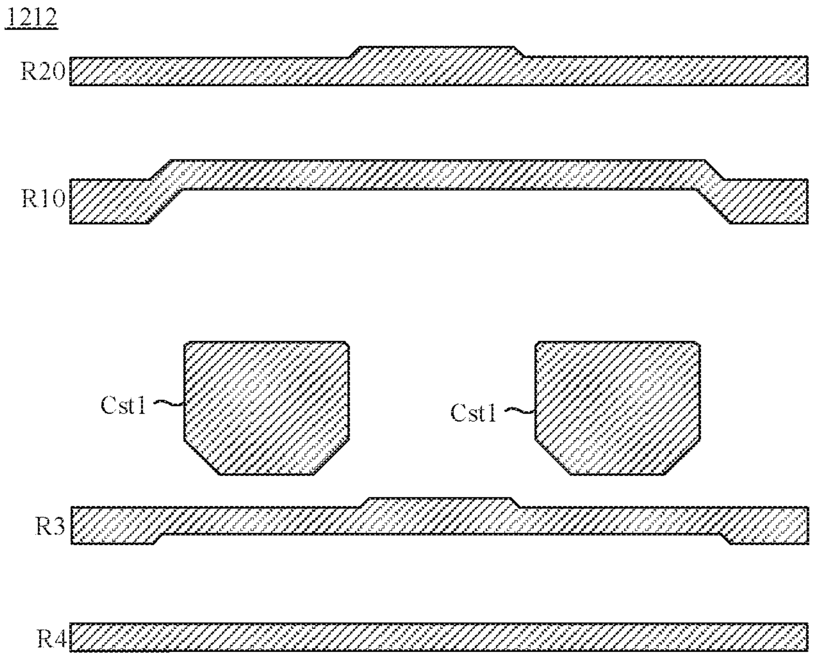
FIG. 34 is a structural diagram of another first gate layer, in accordance with some embodiments.
Figure 35:
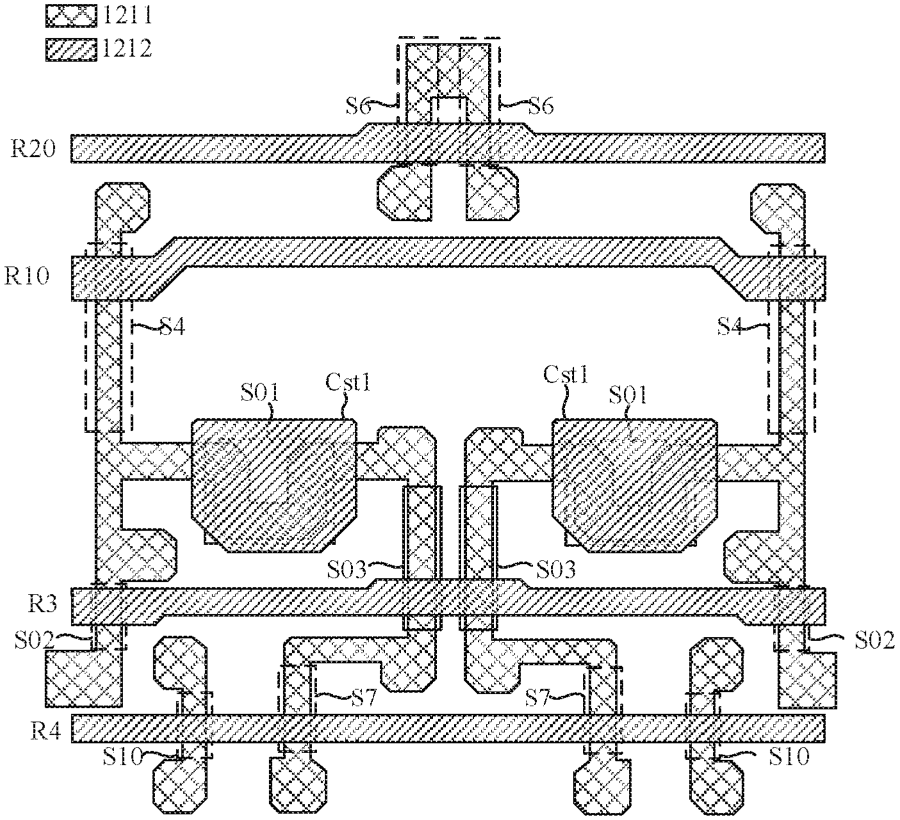
FIG. 35 is a structural diagram of another first active layer and another first gate layer, in accordance with some embodiments.

In some embodiments, as shown in FIGS. 34 and 35, the first gate layer 1212 further includes a plurality of third gate signal lines and a plurality of fourth gate signal lines. In the embodiments, the second gate signal line R20 does not pass through the seventh active pattern layer S7, but only passes through the sixth active pattern layer S6. The fourth gate signal line R4 passes through the seventh active pattern layer S7 and the tenth active pattern layer S10. An orthographic projection of the fourth gate signal line R4 on the substrate is overlapped with an orthographic projection of the tenth active pattern layer S10 on the substrate.

The tenth active pattern layer S10 and the passing fourth gate signal line R4 form the tenth transistor, and the first active pattern layer S01, the second active pattern layer S02 and the tenth active pattern layer S10 are all connected to the first connection point. When the pixel driving circuit is initialized, the tenth transistor transmits the electrical signal to the first connection point, so as to initialize the first electrode of the first transistor and thus prevent the voltage of the first electrode of the first transistor from being affected by the voltage vdata of the previous frame, so that the brightness of the current frame is not affected by the state of the previous frame, thereby improving the short-term after-image problem.

Figure 37:
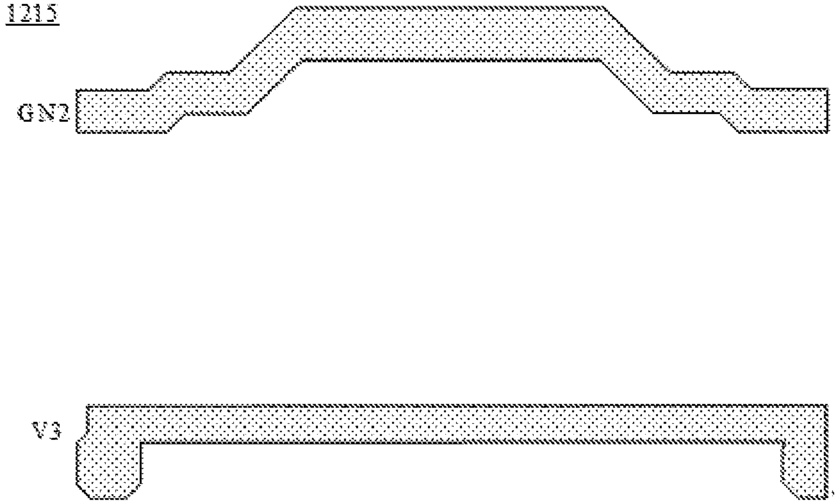
FIG. 37 is a structural diagram of another third gate layer, in accordance with some embodiments.

In some embodiments, as shown in FIG. 37, the third gate layer 1215 in the another array substrate is disposed on a side of the first gate layer away from the substrate. The third gate layer further includes a third initialization signal line V3, and the third initialization signal line V3 is electrically connected to the tenth active pattern layer.

For example, the third initialization signal line V3 transmits the vinit3 signal to the tenth active pattern layer. In the initialization phase, the vinit3 signal keeps the voltage at the first connection point constant, and thus the latter frame image may not be affected by the former frame image.

Figure 36:
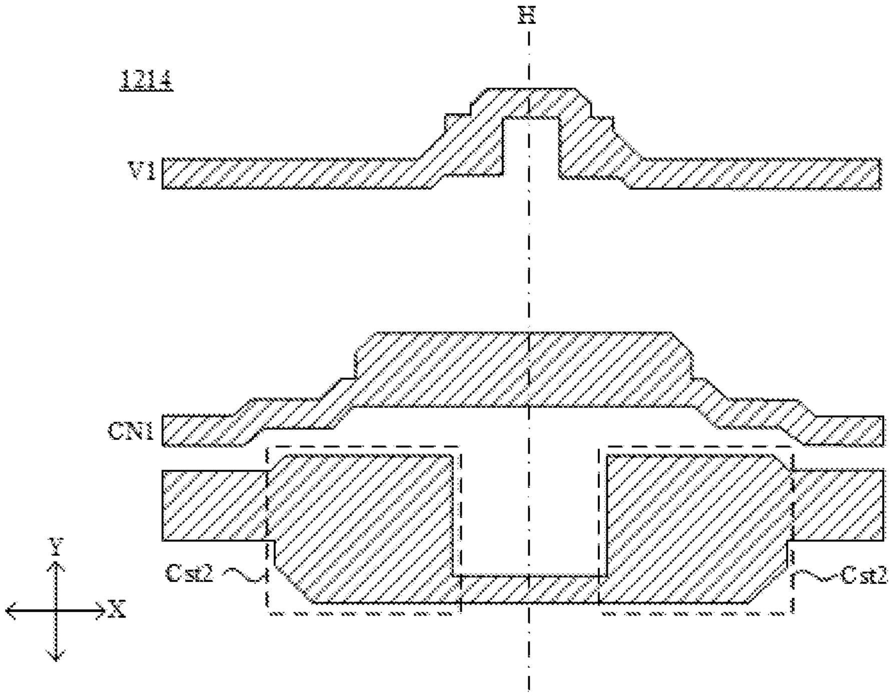
FIG. 36 is a structural diagram of another second gate layer, in accordance with some embodiments.

In some embodiments, as shown in FIG. 36, the second gate layer 1214 in the another array substrate is disposed between the first gate layer and the third gate layer. The second gate layer 1214 further includes a plurality of first initialization signal lines V1, and one of the plurality of first initialization signal lines is electrically connected to the sixth active pattern layer.

In some embodiments, in the pixel area of the array substrate, patterns of the same layer in the plurality of film layers included in the array substrate are substantially mirror symmetrical. The pixel driving circuit further includes a storage sub-circuit, and the second gate layer includes a second electrode plate Cst2 of a capacitor of the storage sub-circuit. Two second electrode plates Cst2 located in the same pixel area are connected.

For example, in the pixel area, two pixel driving circuits are arranged opposite each other, that is, the two adjacent pixel driving circuits are symmetrical about an intermediate line H. Such a structure may reduce the number of lines arranged in the second direction Y, reduce the process difficulty and improve efficiency.

The connection of the mirror symmetrical two second electrode plates Cst2 may reduce the number of via holes for electrical connection between the first voltage signal lines and the second electrode plates Cst2, thereby reducing the difficulty of the production process and improving the production efficiency.

Figure 33:
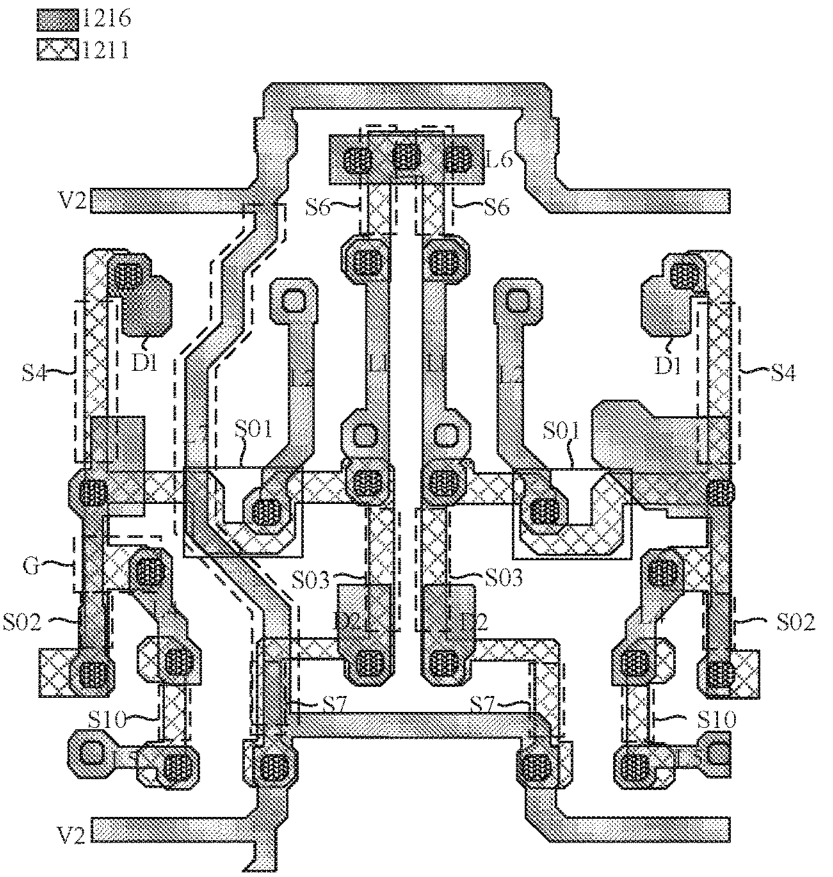
FIG. 33 is a structural diagram of another first active layer and a first source-drain metal layer, in accordance with some embodiments.
Figure 38:
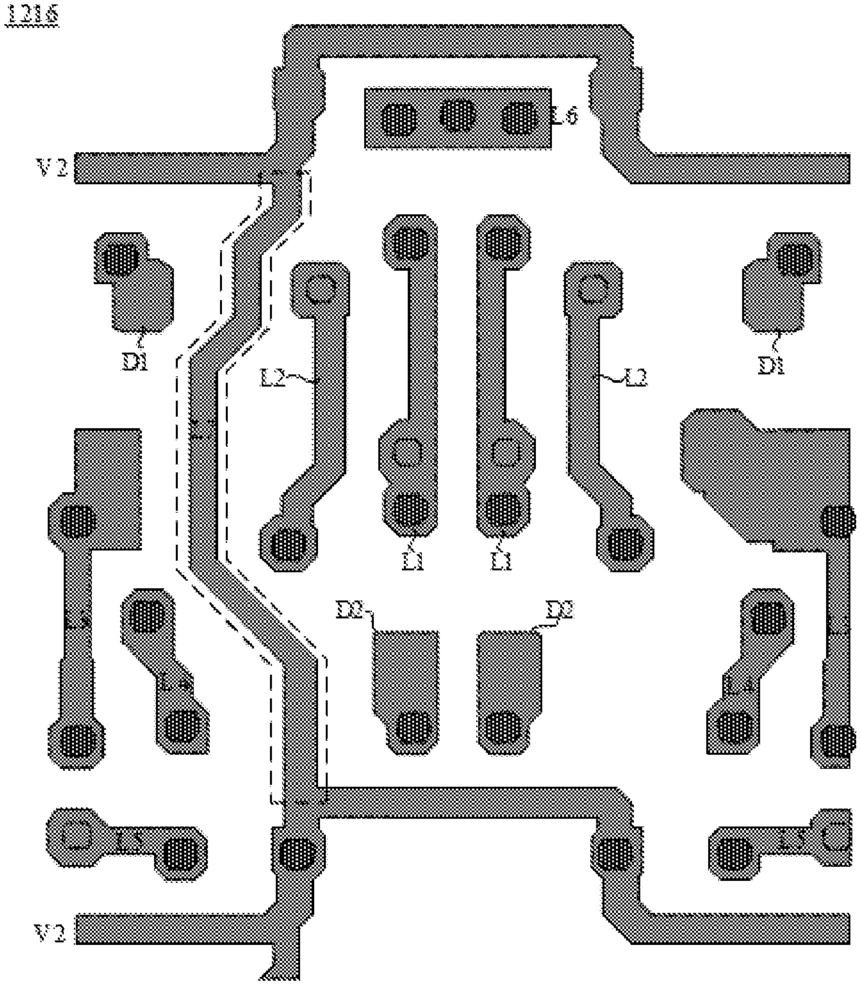
FIG. 38 is a structural diagram of another first source-drain metal layer, in accordance with some embodiments.

In some embodiments, as shown in FIGS. 33 and 38, the first source-drain metal layer 1216 in the another array substrate is disposed on a side of the third gate layer away from the substrate. In the array substrate, the first source-drain metal layer 1216 includes a plurality of second initialization signal lines V2, and adjacent second initialization signal lines V2 are electrically connected. A connection line L7 is provided between two adjacent second initialization signal lines V2, so that all the second initialization signal lines V2 have the same voltage. One of the plurality of second initialization signal lines V2 is electrically connected to the seventh active pattern layer S7.

In some embodiments, as shown in FIG. 33, the first source-drain metal layer 1216 further includes fourth connection lines L4. An end of the fourth connection line L4 is electrically connected to the tenth active pattern layer S10 through a first via hole extending to the first active layer 1211, and another end of the fourth connection line L4 is electrically connected to the first connection point G through a second via hole extending to the first active layer 1211.

In some embodiments, the sixth active pattern layer is electrically connected to a first initialization signal line. As shown in FIG. 33, the first source-drain metal layer 1216 further includes fifth connection lines L5. An end of the fifth connection line L5 is electrically connected to a third initialization signal line through a third via hole extending to the third gate layer, and another end of the fifth connection line L5 is electrically connected to the tenth active pattern layer S10 through a fourth via hole extending to the first active layer 1211.

In some embodiments, as shown in FIG. 33, the first source-drain metal layer 1216 further includes sixth connection lines L6. Both ends of the sixth connection line L6 are electrically connected to the first initialization signal line respectively through two fifth via holes extending to the second gate layer, and a middle of the sixth connection line L6 is electrically connected to the first active pattern layer through a sixth via hole extending to the first active pattern layer.

Figure 39:
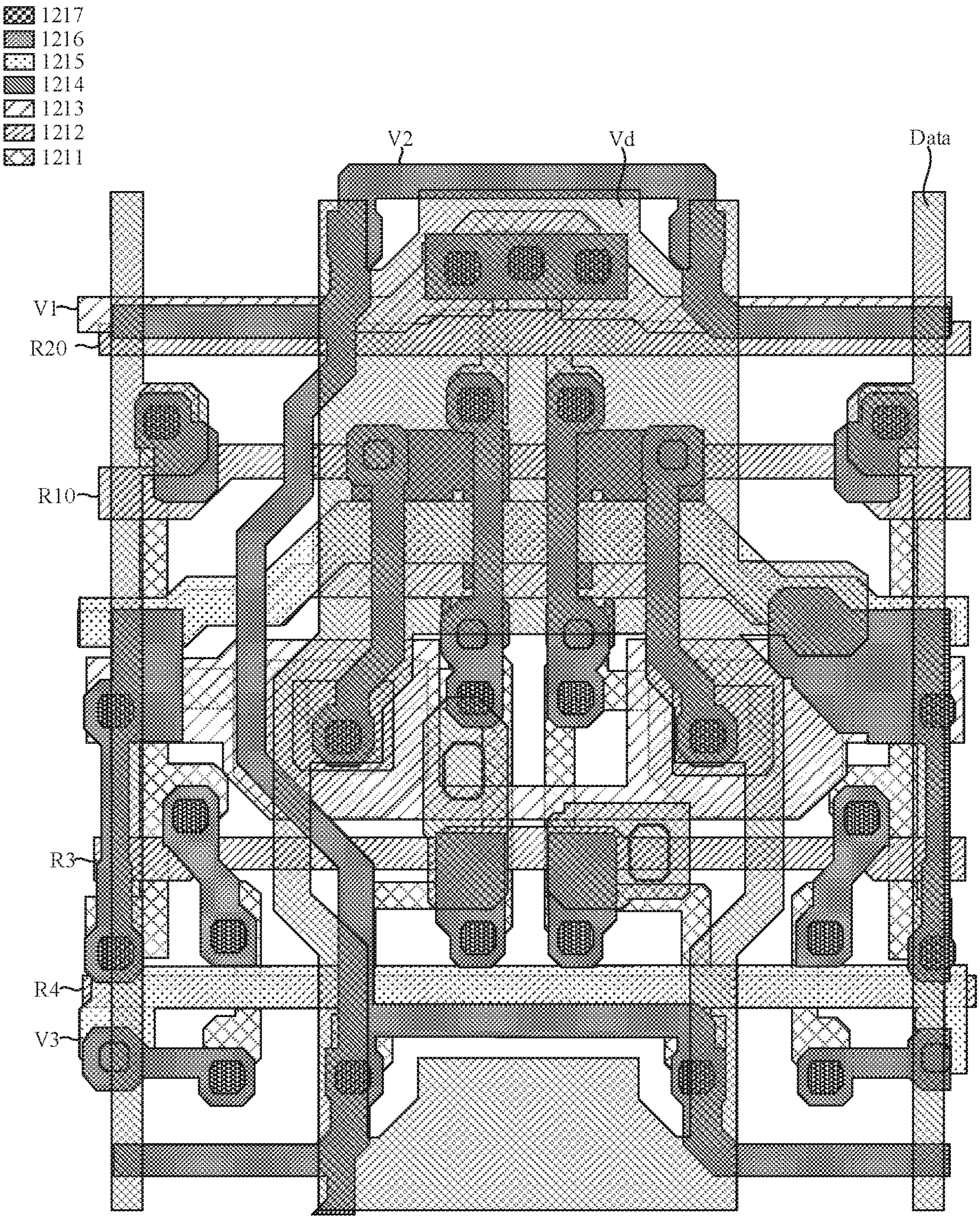
FIG. 39 is a structural diagram of another array substrate, in accordance with some embodiments.

In some embodiments, as shown in FIG. 39, the array substrate further includes a second source-drain metal layer 1217. The second source-drain metal layer 1217 is disposed on a side of the first source-drain metal layer 1216 away from the substrate. The second source-drain metal layer 1217 includes a first voltage signal line Vd.

The first source-drain metal layer 1216 further includes a plurality of third connection lines L3. An end of each third connection line L3 is electrically connected to the second electrode plate through a seventh via hole extending to the second gate layer, and another end of the third connection line L3 is electrically connected to the second active pattern layer through an eighth via hole extending to the first active layer. The first voltage signal line is electrically connected to the third connection line L3 through a ninth via hole extending to the second source-drain metal layer.

Embodiments of the present disclosure provide a display apparatus, which includes a plurality of sub-pixels arranged in an array. Each sub-pixel includes a light-emitting element and a pixel driving circuit 31 as described in any of the above embodiments.

Figure 42:
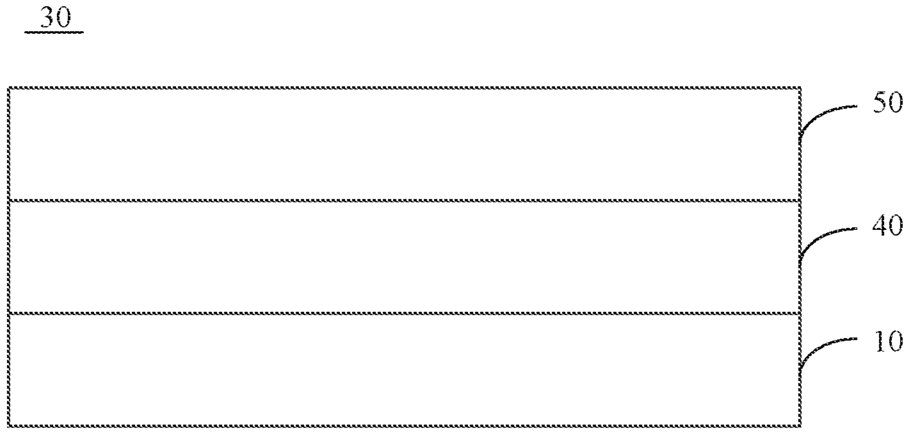
FIG. 42 is a sectional view of another array substrate, in accordance with some embodiments.

Alternatively, as shown in FIG. 42, embodiments of the present disclosure provide a display apparatus 30, which includes an array substrate 10 as provided in any of the above embodiments, a light-emitting device layer 40 provided on the array substrate, and an encapsulation layer 50 provided on a side of the light-emitting device layer away from the array substrate.

In some embodiments, third signal control terminals S3 of pixel driving circuits of multiple sub-pixels located in an i-th row and first signal control terminals S1 of pixel driving circuits of multiple sub-pixels located in an (i−1)-th row are connected to the same signal line, where i is a positive integer greater than 1, and i is less than or equal to a total number of rows of the plurality of sub-pixels.

Figure 40:
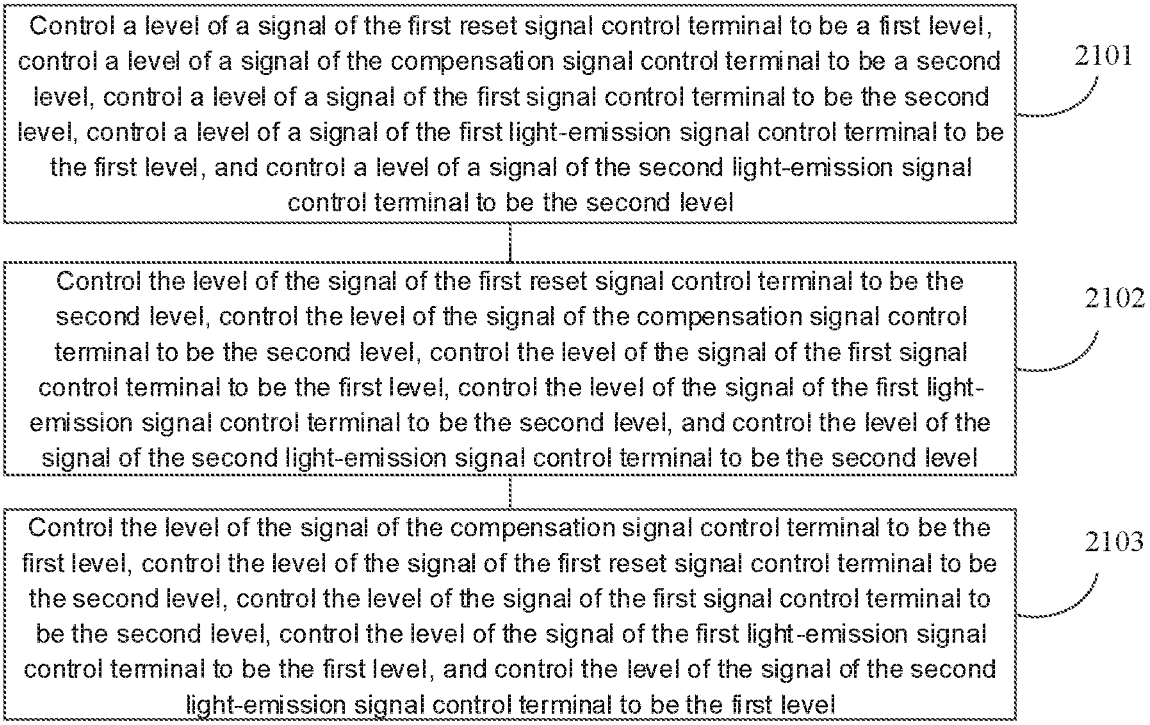
FIG. 40 is a flowchart of a driving method for a pixel driving circuit, in accordance with some embodiments.

Some embodiments of the present disclosure provide a driving method for the pixel driving circuit, which is used for the pixel driving circuit 31 shown in FIG. 6, 8, 10 or 12. The operation process of the pixel driving circuit 31 in a display frame includes an initialization phase, a data writing phase and a light-emitting phase. As shown in FIG. 40, the driving method includes following steps 2101 to 2103.

In step 2101, a level of a signal of the first reset signal control terminal is controlled to be a first level, a level of a signal of the compensation signal control terminal is controlled to be a second level, a level of a signal of the first signal control terminal is controlled to be the second level, a level of a signal of the first light-emission signal control terminal is controlled to be the first level, and a level of a signal of the second light-emission signal control terminal is controlled to be the second level.

In some embodiments, a pulse width of the signal of the first reset signal control terminal is adjustable. For example, the signal of the first reset signal control terminal is Reset[n].

In some embodiments, the above first level is a low level, and the above second level is a high level.

In step 2102, the level of the signal of the first reset signal control terminal is controlled to be the second level, the level of the signal of the compensation signal control terminal is controlled to be the second level, the level of the signal of the first signal control terminal is controlled to be the first level, the level of the signal of the first light-emission signal control terminal is controlled to be the second level, and the level of the signal of the second light-emission signal control terminal is controlled to be the second level.

In step 2103, the level of the signal of the compensation signal control terminal is controlled to be the first level, the level of the signal of the first reset signal control terminal is controlled to be the second level, the level of the signal of the first signal control terminal is controlled to be the second level, the level of the signal of the first light-emission signal control terminal is controlled to be the first level, and the level of the signal of the second light-emission signal control terminal is controlled to be the first level.

Figure 41:
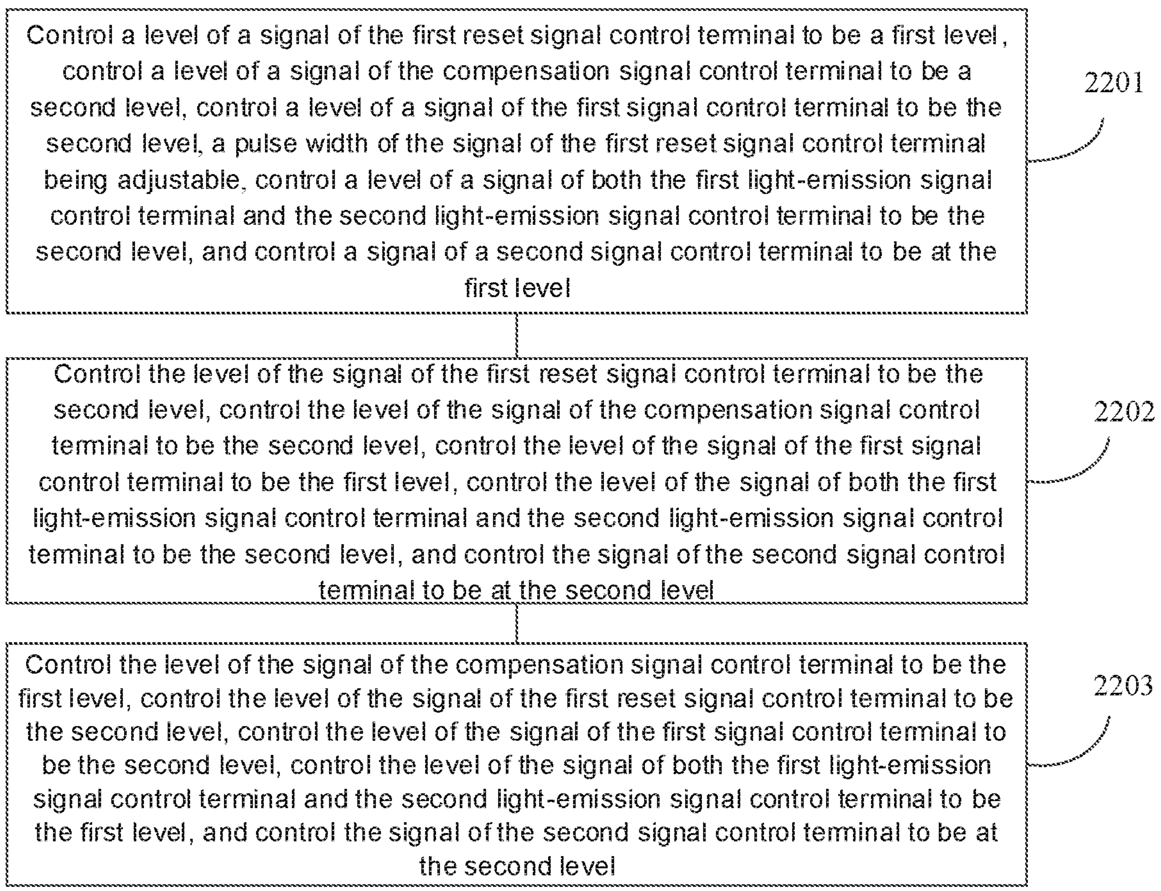
FIG. 41 is a flowchart of another driving method for another pixel driving circuit, in accordance with some embodiments.

Some embodiments of the present disclosure provide a driving method for the pixel driving circuit, which is used for the pixel driving circuit 31 shown in FIG. 13, 15, 17 or 18. The operation process of the pixel driving circuit 31 in a display frame includes an initialization phase, a data writing phase and a light-emitting phase. As shown in FIG. 41, the driving method includes following steps 2201 to 2203.

In step 2201, a level of a signal of the first reset signal control terminal is controlled to be a first level, a level of a signal of the compensation signal control terminal is controlled to be a second level, a level of a signal of the first signal control terminal is controlled to be the second level, a pulse width of the signal of the first reset signal control terminal is adjustable, a level of a signal of both the first light-emission signal control terminal and the second light-emission signal control terminal is controlled to be the second level, and a signal of a second signal control terminal is controlled to be at the first level.

In step 2202, the level of the signal of the first reset signal control terminal is controlled to be the second level, the level of the signal of the compensation signal control terminal is controlled to be the second level, the level of the signal of the first signal control terminal is controlled to be the first level, the level of the signal of both the first light-emission signal control terminal and the second light-emission signal control terminal is controlled to be the second level, and the signal of the second signal control terminal is controlled to be at the second level.

In step 2203, the level of the signal of the compensation signal control terminal is controlled to be the first level, the level of the signal of the first reset signal control terminal is controlled to be the second level, the level of the signal of the first signal control terminal is controlled to be the second level, the level of the signal of both the first light-emission signal control terminal and the second light-emission signal control terminal is controlled to be the first level, and the signal of the second signal control terminal is controlled to be at the second level.

In some embodiments, in a case where the pixel driving circuit 31 is the pixel driving circuit 31 shown in FIG. 8 or FIG. 15, the above driving method further includes: in the initialization phase, controlling a level of a signal of the third light-emission signal control terminal to be the second level; in the data writing phase, controlling the level of the signal of the third light-emission signal control terminal to be the first level or the second level; and in the light-emitting phase, controlling the level of the signal of the third light-emission signal control terminal to be the first level.

In some embodiments, in a case where the pixel driving circuit 31 is the pixel driving circuit 31 shown in FIG. 12 or FIG. 18, the above method further includes: in the initialization phase, controlling a level of a signal of the second reset signal control terminal to be the first level; in the data writing phase, controlling the level of the signal of the second reset signal control terminal to be the second level; and in the light-emitting phase, controlling the level of the signal of the second reset signal control terminal to be the second level.

In some embodiments, in a case where the pixel driving circuit 31 includes a fourth reset sub-circuit 318, the above method further includes: in the initialization phase, controlling a level of a signal of the third signal control terminal to be the first level; in the data writing phase, controlling the level of the signal of the third signal control terminal to be the second level; and in the light-emitting phase, controlling the level of the signal of the third signal control terminal to be the second level.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A pixel driving circuit, comprising: a driving sub-circuit, a first light-emission control sub-circuit, a second light-emission control sub-circuit, a data write sub-circuit, a compensation sub-circuit and a first reset sub-circuit, wherein the driving sub-circuit includes a control terminal, a first terminal and a second terminal; in an initialization phase of a display frame of the pixel driving circuit, the control terminal of the driving sub-circuit and the first terminal of the driving sub-circuit have a fixed voltage difference therebetween;

the first light-emission control sub-circuit is coupled to a first light-emission signal control terminal, a first voltage terminal and the first terminal of the driving sub-circuit, and is configured to drive a light-emitting element to emit light in response to a signal of the first light-emission signal control terminal;

the second light-emission control sub-circuit is coupled to a second light-emission signal control terminal and the second terminal of the driving sub-circuit and is configured to be coupled to a first electrode of the light-emitting element, and is configured to drive the light-emitting element to emit light in response to a signal of the second light-emission signal control terminal;

the data write sub-circuit is coupled to a first signal control terminal, a data signal terminal and the first terminal of the driving sub-circuit, and is configured to write a data signal of the data signal terminal into the first terminal of the driving sub-circuit in response to a signal of the first signal control terminal;

the compensation sub-circuit is coupled to a compensation signal control terminal, the second terminal of the driving sub-circuit and the control terminal of the driving sub-circuit, and is configured to perform threshold compensation on the driving sub-circuit in response to a signal of the compensation signal control terminal; and the first reset sub-circuit is coupled to a first reset signal control terminal and coupled between a second voltage terminal and the control terminal of the driving sub-circuit, and is configured to write a signal of the second voltage terminal into the control terminal of the driving sub-circuit in response to a signal of the first reset signal control terminal, so as to reset the control terminal of the driving sub-circuit; a pulse width of the signal of the first reset signal control terminal is adjustable, wherein in the initialization phase of the display frame, a level of the signal of the first reset signal control terminal is controlled to be a first level, a level of the signal of the compensation signal control terminal is controlled to be a second level, a level of the signal of the first signal control terminal is controlled to be the second level, a level of the signal of the first light-emission signal control terminal is controlled to be the first level, and a level of the signal of the second light-emission signal control terminal is controlled to be the second level;

in a data writing phase of the display frame, the level of the signal of the first reset signal control terminal is controlled to be the second level, the level of the signal of the compensation signal control terminal is controlled to be the second level, the level of the signal of the first signal control terminal is controlled to be the first level, the level of the signal of the first light-emission signal control terminal is controlled to be the second level, and the level of the signal of the second light-emission signal control terminal is controlled to be the second level; and in a light-emitting phase of the display frame, the level of the signal of the first reset signal control terminal is controlled to be the second level, the level of the signal of the compensation signal control terminal is controlled to be the first level, the level of the signal of the first signal control terminal is controlled to be the second level; the level of the signal of the first light-emission signal control terminal is controlled to be the first level, and the level of the signal of the second light-emission signal control terminal is controlled to be the first level.

2. The pixel driving circuit according to claim 1, wherein a first terminal of the first reset sub-circuit is coupled to the control terminal of the driving sub-circuit through the compensation sub-circuit, and a second terminal of the first reset sub-circuit is coupled to the second voltage terminal; or the first terminal of the first reset sub-circuit is coupled to the control terminal of the driving sub-circuit through the compensation sub-circuit, and the second terminal of the first reset sub-circuit is coupled to the second voltage terminal; the pixel driving circuit further comprises a third light-emission control sub-circuit; the third light-emission control sub-circuit is coupled to a third light-emission signal control terminal, the second terminal of the driving sub-circuit and the first terminal of the first reset sub-circuit; and the third light-emission control sub-circuit is configured to synchronously initialize the control terminal of the driving sub-circuit and the first terminal of the driving sub-circuit in the initialization phase in response to a signal of the third light-emission signal control terminal, and drive the light-emitting element to emit light in a light-emitting phase.

3. The pixel driving circuit according to claim 1, wherein a first terminal of the first reset sub-circuit is coupled to the control terminal of the driving sub-circuit, and a second terminal of the first reset sub-circuit is coupled to the second voltage terminal; or the first terminal of the first reset sub-circuit is coupled to the control terminal of the driving sub-circuit, and the second terminal of the first reset sub-circuit is coupled to the second voltage terminal; the pixel driving circuit further comprises a second reset sub-circuit; the second reset sub-circuit is coupled to a second reset signal control terminal, a third voltage terminal and the second terminal of the driving sub-circuit; the second reset sub-circuit is configured to write a signal of the third voltage terminal into the second terminal of the driving sub-circuit in response to a signal of the second reset signal control terminal, so as to reset the second terminal of the driving sub-circuit.

4. The pixel driving circuit according to claim 1, wherein the first light-emission signal control terminal and the second light-emission signal control terminal are connected to different signal lines, and the first light-emission control sub-circuit is further configured to write a signal of the first voltage terminal into the first terminal of the driving sub-circuit in the initialization phase; or the first light-emission signal control terminal and the second light-emission signal control terminal are connected to a same signal line; the pixel driving circuit further includes a third reset sub-circuit, and the third reset sub-circuit is coupled to a second signal control terminal, a fourth voltage terminal and the first terminal of the driving sub-circuit, and is configured to write a signal of the fourth voltage terminal into the first terminal of the driving sub-circuit in response to a signal of the second signal control terminal, so as to reset the first terminal of the driving sub-circuit; a voltage of the signal of the fourth voltage terminal is higher than a voltage of a signal of the first voltage terminal.

5. A pixel driving circuit, comprising: a driving sub-circuit, a first light-emission control sub-circuit, a second light-emission control sub-circuit, a data write sub-circuit, a compensation sub-circuit and a first reset sub-circuit, wherein the driving sub-circuit includes a control terminal, a first terminal and a second terminal;

the first light-emission control sub-circuit is coupled to a first light-emission signal control terminal, a first voltage terminal and the first terminal of the driving sub-circuit, and is configured to drive a light-emitting element to emit light in response to a signal of the first light-emission signal control terminal;

the second light-emission control sub-circuit is coupled to a second light-emission signal control terminal and the second terminal of the driving sub-circuit and is configured to be coupled to a first electrode of the light-emitting element, and is configured to drive the light-emitting element to emit light in response to a signal of the second light-emission signal control terminal;

the data write sub-circuit is coupled to a first signal control terminal, a data signal terminal and the first terminal of the driving sub-circuit, and is configured to write a data signal of the data signal terminal into the first terminal of the driving sub-circuit in response to a signal of the first signal control terminal;

the compensation sub-circuit is coupled to a compensation signal control terminal, the second terminal of the driving sub-circuit and the control terminal of the driving sub-circuit, and is configured to perform threshold compensation on the driving sub-circuit in response to a signal of the compensation signal control terminal; and the first reset sub-circuit is coupled to a first reset signal control terminal, the compensation sub-circuit and a second voltage terminal, and is configured to write a signal of the second voltage terminal into the control terminal of the driving sub-circuit in response to a signal of the first reset signal control terminal, so as to reset the control terminal of the driving sub-circuit; a pulse width of the signal of the first reset signal control terminal is adjustable, wherein in an initialization phase of a display frame of the pixel driving circuit, a level of the signal of the first reset signal control terminal is controlled to be a first level, a level of the signal of the compensation signal control terminal is controlled to be a second level, a level of the signal of the first signal control terminal is controlled to be the second level, a level of the signal of the first light-emission signal control terminal is controlled to be the first level, and a level of the signal of the second light-emission signal control terminal is controlled to be the second level;

in a data writing phase of the display frame, the level of the signal of the first reset signal control terminal is controlled to be the second level, the level of the signal of the compensation signal control terminal is controlled to be the second level, the level of the signal of the first signal control terminal is controlled to be the first level, the level of the signal of the first light-emission signal control terminal is controlled to be the second level, and the level of the signal of the second light-emission signal control terminal is controlled to be the second level; and in a light-emitting phase of the display frame, the level of the signal of the first reset signal control terminal is controlled to be the second level, the level of the signal of the compensation signal control terminal is controlled to be the first level, the level of the signal of the first signal control terminal is controlled to be the second level; the level of the signal of the first light-emission signal control terminal is controlled to be the first level, and the level of the signal of the second light-emission signal control terminal is controlled to be the first level.

6. The pixel driving circuit according to claim 1, further comprising a fourth reset sub-circuit, wherein the fourth reset sub-circuit is coupled to a third signal control terminal and a fifth voltage terminal and is configured to be coupled to the first electrode of the light-emitting element, and is configured to write a signal of the fifth voltage terminal into the first electrode of the light-emitting element in response to a signal of the third signal control terminal, so as to reset the first electrode of the light-emitting element; or the pixel driving circuit further comprising the fourth reset sub-circuit and a storage sub-circuit, wherein the fourth reset sub-circuit is coupled to the third signal control terminal and the fifth voltage terminal and is configured to be coupled to the first electrode of the light-emitting element, and is configured to write the signal of the fifth voltage terminal into the first electrode of the light-emitting element in response to the signal of the third signal control terminal, so as to reset the first electrode of the light-emitting element; the storage sub-circuit is coupled to the control terminal of the driving sub-circuit and the first voltage terminal, and is configured to store a compensation signal obtained based on the data signal.

7. An array substrate, comprising: a plurality of pixel driving circuits, wherein each pixel driving circuit of the plurality of pixel driving circuits includes a driving sub-circuit, a first light-emission control sub-circuit, a second light-emission control sub-circuit, a data write sub-circuit, a compensation sub-circuit and a first reset sub-circuit, wherein the driving sub-circuit includes a control terminal, a first terminal and a second terminal; in an initialization phase of a display frame of the pixel driving circuit, the control terminal of the driving sub-circuit and the first terminal of the driving sub-circuit have a fixed voltage difference therebetween;

the first light-emission control sub-circuit is coupled to a first light-emission signal control terminal, a first voltage terminal and the first terminal of the driving sub-circuit, and is configured to drive a light-emitting element to emit light in response to a signal of the first light-emission signal control terminal;

the second light-emission control sub-circuit is coupled to a second light-emission signal control terminal and the second terminal of the driving sub-circuit and is configured to be coupled to a first electrode of the light-emitting element, and is configured to drive the light-emitting element to emit light in response to a signal of the second light-emission signal control terminal;

the data write sub-circuit is coupled to a first signal control terminal, a data signal terminal and the first terminal of the driving sub-circuit, and is configured to write a data signal of the data signal terminal into the first terminal of the driving sub-circuit in response to a signal of the first signal control terminal;

the compensation sub-circuit is coupled to a compensation signal control terminal, the second terminal of the driving sub-circuit and the control terminal of the driving sub-circuit, and is configured to perform threshold compensation on the driving sub-circuit in response to a signal of the compensation signal control terminal; and the first reset sub-circuit is coupled to a first reset signal control terminal and coupled between a second voltage terminal and the control terminal of the driving sub-circuit, and is configured to write a signal of the second voltage terminal into the control terminal of the driving sub-circuit in response to a signal of the first reset signal control terminal, so as to reset the control terminal of the driving sub-circuit; a pulse width of the signal of the first reset signal control terminal is adjustable, wherein the data write sub-circuit includes a fourth transistor, and the first reset sub-circuit includes a sixth transistor;

the array substrate comprises:

a substrate;

a first active layer disposed on a side of the substrate; the first active layer including a plurality of first pixel active patterns, each first pixel active pattern including a fourth active pattern layer of the fourth transistor and a sixth active pattern layer of the sixth transistor; and a first gate layer disposed on a side of the first active layer away from the substrate, the first gate layer including a plurality of first gate signal lines and a plurality of second gate signal lines; wherein an orthographic projection of the fourth active pattern layer on the substrate is overlapped with an orthographic projection of a current stage of first gate signal line in the plurality of first gate signal lines on the substrate, an orthographic projection of the sixth active pattern layer on the substrate is overlapped with an orthographic projection of the current stage of second gate signal line in the plurality of second gate signal lines on the substrate, and relative to an electrical signal transmitted by the first gate signal line, a pulse width of an electrical signal transmitted by the second gate signal line is adjustable.

8. The array substrate according to claim 7, wherein the pixel driving circuit further includes a third reset sub-circuit; the driving sub-circuit includes a first transistor, the first light-emission control sub-circuit includes a second transistor, the second light-emission control sub-circuit includes a third transistor, and the third reset sub-circuit includes a tenth transistor;

the first pixel active pattern further includes a first active pattern layer of the first transistor, a second active pattern layer of the second transistor, a third active pattern layer of the third transistor and a tenth active pattern layer of the tenth transistor; the first active pattern layer, the second active pattern layer and the tenth active pattern layer are all connected to a first connection point; and the first gate layer further includes a plurality of third gate signal lines and a plurality of fourth gate signal lines; an orthographic projection of the third active pattern layer on the substrate and an orthogonal projection of the second active pattern layer on the substrate are overlapped with an orthographic projection of the current stage of third gate signal line in the plurality of third gate signal lines on the substrate, and an orthogonal projection of the tenth active pattern layer on the substrate is overlapped with an orthographic projection of the current stage of fourth gate signal line in the plurality of fourth gate signal lines on the substrate.

9. The array substrate according to claim 8, further comprising a third gate layer, wherein the third gate layer is disposed on a side of the first gate layer away from the substrate; the third gate layer includes a plurality of third initialization signal lines, and one of the plurality of third initialization signal lines is electrically connected to the tenth active pattern layer.

10. The array substrate according to claim 9, further comprising a second gate layer, wherein the second gate layer is disposed between the first gate layer and the third gate layer; the second gate layer includes a plurality of first initialization signal lines, and one of the plurality of first initialization signal lines is electrically connected to the sixth active pattern layer; or the array substrate further comprising a second gate layer, wherein the second gate layer is disposed between the first gate layer and the third gate layer; the second gate layer includes a plurality of first initialization signal lines, and one of the plurality of first initialization signal lines is electrically connected to the sixth active pattern layer; the array substrate comprises a plurality of pixel areas arranged in an array, and each pixel area is provided with two adjacent pixel driving circuits therein, in the pixel area, patterns of a same layer in a plurality of film layers included in the array substrate are substantially mirror symmetrical; the pixel driving circuit further includes a storage sub-circuit, the storage sub-circuit includes a capacitor, and the second gate layer further includes a second electrode plate of the capacitor of the storage sub-circuit; and two second electrode plates located in a same pixel area are connected.

11. The array substrate according to claim 9, wherein the pixel driving circuit further includes a fourth reset sub-circuit, and the first active layer further includes a seventh active pattern layer of the fourth reset sub-circuit; and the array substrate further comprises a first source-drain metal layer, and the first source-drain metal layer is disposed on a side of the third gate layer away from the substrate; the first source-drain metal layer includes a plurality of second initialization signal lines, adjacent second initialization signal lines are electrically connected, and one of the plurality of second initialization signal lines is electrically connected to the seventh active pattern layer.

12. The array substrate according to claim 11, wherein the first connection point is disposed in the first active layer, and the first active pattern layer and the second active layer are connected at the first connection point; and the first source-drain metal layer further includes a fourth connection line; an end of the fourth connection line is electrically connected to the tenth active pattern layer through a first via hole extending to the first active layer, and another end of the fourth connection line is electrically connected to the first connection point through a second via hole extending to the first active layer.

13. The array substrate according to claim 11, further comprising a second gate layer, wherein the second gate layer is disposed between the first gate layer and the third gate layer; the second gate layer includes a plurality of first initialization signal lines, and the sixth active pattern layer is electrically connected to one of the plurality of first initialization signal lines; and the first source-drain metal layer further includes a fifth connection line; an end of the fifth connection line is electrically connected to the third initialization signal line through a third via hole extending to the third gate layer, and another end of the fifth connection line is electrically connected to the tenth active pattern layer through a fourth via hole extending to the first active layer.

14. The array substrate according to claim 13, wherein the first source-drain metal layer further includes a sixth connection line; both ends of the sixth connection line are electrically connected to the first initialization signal line respectively through two fifth via holes extending to the second gate layer, and a middle of the sixth connection line is electrically connected to the sixth active pattern layer through a sixth via hole extending to the first active layer; or the array substrate further comprises a second source-drain metal layer; the second source-drain metal layer is disposed on a side of the first source-drain metal layer away from the substrate, and the second source-drain metal layer includes a first voltage signal line; the pixel driving circuit further includes a storage sub-circuit, the storage sub-circuit includes a capacitor, and the second gate layer further includes a second electrode plate of the capacitor; the first source-drain metal layer further includes a plurality of third connection lines; an end of each third connection line is electrically connected to the second electrode plate through a seventh via hole extending to the second gate layer, another end of each third connection line is electrically connected to the second active pattern layer through an eighth via hole extending to the first active layer, and the first voltage signal line is electrically connected to the third connection line through a ninth via hole extending to the second source-drain metal layer.

15. A display apparatus, comprising a plurality of sub-pixels, wherein each sub-pixel of the plurality of sub-pixels includes the pixel driving circuit according to claim 1, and light-emitting elements.

16. A driving method for the pixel driving circuit used for driving the pixel driving circuit according to claim 1, wherein an operation process of the pixel driving circuit in a display frame includes an initialization phase, a data writing phase and a light-emitting phase;

the driving method comprises:

in the initialization phase, controlling a level of the signal of the first reset signal control terminal to be a first level, controlling a level of the signal of the compensation signal control terminal to be a second level, controlling a level of the signal of the first signal control terminal to be the second level, controlling a level of the signal of the first light-emission signal control terminal to be the first level, and controlling a level of the signal of the second light-emission signal control terminal to be the second level; a pulse width of the signal of the first reset signal control terminal being adjustable;

in the data writing phase, controlling the level of the signal of the first reset signal control terminal to be the second level, controlling the level of the signal of the compensation signal control terminal to be the second level, controlling the level of the signal of the first signal control terminal to be the first level, controlling the level of the signal of the first light-emission signal control terminal to be the second level, and controlling the level of the signal of the second light-emission signal control terminal to be the second level; and in the light-emitting phase, controlling the level of the signal of the first reset signal control terminal to be the second level, controlling the level of the signal of the compensation signal control terminal to be the first level, controlling the level of the signal of the first signal control terminal to be the second level; controlling the level of the signal of the first light-emission signal control terminal to be the first level, and controlling the level of the signal of the second light-emission signal control terminal to be the first level.

17. The method according to claim 16, wherein the pixel driving circuit further includes a third reset sub-circuit, the third reset sub-circuit is coupled to a second signal control terminal, a fourth voltage terminal and the first terminal of the driving sub-circuit, and a control terminal of the third reset sub-circuit is configured to receive a signal of the second signal control terminal; a voltage of a signal of the fourth voltage terminal is higher than a voltage of a signal of the first voltage terminal; the method further comprises:

in the initialization phase, controlling a level of the signal of the first light-emission signal control terminal and the second light-emission signal control terminal to be the second level, and controlling the signal of the second signal control terminal to be at the first level;

in the data writing phase, controlling the level of the signal of the first light-emission signal control terminal and the second light-emission signal control terminal to be the second level, and controlling the signal of the second signal control terminal to be at the second level; and in the light-emitting phase, controlling the level of the signal of the first light-emission signal control terminal and the second light-emission signal control terminal to be the first level, and controlling the signal of the second signal control terminal to be at the second level.

18. The method according to claim 16, wherein a first terminal of the first reset sub-circuit is coupled to the control terminal of the driving sub-circuit through the compensation sub-circuit, and a second terminal of the first reset sub-circuit is coupled to the second voltage terminal; the pixel driving circuit further includes a third light-emission control sub-circuit, the third light-emission control sub-circuit is coupled to a third light-emission signal control terminal, the second terminal of the driving sub-circuit and the first terminal of the first reset sub-circuit, and a control terminal of the third light-emission control sub-circuit is configured to receive a signal of the third light-emission signal control terminal; the method further comprises:

in the initialization phase, controlling a level of the signal of the third light-emission signal control terminal to be the second level;

in the data writing phase, controlling the level of the signal of the third light-emission signal control terminal to be the first level or the second level; and in the light-emitting phase, controlling the level of the signal of the third light-emission signal control terminal to be the first level; or the first terminal of the first reset sub-circuit is coupled to the control terminal of the driving sub-circuit, and the second terminal of the first reset sub-circuit is coupled to the second voltage terminal; the pixel driving circuit further includes a second reset sub-circuit, the second reset sub-circuit is coupled to a second reset signal control terminal, a third voltage terminal and the second terminal of the driving sub-circuit, and a control terminal of the second reset sub-circuit is configured to receive a signal of the second reset signal control terminal; the method further comprises:

in the initialization phase, controlling a level of the signal of the second reset signal control terminal to be the first level;

in the data writing phase, controlling the level of the signal of the second reset signal control terminal to be the second level; and in the light-emitting phase, controlling the level of the signal of the second reset signal control terminal to be the second level.

19. A display apparatus, comprising the array substrate according to claim 7, a light-emitting device layer disposed on the array substrate, and an encapsulation layer disposed on a side of the light-emitting device layer away from the array substrate.

* * * * *